(12) United States Patent
Kornerup et al.

(10) Patent No.: US 8,397,205 B2
(45) Date of Patent: Mar. 12, 2013

(54) GRAPHICALLY REPRESENTING TIMING IN A GRAPHICAL PROGRAM

(75) Inventors: Jacob Kornerup, Austin, TX (US); Jeffrey L. Kodosky, Austin, TX (US); Hugo A. Andrade, Austin, TX (US); Biren Shah, Austin, TX (US); Aljosa Vrancic, Austin, TX (US); Michael L. Santori, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1915 days.

(21) Appl. No.: 10/893,745

(22) Filed: Jul. 16, 2004

(65) Prior Publication Data

US 2005/0055666 A1 Mar. 10, 2005

Related U.S. Application Data

(60) Provisional application No. 60/493,268, filed on Aug. 7, 2003.

(51) Int. Cl.
*G06F 9/44* (2006.01)
*G06F 3/048* (2006.01)

(52) U.S. Cl. ........ 717/100; 717/105; 717/113; 717/121; 715/771

(58) Field of Classification Search ..................... None
See application file for complete search history.

(56) References Cited

U.S. PATENT DOCUMENTS

| | | | |
|---|---|---|---|
| 4,554,536 A | 11/1985 | Jackson | |
| 4,564,804 A | 1/1986 | Wilke et al. | |
| 4,812,996 A | 3/1989 | Stubbs | |
| 4,868,785 A | 9/1989 | Jordan et al. | |
| 4,901,221 A | 2/1990 | Kodosky et al. | |
| 5,301,301 A | 4/1994 | Kodosky et al. | |
| 5,392,207 A | 2/1995 | Wilson | |
| 5,481,741 A | 1/1996 | McKaskle et al. | |
| 5,485,600 A | 1/1996 | Joseph et al. | |
| 5,497,500 A | 3/1996 | Rogers et al. | |
| 5,551,041 A | 8/1996 | Beethe | |
| D384,051 S | 9/1997 | Kodosky | |
| 5,680,639 A | 10/1997 | Milne et al. | |
| 5,732,277 A | 3/1998 | Kodosky et al. | |
| 5,821,934 A | 10/1998 | Kodosky et al. | |
| 5,838,919 A * | 11/1998 | Schwaller et al. | ............ 709/224 |
| 5,850,548 A | 12/1998 | Williams | |

(Continued)

OTHER PUBLICATIONS

Gao et al., "A Timed Petri-Net Model for Fine-Grain Loop Scheduling" ACM SIGPLAN 1991 Conference, Jun. 26-28, 1991.

(Continued)

*Primary Examiner* — Li B Zhen
*Assistant Examiner* — Evral Bodden
(74) *Attorney, Agent, or Firm* — Meyertons Hood Kivlin Kowert & Goetzel, P.C.; Jeffrey C. Hood; Jason L. Burgess

(57) ABSTRACT

A system and method for specifying timing relationships among nodes in a graphical program. User input specifying desired timing of a first node with respect to timing of a second node may be received. In various embodiments, any kind of timing relationship or timing constraint between the first node and the second node may be specified. Timing information may be displayed on the display to visually indicate the timing of the first node with respect to timing of the second node. In one embodiment, displaying the timing information may comprise displaying a timing wire between the first node and the second node. The graphical program may be executed in such a way that the visually indicated timing of the first node with respect to timing of the second node is satisfied.

36 Claims, 30 Drawing Sheets

U.S. PATENT DOCUMENTS

| | | | |
|---|---|---|---|
| 5,937,165 A * | 8/1999 | Schwaller et al. | 709/224 |
| 5,971,581 A | 10/1999 | Gretta et al. | |
| 5,974,257 A | 10/1999 | Austin | |
| 5,995,916 A | 11/1999 | Nixon et al. | |
| 6,055,369 A | 4/2000 | Sawahata et al. | |
| 6,141,596 A | 10/2000 | Gretta et al. | |
| 6,181,320 B1 | 1/2001 | Fredrickson | |
| 6,216,138 B1 | 4/2001 | Wells et al. | |
| 6,219,628 B1 * | 4/2001 | Kodosky et al. | 703/2 |
| 6,292,810 B1 | 9/2001 | Richards | |
| 6,332,212 B1 * | 12/2001 | Organ et al. | 717/128 |
| 6,366,300 B1 | 4/2002 | Ohara et al. | |
| 6,437,805 B1 | 8/2002 | Sojoodi et al. | |
| 6,453,450 B1 | 9/2002 | Walter | |
| 6,584,601 B1 * | 6/2003 | Kodosky et al. | 716/4 |
| 6,708,135 B2 | 3/2004 | Southworth et al. | |
| 6,763,506 B1 | 7/2004 | Betz et al. | |
| 6,873,928 B2 | 3/2005 | Thurman et al. | |
| 6,880,130 B2 | 4/2005 | Makowski et al. | |
| 6,964,028 B2 | 11/2005 | Argyres | |
| 7,024,660 B2 | 4/2006 | Andrade et al. | |
| 7,134,109 B2 | 11/2006 | Hayles | |
| 7,703,034 B2 * | 4/2010 | Kornerup et al. | 715/772 |
| 2001/0034881 A1 | 10/2001 | Washington | |
| 2002/0010713 A1 | 1/2002 | Egilsson | |
| 2002/0145629 A1 | 10/2002 | Gabbert et al. | |
| 2003/0132964 A1 | 7/2003 | Santori et al. | |
| 2003/0172369 A1 | 9/2003 | Kodosky et al. | |
| 2003/0184596 A1 | 10/2003 | Kodosky et al. | |
| 2003/0234802 A1 | 12/2003 | Makowski et al. | |
| 2004/0031019 A1 * | 2/2004 | Lamanna et al. | 717/125 |
| 2004/0032412 A1 | 2/2004 | Odom | |
| 2005/0050515 A1 | 3/2005 | Shah et al. | |
| 2006/0053409 A1 | 3/2006 | Kornerup et al. | |
| 2007/0203683 A1 * | 8/2007 | Kornerup et al. | 703/19 |

OTHER PUBLICATIONS

Liu et al., "Heterogeneous Modeling and Design of Control Systems", IEEE Control System Magazine, Oct. 27, 2001.

Emil Naef, Hard Real-Time and Synchronous Programming with SDL, ISSN 0280-5316, Department of Automatic Control, Lund Institute of Technology, Apr. 2001.

Thiele et al., "FunState-An Internal Design Representation for Codesign", 0-7803-5832-5/99, 1999 IEEE, May 1999.

"Simulink Model-Based and System-Based Design" Using Similink, Version 5, 1990.

"LabVIEW User Manual", National Instruments, Part No. 320999E-01, Apr. 2003 Edition.

Deitel, "Operating Systems," Second Edition, 1990, 2 pages, Addison-Wesley, USA.

Communication pursuant to Article 96(2) EPC, Application No. 04 757 092.4-1243, Jul. 2, 2007.

Garcia, G.; "Advanced Application Timing Presentation Overview"; retrieved from Internet: ftp://ftp.ni.com/pub/devzone/advanced_application_timing_with_labview_real-time; date unknown; 38 pages.

"While Loops—LabVIEW User Manual"; National Instruments; retrieved from Internet: http://www.elis.ugent.be/elisgroups/tfcg/student/Ivu6373.pdf; Mar. 15, 2000; pp. 3.4-3.14.

"Timing a LabVIEW Operation"; Technical Note 022; Oct. 1992; 3 pages; National Instruments Corporation.

"IDF: A graphical data flow programming language for imageprocessing and vision" by N. Hunt, Nov. 4-7, 1990, IEEE p. 351-360.

LabVIEW Advanced Programming Techniques by R. Bitter, 1st Edition, 2000, CRC Press, Inc., 6 pages.

* cited by examiner

|  | Align with schedule | Don't align with schedule |
|---|---|---|
| Catch up | A | C |
| Don't catch up | B | D |

| Time | 30 | 130 | 230 | 240 | 260 | 280 | 330 | 340 | 380 |
|---|---|---|---|---|---|---|---|---|---|
| Events | X(30) | X(130) | X(230) | A(30) C(30) D(230) E(230) | A(130) C(130) | A(230) C(230) | X(330) A(330) B(330) | D(330) E(330) F(230) | C(330) |

Fig. 23

| Time | 30 | 130 | 230 | 240 | 260 | 280 | 330 | 340 | 380 | 420 |
|---|---|---|---|---|---|---|---|---|---|---|
| Events | X(30) | X(130) | X(230) | A(30)<br>SB(30)<br>C(30)<br>D(230)<br>E(230)<br>A'(30)<br>C'(30)<br>D'(230)<br>E'(230) | A(130)<br>C(130)<br>A'(130)<br>C'(130) | A(230)<br>C(230)<br>A'(230)<br>C'(230) | X(330)<br>A(330)<br>B(330)<br>SB(330)<br>A'(330)<br>B'(330) | D(330)<br>E(330)<br>F(230)<br>D'(330)<br>E'(330)<br>F'(330) | C(330) | Preemption by another task |

| Time | 430 | 530 | 630 | 650 | 670 | 690 | 730 | 740 | 750 | 790 |
|---|---|---|---|---|---|---|---|---|---|---|
| Events | X(430) | X(530) | X(630) | End of Preemption<br>A(430)<br>SB(430)<br>C(430)<br>D(430)<br>E(430)<br>F(430)<br>A'(430)<br>B'(430)<br>C'(430)<br>D'(430)<br>E'(430)<br>F'(430) | A(530)<br>C(530)<br>F(530)<br>A'(530)<br>B'(530)<br>C'(530)<br>D'(530)<br>E'(530)<br>F'(530) | A(630)<br>C(630)<br>F(630)<br>A'(630)<br>B'(630)<br>C'(630)<br>D'(630)<br>E'(630)<br>F'(630) | X(730)<br>A(730)<br>B(730)<br>SB(730)<br>A'(730)<br>B'(730) | F'(730)<br>C'(730)<br>D'(730)<br>E'(730)<br>F'(730) | D(730)<br>E(730) | C(730) | ns
GRAPHICALLY REPRESENTING TIMING IN A GRAPHICAL PROGRAM

PRIORITY CLAIM

This application claims benefit of priority of U.S. Provisional Application Ser. No. 60/493,268 titled "A Graphical Program which Executes a Timed Loop," filed Aug. 7, 2003, whose inventors were Jacob Kornerup, Biren Shah and Aljosa Vrancic.

FIELD OF THE INVENTION

The present invention relates to the field of graphical programming, and more particularly to a system and method for graphically representing timing in a graphical program.

DESCRIPTION OF THE RELATED ART

Traditionally, high level text-based programming languages have been used by programmers in writing application programs. Many different high level text-based programming languages exist, including BASIC, C, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Many computerized applications require operations to be performed with precise timing. Thus it would be desirable for a graphical programming environment to provide the ability to control timing of a graphical program. In particular, it would be desirable to enable the programmer to specify desired timing of a first node with respect to timing of a second node. It would also be desirable to graphically indicate this timing, e.g., by displaying information in the graphical program to visually indicate the timing.

SUMMARY OF THE INVENTION

One embodiment of the present invention comprises a system and method for specifying timing relationships among nodes in a graphical program. A user may first create the graphical program, e.g., by interacting with a graphical programming development environment. In creating the graphical program, a plurality of nodes may be arranged on a display in response to user input. The plurality of nodes may be interconnected in response to user input. The nodes may be interconnected in one or more of a data flow, control flow, or execution flow format. The plurality of interconnected nodes may visually indicate functionality of the graphical program.

User input specifying desired timing of a first node with respect to timing of a second node may be received. The user input may specify a desired timing relationship between execution of the first node and execution of the second node, to be satisfied during execution of the graphical program. In various embodiments, any kind of timing relationship or timing constraint between the first node and the second node may be specified.

In one embodiment, the user input may specify desired timing of an execution point for the first node with respect to timing of an execution point for the second node. As used herein, an execution point for a node may refer to an identifiable point in time pertaining to execution of the node during execution of the graphical program or may refer to a time pertaining to execution of the node at which a specific condition is or becomes true. One example of an execution point is the beginning of execution of the node. During execution of a graphical program, a given node may begin execution at a time which is typically dependent upon the node's relationship or connections to other nodes in the graphical program. For example, in a data flow graphical program, a node may begin execution when all data flow dependencies for the node (if any) have been satisfied. The node may then execute for an amount of time which depends on functionality of the node or operations performed by the node, after which execution of the node ends. The point at which execution of the node ends is another example of an execution point for the node, i.e., an identifiable point in time pertaining to execution of the node.

In various embodiments, the user input may specify any type of timing relationship or timing constraint between any kinds of execution points for the respective nodes. For example, the user may specify a time interval to elapse between the time at which the first node begins execution and the time at which the second node begins execution. For example, the user may specify a time interval of 100 ms to indicate that 100 ms should elapse between the times at which the respective nodes begin execution. As another example, the user may specify a time interval to elapse between the time at which the first node ends execution and the time at which the second node ends execution. As another example, the user may specify a time interval to elapse between the time at which the first node ends execution and the time at which the second node begins execution, or vice versa.

In another embodiment the user input may specify a maximum amount of time to elapse between an execution point for the first node and an execution point for the second node. For example, the user input may specify that no more than 50 ms should elapse between the time at which the first node begins execution and the time at which the second node begins execution. In another embodiment the user input may specify a minimum amount of time to elapse between an execution point for the first node and an execution point for the second node. For example, the user input may specify that at least 200 ms should elapse between the time at which the first node ends execution and the time at which the second node begins execution.

Besides specifying timing relationships relating to the beginning of execution and the end of execution for the nodes, the user input may also specify timing relationships relating to any other execution point for the nodes. For example, where the first node has an execution side effect, the user input may specify a maximum amount of time to elapse between the time at which the side effect of the first node occurs and the time at which the second node begins execution. As another example, the user input may specify a desired time interval to elapse between the time at which a side effect of the first node occurs and the time at which a side effect of the second node occurs. In various embodiments, the first node or the second node may have any execution side effect. For example, the side effect may be caused by an input/output operation or may be caused by a processor executing the graphical program interacting with a separate hardware device.

In one embodiment, the specified timing relationship may be associated with a particular timing source or clock. Thus, in one embodiment, rather than specifying a time interval such as 100 ms, the user may specify a number of ticks, e.g., 100. The timing constraint between the first node and the second node may then be based on the specified number of ticks of the associated timing source.

In one embodiment, timing information may be displayed on the display to visually indicate the timing of the first node with respect to timing of the second node. In various embodiments the timing information may visually indicate the timing of the first node with respect to timing of the second node in any way. In one embodiment the timing information may be displayed on the block diagram of the graphical program. In another embodiment the timing information may be displayed separately from the block diagram.

Where the user specifies a numerical time value regarding timing of the first node with respect to timing of the second node, displaying the timing information may include displaying this numerical time value. Displaying the timing information may also include indicating whether the numerical time value is an exact time interval, a time maximum, or a time minimum. For example, where the user specifies a time maximum of 100 ms to elapse between an execution point for the first node and an execution point for the second node, this may be indicated by displaying text such as "<100 ms" or "max 100 ms", e.g., where the text is displayed or positioned in relation to the first node and the second node to visually indicate that a timing relationship between the first node and the second node is represented.

In one embodiment, displaying the timing information may comprise displaying a timing wire between the first node and the second node. One end of the timing wire may be connected to the first node, and the other end may be connected to the second node. The specific time constraint may also be displayed with or displayed on the timing wire.

The timing wire may be a special wire that does not have the same meaning as other wires in the graphical program. For example, in a data flow graphical program, the graphical program may include a plurality of wires that indicate data flow between nodes in the graphical program. However, the timing wire may not indicate data flow between the first node and the second node, but instead may indicate a timing relationship to be satisfied during execution of the graphical program.

In one embodiment, a node may have a plurality of points operable to accept connection of a timing wire. Each point may correspond to a different execution point for the node. Thus, the timing relationship specified by the timing wire may depend on (and may be visually indicated by) the particular points to which the timing wire is attached on the respective nodes. In one embodiment, the left side of a node may correspond to the beginning of execution of the node, the right side of the node may correspond to the end of execution of the node, and the middle of the node may correspond to the point when an execution side effect of the node occurs. In other embodiments, timing information for the first node and the second node may be displayed using techniques other than timing wires.

The graphical program may be executed in such a way that the visually indicated timing of the first node with respect to timing of the second node is satisfied. This may involve scheduling execution of nodes in the graphical program in a particular way or adjusting priorities of one or more threads in the graphical program so that the timing relationship is satisfied. It is possible that the user may specify a timing relationship that cannot be satisfied. In one embodiment it may be possible to determine before execution of the graphical program that the timing relationship cannot be satisfied. If so, then the graphical programming development environment may inform the user, e.g., at compile time or at the time the user specifies the timing relationship while editing the graphical program. In another embodiment, the system may determine during execution of the graphical program that the timing relationship cannot be satisfied and may inform the user as the graphical program executes or after the graphical program finishes executing. In another embodiment the user may determine whether the specified timing relationships were satisfied by utilizing a visualization tool to view timing of the graphical program.

In various embodiments, the user may specify a timing relationship for any of various types of nodes located anywhere within the graphical program. In one embodiment, the graphical program may include one or more loops which have associated nodes that are executed for a plurality of iterations. In one embodiment the first node and the second node may be associated with or located within a loop. Thus, for each iteration of the loop, execution of the first node and the second node may be timed so that the visually indicated timing relationship is satisfied.

In another embodiment, the user may specify a timing relationship between a node in the loop and the loop itself. For example, the user may specify that execution of a first node should begin 50 ms after each iteration of the loop begins. For example, this may be indicated by a timing wire similarly as described above, where one end of the timing wire is connected to the loop border and the other end is connected to the first node.

In one embodiment, a timing relationship between a first node and a second node may be dynamically modified during execution of the graphical program. For example, where a time interval of 15 ms is originally specified between an execution point of a first node and an execution point of a second node, the interval may be dynamically increased to 20 ms. For example, the graphical program may include graphical source code operable to dynamically determine the actual timing of nodes that occurs during execution of the graphical program and dynamically adjust various timing relationships as necessary so that the graphical program executes with the proper timing. As another example, the actual time interval that occurs between two execution points of two nodes may be dynamically determined, and the execution period of a timed loop in the graphical program could be dynamically set to this time interval.

BRIEF DESCRIPTION OF THE DRAWINGS

A better understanding of the present invention can be obtained when the following detailed description of the preferred embodiment is considered in conjunction with the following drawings, in which:

FIG. 23 illustrates an expanded chart showing operation of the timed loop for additional late modes;

Figure 1:
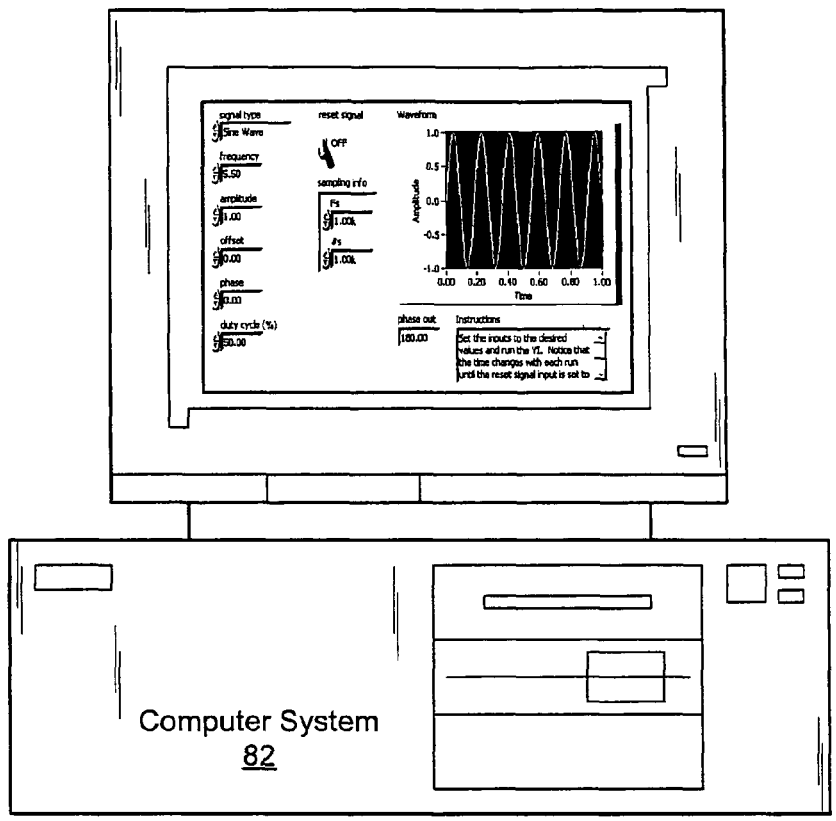
FIG. 1 illustrates an exemplary computer system operable to create and/or execute a graphical program that includes one or more timed loops.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation By Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 09/976,726 titled, "System and Method for Enabling a Graphical Program to Respond to User Interface Events," filed Oct. 12, 2001.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDS) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, Vis Sim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, Vis Sim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

FIG. 1 illustrates a computer system 82 operable to execute a graphical program. In various embodiments, timing of loops, nodes, or other elements within the graphical program may be configured in various ways, as described in detail below. For example, in one embodiment the graphical program may include one or more timed loops, as described below with reference to FIG. 5. In another embodiment the graphical program may be configured to satisfy a timing relationship between a first node and a second node, as described below with reference to FIG. 10. In another embodiment the graphical program may include a plurality of timed loops, wherein the timed loops utilize timing sources that are related to or derived from each other, as described below with reference to FIG. 19.

As shown in FIG. 1, the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

Figure 1A:
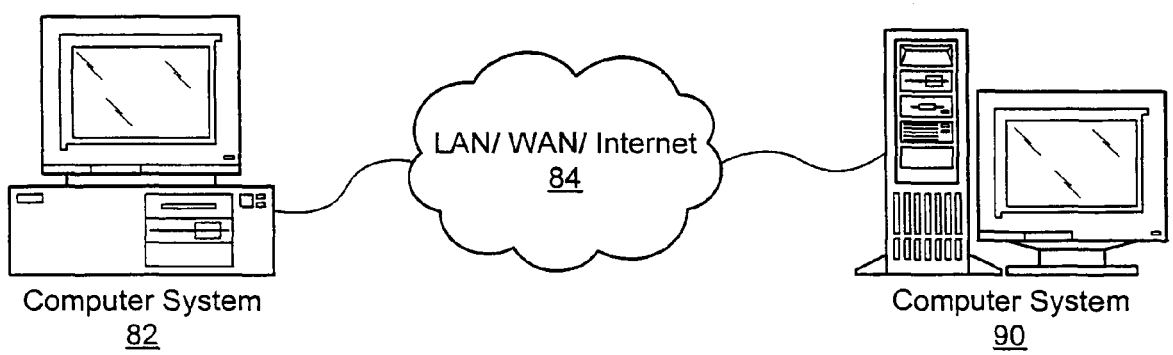
FIG. 1A illustrates an embodiment in which the computer system of FIG. 1 is coupled to another computer system via a network.

As shown in FIG. 1A, in one embodiment the computer system 82 may be coupled to another computer system 90 via a network. The computer systems 82 and 90 may operate together to perform various operations described herein.

The computer system 82 may include a memory medium(s) on which one or more computer programs or software components according to one embodiment of the present invention may be stored. For example, the memory medium may store one or more graphical programs configured as described below. Also, the memory medium may store a graphical programming development environment application used to create such graphical programs and/or an execution subsystem used to execute the graphical programs. The memory medium may also store operating system software, as well as other software for operation of the computer system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, graphical programs as described herein may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
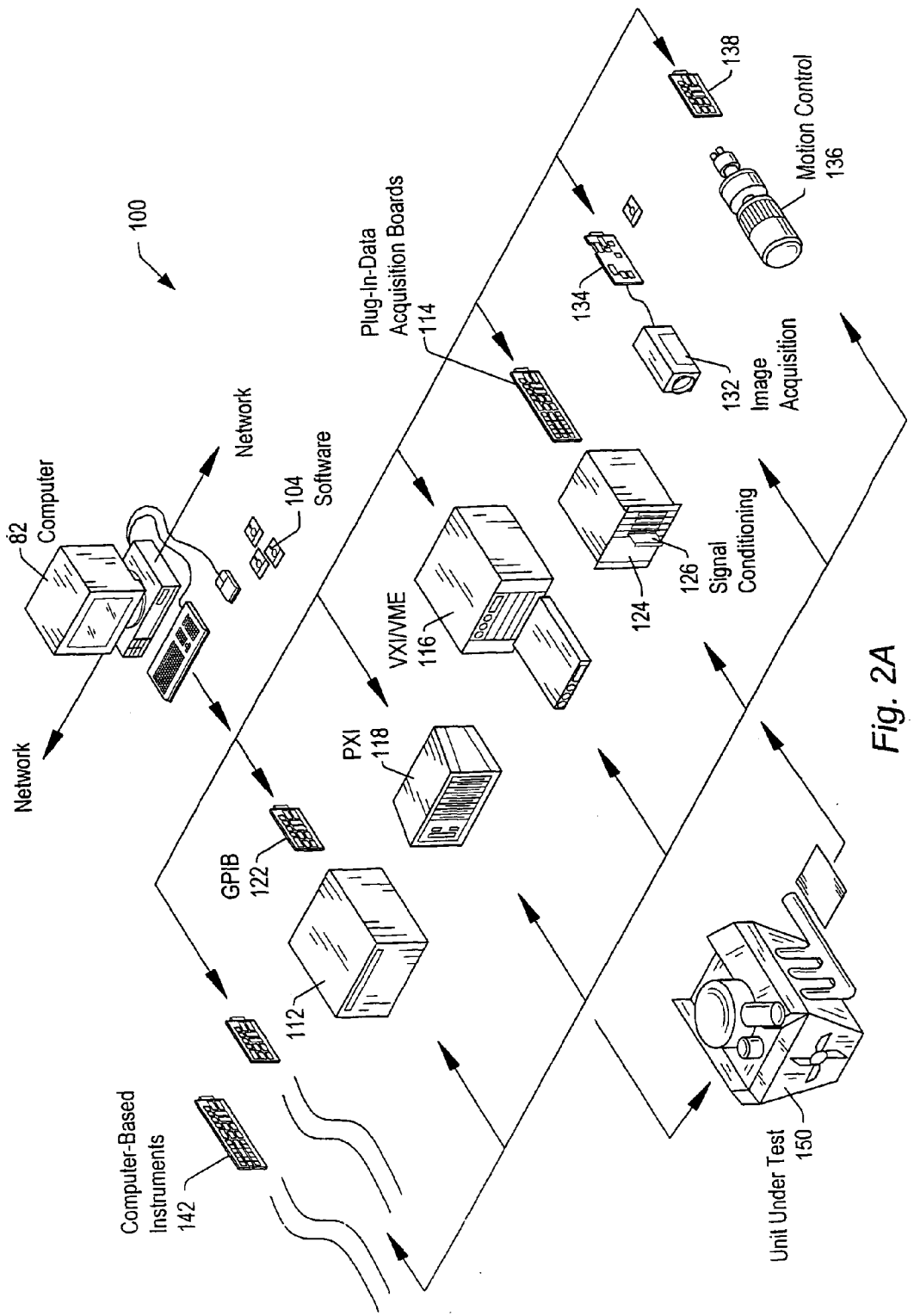
FIG. 2A illustrates an instrumentation control system according to one embodiment.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown.

The computer 82 may operate with the one or more instruments to analyze, measure or control a unit under test (UUT) or process 150. In one embodiment the computer 82 may execute a graphical program involved with the instrumentation control system 100, where timing of elements within the graphical program has been configured according to one or more of the methods described below.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among other types of applications.

Figure 2B:
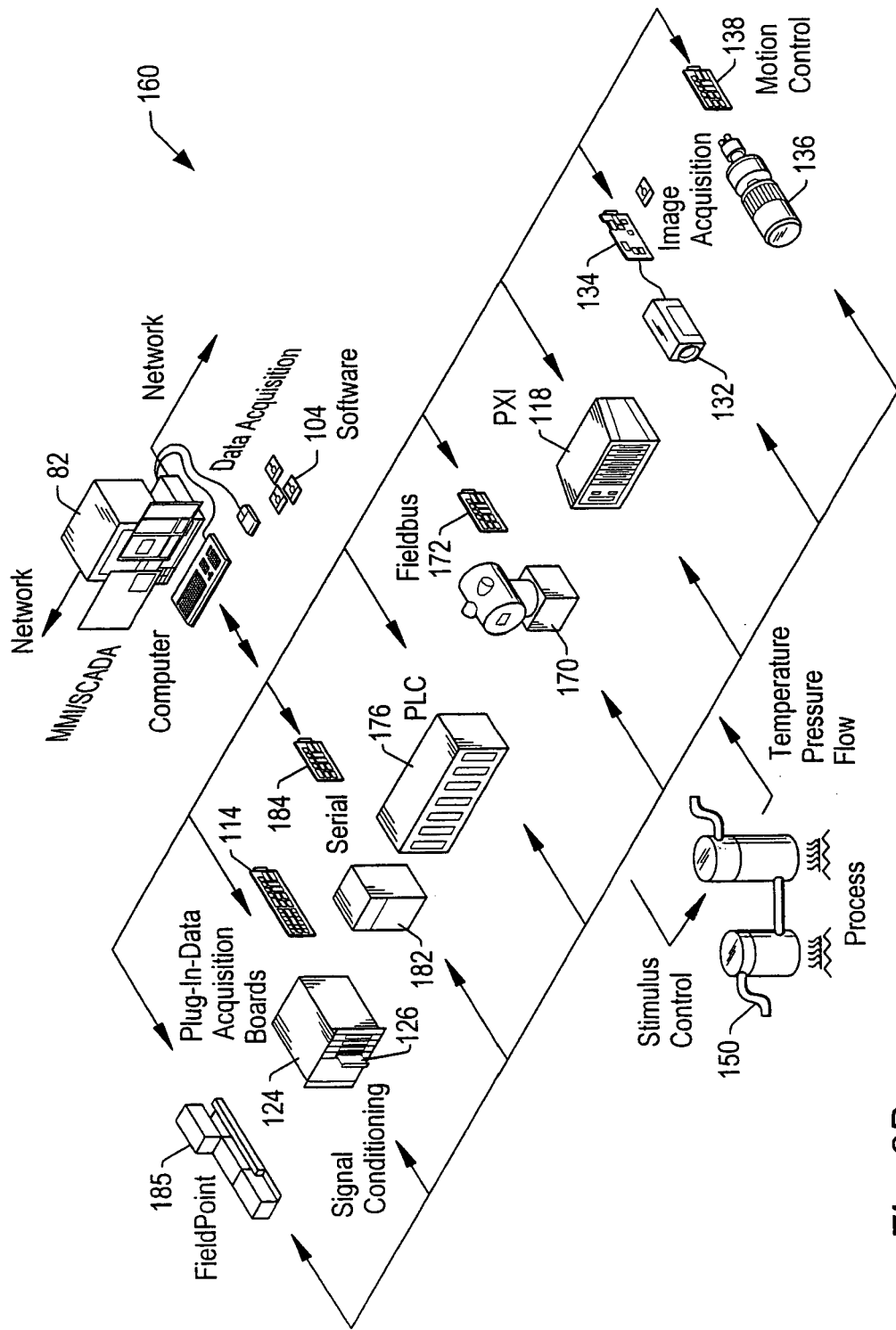
FIG. 2B illustrates an industrial automation system according to one embodiment.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown.

The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment the computer 82 may execute a graphical program involved in performing the automation function, where timing of elements within the graphical program has been configured according to one or more of the methods described below.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
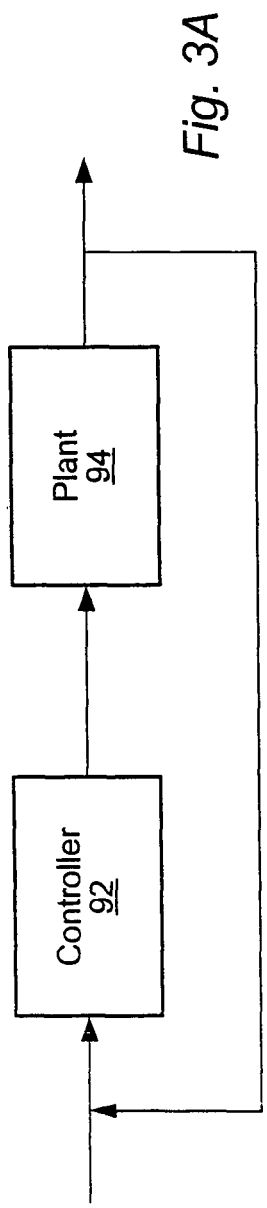
FIG. 3A is a high level block diagram of an exemplary system which may execute or utilize a graphical program that includes a timed loop.

FIG. 3A is a high level block diagram of an exemplary system which may execute or utilize a graphical program that includes a timed loop. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) The user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92. In one embodiment, timing of the graphical program may be configured according to one or more of the methods described below.

Figure 3B:
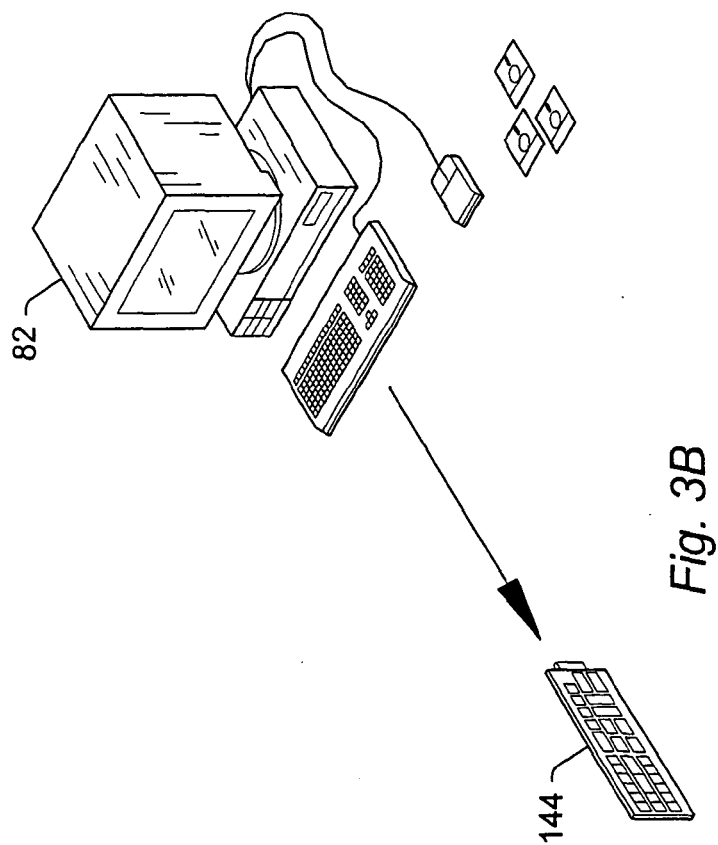
FIG. 3B illustrates an exemplary system which may perform control and/or simulation functions utilizing a graphical program that includes a timed loop.

FIG. 3B illustrates an exemplary system which may perform control and/or simulation functions utilizing a graphical program that includes a timed loop. As shown, the controller 92 may be implemented by a computer system 82 or other device 144 (e.g., including a processor and memory medium and/or including a programmable hardware element) that executes or implements a graphical program. In a similar manner, the plant 94 may be implemented by a computer system 82 or other device 144 (e.g., including a processor and memory medium and/or including a programmable hardware element) that executes or implements a graphical program, or may be implemented by a real physical system, e.g., a car engine.

In one embodiment, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system 82 or other device 144. The computer system 82 may be a platform that supports real time execution, e.g., a device including a processor that executes a real-time operating system (RTOS), or a device including a programmable hardware element.

In one embodiment, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 believe that it is connected to a real plant, e.g., a real engine.

In the embodiments of FIGS. 2A, 2B, and 3B above, one or more of the various devices may couple to each other over a network, such as the Internet, an Intranet, or a LAN. In one embodiment, the user operates to select a target device from a plurality of possible target devices for programming or configuration using a graphical program. Thus the user may create a graphical program on a computer and use (execute) the graphical program on that computer or may deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A, 2B, and 3B, may be referred to as virtual instruments.

Figure 4:
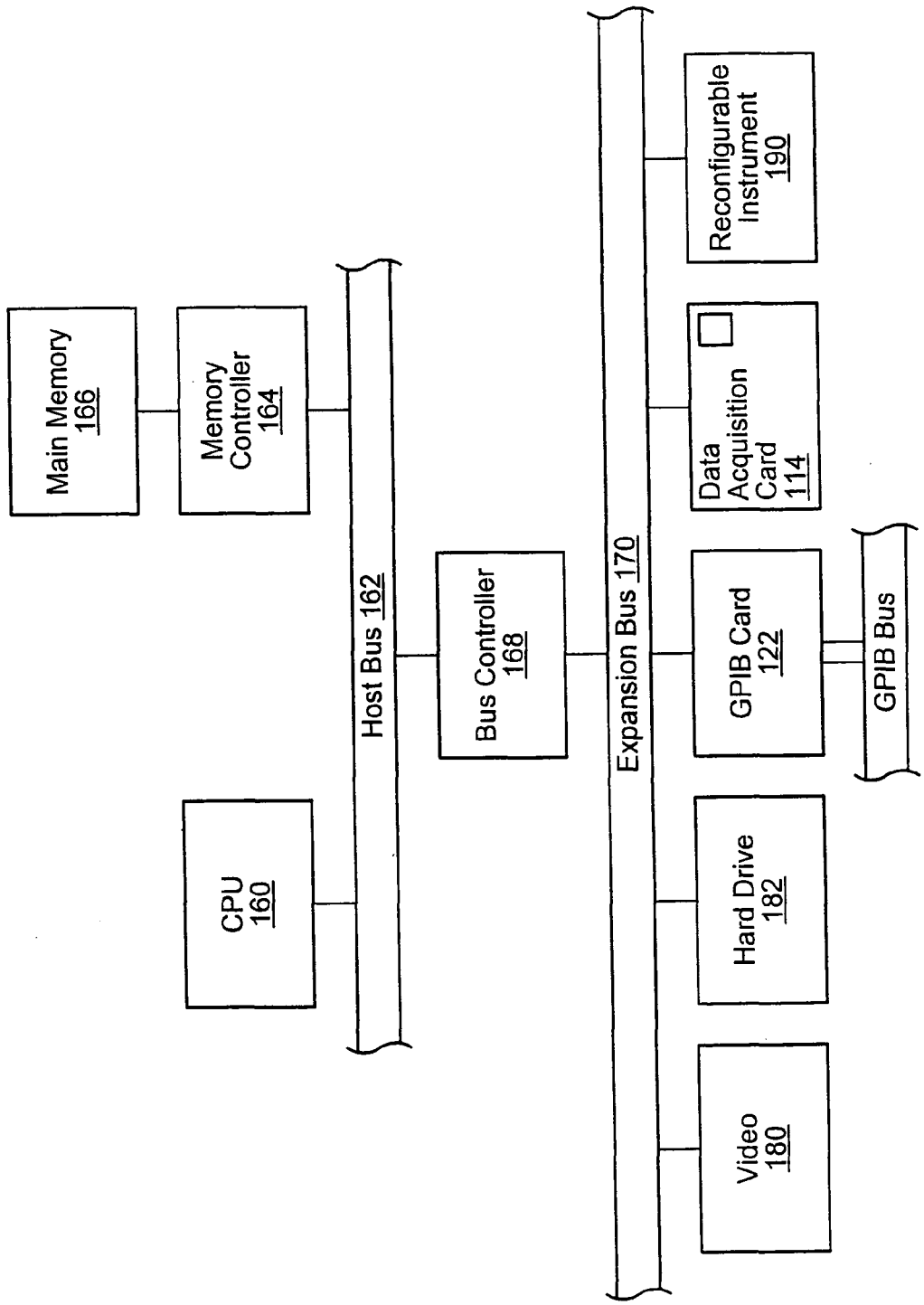
FIG. 4 is an exemplary block diagram of the computer system illustrated in FIGS. 1, 1A, 2A, 2B, and 3B.

FIG. 4—Computer System Block Diagram

FIG. 4 is a block diagram representing one embodiment of the computer system 82 illustrated in FIGS. 1, 1A, 2A, 2B, or 3B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a graphical program configured with timing according to one or more of the methods described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. In the illustrated embodiment, the computer 82 further comprises a video display subsystem 180 and hard drive 182 coupled to the expansion bus 170.

As shown, a device 190 may also be connected to the computer. In one embodiment the device 190 may include a processor and memory which execute a real time operating system. In another embodiment the device 190 may also or may instead include a programmable hardware element. In one embodiment the computer system 82 may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code that was generated from either the graphical program or from text code that in turn was generated from the graphical program.

FIG. 5—Timed Loop

Figure 5:
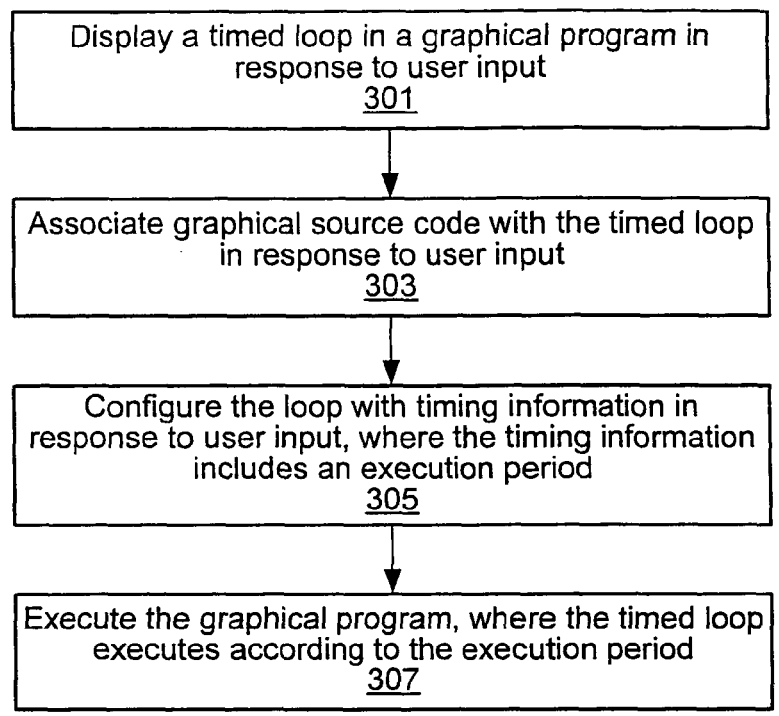
FIG. 5 is a flowchart diagram illustrating one embodiment of a method for creating a graphical program operable to execute a timed loop.

Many computerized applications require operations to be performed with precise timing. In particular, many operations need to be performed as a loop (i.e., need to be performed repetitively for multiple iterations), where each iteration of the loop is precisely timed. Other operations need to be performed as a loop where each iteration of the loop is triggered by an event being generated. An entity referred to herein as a timed loop may enable these behaviors to be implemented for a graphical program. FIG. 5 is a flowchart diagram illustrating one embodiment of a method for creating a graphical program operable to execute a timed loop. As described below, the user may be able to specify various aspects of the timing of the timed loop. It is noted that FIG. 5 illustrates a representative embodiment, and alternative embodiments are contemplated. Also, various elements may be combined, omitted, or performed in different orders. The method shown in FIG. 5 may be used in conjunction with any of the systems or devices shown in the above Figures, among other systems and devices.

The graphical program may be created in response to user input, e.g., the user may create the graphical program by placing or "dragging and dropping" icons or nodes on the display and interconnecting the nodes in a desired fashion. In response to the user assembling the graphical program, data structures may be created and stored which represent the graphical program. The nodes or icons may be interconnected in one or more of a data flow, control flow, or execution flow format. The graphical program may thus comprise a plurality of interconnected nodes or icons that visually indicate the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

Figure 6:
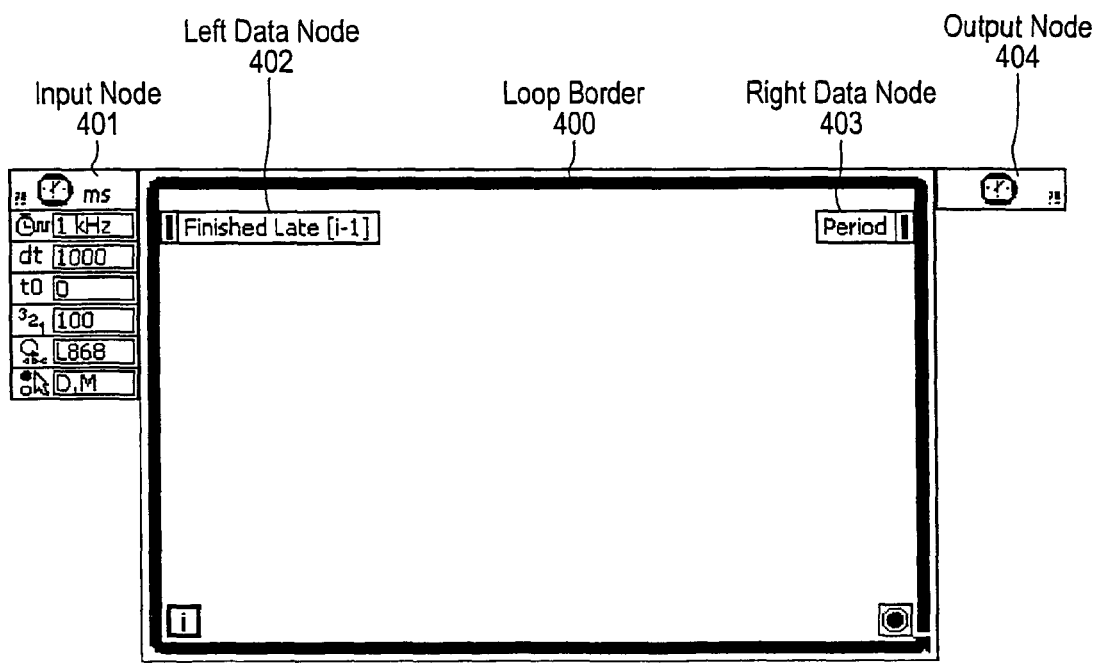
FIG. 6 illustrates an exemplary icon which intuitively represents a timed loop.

According to one embodiment, the timed loop may be represented as a particular node or icon in the graphical program. Thus, as shown in 301 of FIG. 5, a timed loop may be displayed in the graphical program in response to user input. For example, during the process of assembling the graphical program as described above, the user may cause the timed loop to be included in the graphical program by selecting a particular timed loop node or icon from a palette, issuing a menu command to display the timed loop, etc. In various embodiments the user may perform any of various actions to cause the timed loop to be displayed or included in the graphical program. Also, the timed loop may have any kind of visual appearance within the graphical program. FIG. 6 illustrates one exemplary icon that intuitively represents a timed loop.

As described above, the loop may represent a portion of the graphical program which is executed repetitively during execution of the graphical program. Thus, in 303 the graphical source code (i.e., one or more nodes) to be executed repetitively may be associated with the timed loop in response to user input. In various embodiments the graphical source code may be associated with the timed loop in various ways. For the exemplary timed loop of FIG. 6, the graphical source code may be associated with the timed loop by placing it inside the loop border 400. Thus, the user may position one or more nodes or icons within the loop border 400, such as function nodes, sub-program nodes, etc. During execution of the graphical program, the nodes or icons within the loop border 400 may be executed at each iteration of the timed loop. The nodes or icons within the loop border 400 may also be interconnected similarly as other nodes in the graphical program to indicate data flow, control flow, and/or execution flow.

Figure 7:
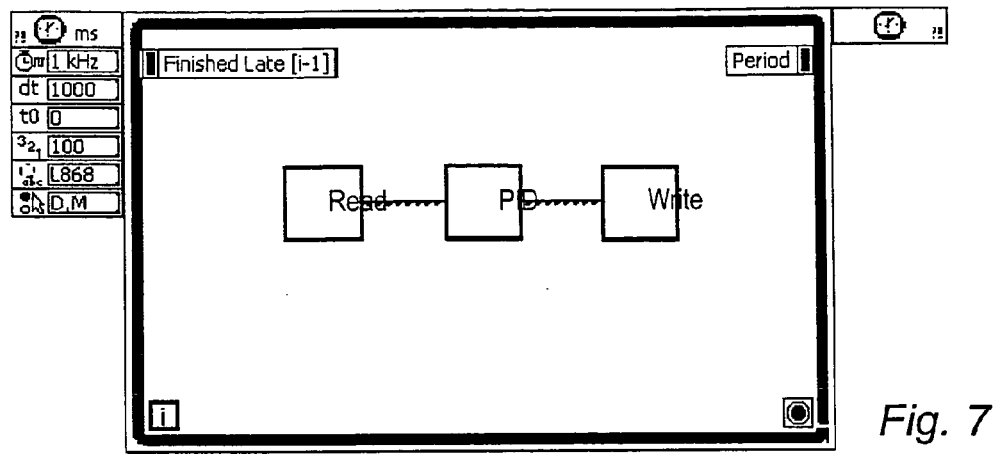
FIG. 7 illustrates a simple example in which three nodes have been included within the border of a timed loop.

FIG. 7 illustrates a simple example in which three nodes have been included within the border of a timed loop node. The three nodes are interconnected to indicate data flow among the nodes. For each iteration of the timed loop, the "Read" node executes to read data from a hardware device. The "PID" node then executes to process the data. The "Write" node then executes to write the processed data to a hardware device.

In other embodiments, the graphical source code to be executed at each iteration of the timed loop may be associated with the timed loop in other ways. For example, in one alternative embodiment, the timed loop may have a separate block diagram which can be viewed separately from the main block diagram in which the timed loop node or icon is displayed. The user may arrange and interconnect nodes on the timed loop's block diagram similarly as for the main block diagram. During execution of the graphical program, nodes on the timed loop's block diagram may be executed at each iteration of the timed loop. In another embodiment, the timed loop may be configured with a reference to a portion of code to be executed at each iteration of the timed loop, and this portion of code may be created or stored separately from the graphical program in which the timed loop node or icon is included.

In 305 the timed loop may be configured with timing information in response to user input. In one embodiment the timing information may include an execution period which specifies a desired period at which the timed loop should execute during execution of the graphical program. In one embodiment the execution period controls the time at which execution begins for each iteration of the timed loop. For example, if the execution period is 100 ms, then iteration N of the timed loop may begin at time T, iteration N+1 may begin at time T+100 ms, iteration N+2 may begin at time T+200 ms, etc.

In one embodiment the execution period for the timed loop may be based on a particular timing source. The user may specify a timing source to associate with the timed loop, where the timing source comprises an entity useable as a source of timing and scheduling for the timed loop. The timing of the timed loop may be based on a periodic signal or pulse provided by the timing source. In one embodiment, the units for the execution period of the timed loop may be based on the timing source. For example, the user may simply specify a period of "100", without specifying a time unit. This may signify that a new iteration of the timed loop should begin at every 100th tick or pulse of the timing source. For a 1 kHz timing source, this may correspond to a period of 100 ms. For a 1 MHz timing source, this may correspond to a period of 100 µs. In another embodiment, the user may specify both a number of ticks and the desired units, e.g., may directly specify a period of 100 ms.

In various embodiments, the timed loop may be configured with any kind of timing source. One example of a timing source that may be used to control timing of the timed loop is a 1 kHz system clock provided by a PC computer system, such as the computer system 82 discussed above. Another example is the 1 MHz timer of RIO hardware boards from National Instruments Corp. In another embodiment the timing source may be based on internal countdown registers of the processor of the computer system that executes the graphical program. For example, in one embodiment countdown registers of a Pentium processor may be utilized as a 1 MHz timing source. In other embodiments, any of various other kinds of timing sources may be utilized. Examples of other timing sources include analog input/analog output (AI/AO), counter (CTR), and digital IO (DIO) ports on DAQ or other hardware boards.

In one embodiment, the ticks or pulses of a timing source may not occur at regular intervals in time. Thus, the timing of loop iterations may be controlled relative to ticks or pulses of the timing source, but the iterations may or may not occur at regular intervals in time. For example, in one embodiment the timing of the iterations of the timed loop may be based on an event, where the event may or may not be generated at regular intervals in time. For example, in one embodiment, configuring the timed loop with timing information may comprise associating one or more events with the timed loop in response to user input. When an event associated with the timed loop is generated during execution of the graphical program, an iteration of the timed loop may occur in response. In other words, the graphical source code associated with the timed loop may execute each time one of the associated events is generated. Thus, in this embodiment, the generation of an event associated with the timed loop may constitute a tick or pulse of the timing source for the timed loop. For some applications, it may be desirable to base the timing of a process performed by the graphical program on the generation of an event in this manner, e.g., to configure the graphical program to perform an action or process each time a particular event is generated.

In one embodiment the timed loop may be configured to iterate in response to each occurrence of the event(s) associated with the timed loop, i.e., a new iteration of the timed loop may begin each time the associated event is generated. In another embodiment, the timed loop may be configured to iterate only after the event has been generated a certain number of times. For example, where an event A has been associated with or specified as the timing source for the timed loop, the user may specify an execution period of 50 to signify that a new iteration of the timed loop should begin every 50th time the event A is generated.

In various embodiments, any kinds of events may be associated with or specified as the timing source for the timed loop, including software-generated or software-based events and/or hardware-generated or hardware-based events. In one embodiment, one or more events associated with or generated by hardware devices may be associated with the timed loop. Thus, the timed loop may iterate in response to an event being generated by a hardware device during execution of the graphical program. As one example, the graphical program may perform a measurement function and may include a timed loop configured to iterate in response to each instance of an event generated by a data acquisition device. Other examples of events that may be associated with the timed loop include interrupts, system events, timer events, etc.

In another embodiment one or more events associated with network operation may be associated with the timed loop. For example, the timed loop may be configured to wake up or iterate in response to packet arrival event being generated, where the packet arrival event indicates that a network packet has been received. As other examples, the timed loop may be configured to iterate in response to a buffer full event, where the buffer full event indicates that a network buffer is full, or the timed loop may be configured to iterate in response to other kinds of buffer-based events, such as a buffer empty event or a buffer half-full event.

In another embodiment, one or more user interface events may be associated with the timed loop. The graphical program may have a graphical user interface that includes a plurality of user interface elements. Various user interface events may be associated with the user interface elements on the graphical user interface. For example, user interface events may be generated in response to user actions performed on the graphical user interface, such as clicking a button, invoking a menu, typing into a string control, etc. Thus, the timed loop may be configured to iterate in response to any of various kinds of user interface events.

In one embodiment, the events associated with the timed loop may be events that are internal to the graphical program or internal to a graphical programming development environment with which the graphical program is associated. For example, the events may include user interface event associated with a native user interface control on the graphical program's user interface. In another embodiment, one or more events that are external to the graphical program or external to the graphical programming development environment may be associated with the timed loop. For example, events such as ActiveX events or .NET events may be associated with the timed loop. As another example, DAQ events or events generated by hardware devices may be associated with the timed loop, as noted above.

Thus, in various embodiments the user may associate any kind of timing source with the timed loop for acting as a trigger for iterations of the timed loop, where the timing source may or may not cause iterations of the loop to occur at regular time intervals. In one embodiment, the user may also specify a timing source name to identify a particular instance of the timing source associated with the timed loop (described below).

In one embodiment the graphical programming development environment may enable users or vendors to construct their own timing sources. For example, an interface to which a timing source must comply may be defined, and users or vendors may create a timing source component or module that implements this interface. Ticks or pulses of the timing source (or events generated by the timing source) may be based on any arbitrary hardware or software function. The timed loop structure may be abstracted from the timing source, e.g., may simply receive notification of ticks or events generated by the timing source but may not have any knowledge about what causes these ticks or events. This abstraction may facilitate the use of a plug-in framework in which users or vendors may plug-in or utilize custom timing sources that they create.

As an example, a third-party vendor of a particular measurement device may want users of the graphical programming development environment to be able to utilize the measurement device, and in particular may want users to be able to control the timing of a loop based on an event generated by or based on a hardware function of the measurement device. Thus, the vendor may create custom code that implements the interface defined for timing sources, where the custom code is operable to generate ticks or events based on the operation of the measurement device. The vendor may provide the custom timing source to users, e.g., as a software component or module, so that the users can use the timing source to control timed loops in their graphical programs.

Referring again to 305 of FIG. 5, in one embodiment the timed loop may also be configured with an offset. The offset may specify the amount of time (or the number of ticks or events generated by the timing source) by which to delay the execution of the first iteration of the timed loop. Units for the offset may be based on the timing source, similarly as described above. For example, if the user specifies an offset of 30 and a period of 100, and if the timing source for the timed loop is a 1 KHz clock, then the first iteration of the timed loop may begin executing at time T=30 ms, and subsequent iterations may begin executing at times of 130 ms, 230 ms, 330 ms, etc. As described below, a timing source may effectively start when all the timed loops that utilize the timing source are ready to execute. I.e., time T=0 may occur as soon as all the timed loops that utilize the timing source are ready to execute. The offset specified for a timed loop may refer to an offset from the time when the timing source effectively starts, i.e., an offset from time T=0.

If the graphical program includes multiple timed loops, the loop offset values can be used to synchronize the timed loops or align their phases. For example, the user can configure two timed loops to use the same instance of a timing source by specifying the same name for the timing source in the configuration dialog for each timed loop, e.g., by specifying the same name in the "Source name" field of the configuration dialog of FIG. 8. For example, the user can specify an offset of 0 for one timed loop and an offset of 100 for another timed loop. If the two timed loops have the same period then each Nth pair of iterations of the timed loops may be separated by 100 ticks of the timing source. For example, if the period is 150 then the first timed loop may iterate at times T=0, T=150, T=300, etc., and the second timed loop may iterate at times T=100, T=250, T=400, etc.

In one embodiment, the timed loop may also be configured with a priority. In one embodiment the graphical program may include multiple timed loops, and the priority values of the timed loops may be used in prioritizing execution of the timed loops. The priority of each timed loop specifies when the timed loop executes relative to other timed loops. Priority settings may be utilized to create applications with multiple tasks that can preempt each other in the same graphical program. In various embodiments, any desired priority system may be utilized. In one embodiment the higher the value the user specifies for the priority of a timed loop, the higher the priority the timed loop has relative to other timed loops in the graphical program. In one embodiment, priorities may range from 1 to 2,147,480,000.

In one embodiment one or more nodes, e.g., sub-program nodes, in the graphical program may be configured to execute at a time-critical priority. In one embodiment timed loops may execute at a priority below the time-critical priority but above high priority, which means that timed loops may execute in the data flow of the block diagram ahead of any node not configured to run at a time-critical priority.

In one embodiment the timed loop may also be configured with a timeout value. As described above, in one embodiment the timed loop may be configured to wake up and perform a loop iteration in response to an event being generated. However, it is possible that the event that is supposed to trigger an iteration of the loop to execute may never be generated or may not be generated within an expected time frame. Thus, the loop may effectively be stuck waiting for an event that never happens or happens late. The user may specify a timeout value, e.g., a value in milliseconds, to handle this situation. In one embodiment, if the loop is not normally awakened before the timeout value elapses (e.g., as measured from the time the last iteration of the loop finished executing) then the loop may be awakened due to expiration of the timeout. As described below, in one embodiment the timed loop may be passed a "wakeup reason" each time an iteration of the loop begins executing, i.e., a data item indicating the reason the iteration of the timed loop began executing. In this situation the timed loop may be passed a wakeup reason indicating that the reason the loop iteration began is that the timeout expired. The user may include graphical source code in the timed loop to evaluate the wakeup reason and take appropriate action in the case of a timeout.

In various embodiments the timed loop may be configured with the timing information in 305 in any of various ways. In one embodiment, the timed loop may include one or more terminals to which the user can connect a wire(s) specifying the timing information. For example, the timed loop of FIG. 6 includes an input node 401, also referred to as a configuration node 401, to the left of the loop border. The input node 401 includes various terminals to which the user may connect wires to dynamically set the respective properties during execution of the graphical program. For example, the terminal labeled with the "dt" symbol represents the execution period of the timed loop. Thus, the user can connect a wire to this terminal to specify the desired execution period for the timed loop. The input node 401 may also include terminals for connecting wires to dynamically specify the loop's timing source, priority, offset, mode, and other timing information.

Figure 8:
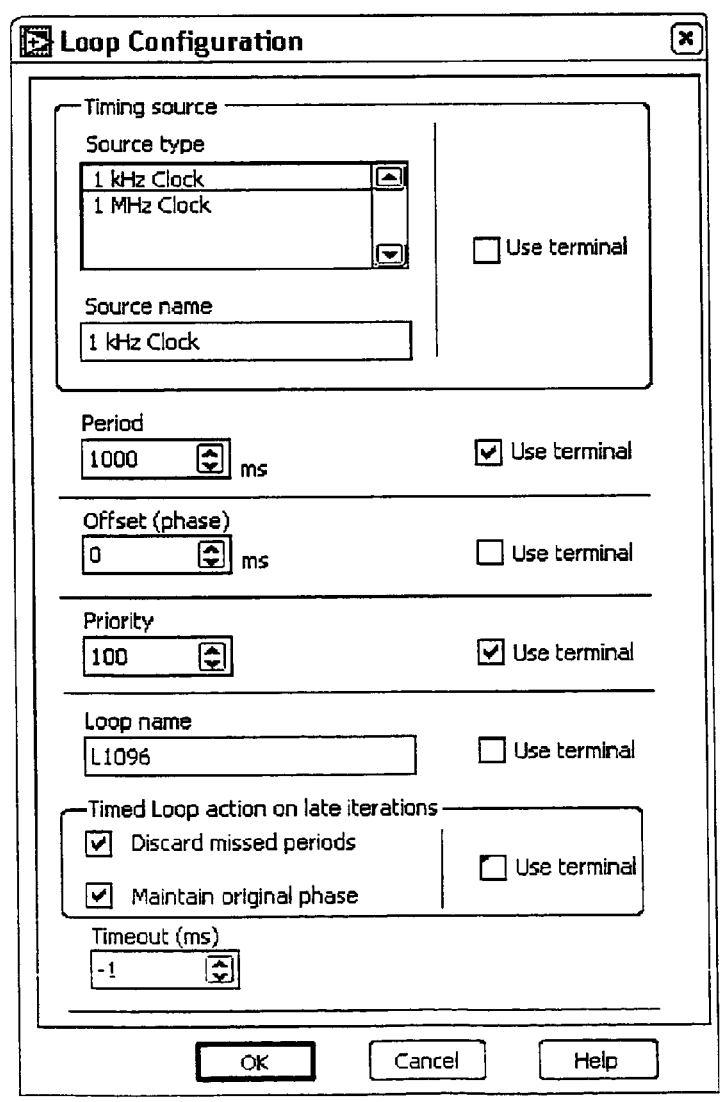
FIG. 8 illustrates an exemplary configuration dialog for setting timing information for a timed loop.

In other embodiments, the user may configure the timing information of the timed loop in other ways. As one example, the user may interact with a dialog box, property page, or wizard to statically configure various properties affecting the timing of the timed loop. For example, the user may invoke a configuration dialog such as illustrated in FIG. 8, e.g., by invoking a "Configure" option on a context menu for the timed loop or configuration node 401 or by double-clicking on the loop border 400 or configuration node 401. The user may then interact with the configuration dialog to specify information such as a timing source, period, offset, priority, or other timing information. In one embodiment the user may utilize the configuration dialog to specify other properties of the timed loop as well, such as a loop name, whether or not to log timing data for the timed loop, a timeout value for the timed loop, a late mode defining behavior of the timed loop on late iterations, etc.

In one embodiment the user may have the option to set properties of the timed loop both statically by using the configuration dialog and dynamically by connecting wires to terminals on the block diagram of the graphical program. For example, checking the "Use terminal" checkboxes on the FIG. 8 configuration dialog may cause the respective terminals to appear in the input node 401 in FIG. 6. The user may then connect wires to the terminals in the input node 401 to cause the respective properties to be set dynamically during execution of the graphical program. In the FIG. 8 example, the "Use terminal" checkboxes for the period and priority are checked. Thus, the user can connect wires to respective terminals for these properties to cause the properties to be set dynamically during execution of the graphical program, whereas other properties regarding timing information for the timed loop are statically configured through the configuration dialog.

If the user configures one or more properties for the timed loop (e.g., the period, priority, offset, etc.) using the configuration dialog then the specified values may appear in the configuration node 401 to the left of the timed loop. This allows the user to see how the timed loop is configured by simply looking at the block diagram of the graphical program, i.e., by looking at the configuration node 401 of the timed loop. In prior graphical programming systems, the user typically cannot see how a loop or other structure node is configured by viewing information directly on the block diagram, but rather is required to invoke a dialog or other window to view the configuration information.

Thus in one embodiment the configuration node 401 may display terminals for specific properties that the user requested (e.g., by checking a "Use terminal" checkbox in a configuration dialog as described above), where the user can connect wires to the terminals to cause the respective properties to be dynamically set. The configuration node 401 may also display values for statically configured properties of the timed loop, where the values were specified using a configuration dialog as described above. For example, the configuration node 401 may include a plurality of displayed rows or fields, where each row or field represents one of the properties of the timed loop. Some of the rows or fields, i.e., the ones corresponding to properties that are set dynamically, may visually indicate that they are terminals to which the user can connect wires. Other rows or fields, i.e., the ones corresponding to properties that are statically configured through the configuration dialog, may simply display the value specified by the user but may not visually indicate that they are terminals to which the user can connect wires.

However, in one embodiment the user may still be able to connect a wire to a row or field corresponding to a property that is statically configured, even though the row or field may not currently include or may not visually indicate a terminal for connecting a wire. The act of connecting a wire to the row or field may cause the row or field to change so that it includes or visually indicates a terminal. Thus, the respective property may be automatically changed from a statically configured property to a property that is dynamically set by data from the connected wire.

In one embodiment the user may also be able to configure how information in the configuration node 401 is displayed. For example, the user may configure the properties shown in the configuration node to be represented either iconically and/or textually. In one embodiment each row or field in the configuration node 401 may by default display a small icon that visually represents the respective property of the timed loop. For example, in the configuration node 401 shown in FIG. 6, a clock icon represents the timing source of the timed loop, a staggered "3, 2, 1" icon represents the priority of the timed loop, etc. The user may be able to request that text names for the properties be displayed in addition to or instead of the icons, e.g., by selecting a menu item from a context menu for the configuration node 401.

Also, in one embodiment the user may be able to specify which properties of the timed loop to show in the configuration node 401. For example, the user may want some of the properties to be displayed and others to be hidden to avoid clutter on the block diagram. In various embodiments the user may be able to specify which properties to show in the configuration node 401 in any of various ways. For example, the user may be able to request that only the properties that are dynamically set, i.e., the ones to which wires are connected, be shown in the configuration node 401, or the user may interact with a dialog box to check boxes to specify which properties to show or hide.

A configuration dialog such as the one shown in FIG. 8 may also enable the user to select a timing source for the timed loop. In the example of FIG. 8, the user has selected to use a 1 kHz PC timer as the timing source. The timing sources that appear in the "Source type" list box in the configuration dialog may depend on the configuration of the user's computer system. For example, if one or more known hardware devices with known timing sources are connected to the computer system then the timing sources of these hardware devices may also appear in the list box. As one example, if a National Instruments RIO hardware board is installed in the computer system then the 1 MHz RIO timer may appear as another timing source that the user can select. As described above, in one embodiment the graphical programming development environment may provide a framework that allows users or third-party vendors to create their own custom timing sources. Any custom timing sources that have been created may be registered with the graphical programming development environment and may appear as timing sources that the user can select in the configuration dialog.

In another embodiment the user may configure a timing source to be dynamically or programmatically set for the timed loop by adding graphical source code to the block diagram of the graphical program, where the graphical source code specifies the timing source. For example, the user may include one or more nodes in the graphical program to set up a timing source from a hardware device and may connect a wire specifying the timing source to a timing source terminal on the input node 401.

As discussed above, in one embodiment one or more events may be associated with the timed loop. Any desired technique may be used to associate the one or more events with the timed loop. In one embodiment, the user may utilize a graphical user interface to associate one or more events with the timed loop, e.g., by interacting with a dialog box or wizard. For example, the graphical user interface may display a list of events and allow the user to select the events of interest. In another embodiment the user may configure the block diagram of the graphical program with information specifying the one or more events, e.g., by connecting one or more wires representing the one or more events to the timed loop.

In one embodiment, the one or more events to associate with the timed loop may be dynamically determined during execution of the graphical program. Also, the one or more events may be dynamically associated with the loop during execution of the graphical program, or the events associated with the timed loop may be dynamically changed. In one embodiment, a registration node (or nodes) may be included in the block diagram of the graphical program. The registration node may be executed to dynamically register an event with the timed loop. Similarly, the graphical program may include one or more nodes operable to dynamically un-register an event or dynamically change the events associated with the timed loop.

Occasionally, an iteration of a timed loop might execute later than the time specified by the user. For example, the timed loop may be configured with an execution period of 10 ms, but an aberrant condition or preemption by another timed loop may cause a particular iteration of the timed loop to take longer than 10 ms to complete, thus causing the next iteration of the loop to be late. For different applications it may be desirable for the timed loop to behave in different ways when late iterations occur. In one embodiment the user may be able to specify different modes to determine how the timed loop handles late iterations.

In one embodiment, the user may be able to specify the following options for handling late iterations of a timed loop:
  Execution of the timed loop can be aligned with the originally established schedule
  A new schedule that starts at the current time can be defined
  The timed loop can process the missed iterations
  The timed loop can skip any missed iterations
  For example, if the user specifies a period of 100 ms and an offset of 30 ms for the timed loop then the first loop iteration is expected to begin execution 30 ms after the first timing source starts running and in multiples of 100 ms after that, i.e., at 130 ms, 230 ms, 330 ms, etc. However it is possible, for example, that the first loop iteration occurs late, e.g., due to data flow necessary for the timed loop to begin taking longer than necessary to reach the timed loop in the block diagram of the graphical program. For example, the timed loop may not be ready to begin execution until 240 ms have elapsed.

Because other timed loops or hardware devices might already be running at the schedule originally specified, the user might want to align the late timed loop with the already running global schedule, which means the timed loop should align itself as quickly as possible with the originally specified schedule. In this case, the first loop iteration would begin execution at 330 ms, and subsequent iterations would continue to run at multiples of 100 ms, i.e., at 430 ms, 530 ms, etc.

However, if aligning the timed loop with other timed loops or other hardware devices is not important then the user may want the timed loop to begin execution as soon as possible and use the current time as its actual offset. In this case, the first loop iteration would begin execution at 240 ms, and subsequent loop iterations would begin at 340 ms, 440 ms, etc.

In some applications, if an iteration of the timed loop occurs late then the timed loop might miss data generated by other timed loops or hardware devices. In one embodiment a buffer may hold data from the missed iterations. In one embodiment the user may want the timed loop to process the missed data before it aligns with the schedule specified. However, a timed loop that processes the missed data may cause jitter, which is the amount of time that a loop cycle time varies from the specified schedule. Thus, in some applications the user may not want the timed loop to process the missed data. If the user does not want to process the missed data, the timed loop can ignore older data in the buffer that the loop iterations missed and process only the latest data, such as the data available at the next iteration and subsequent iterations.

In one embodiment the user may specify late mode options for handling late timed loop iterations such as described above by using a configuration dialog to statically configure the late mode options. For example, the "Timed Loop action on late iterations" section of the configuration dialog illustrated in FIG. 8 allows the user to specify various options. In one embodiment the timed loop may by default discard any data generated during missed iterations and maintain the originally specified schedule. For this mode setting, the icon for the "Mode" property of the configuration node 401 may appear with a "D" for discard and an "M" for maintain, as illustrated in FIG. 6. The user can remove the checkmark from the "Discard missed periods" checkbox in the configuration dialog to cause the timed loop to instead process data generated by missed or late loop iterations. For this mode setting, the icon for the "Mode" property of the configuration node 401 may appear with a "P" for process. The user can remove the checkmark from the "Maintain original phase" checkbox in the configuration dialog to configure the timed loop to execute on a new schedule based on the execution time of the first iteration of the timed loop.

In one embodiment, the late mode options for handling late timed loop iterations may also be configured dynamically or programmatically. For example, the user may connect a wire to the "Mode" property of the configuration node 401, where the wire specifies the desired late mode options. It is noted that in other embodiments the timed loop may be configured to behave according to late modes other than those described above. The section below titled, "Modes Defining Behavior for Late Timed Loop Iterations" describes several other late modes in addition to the ones discussed above.

As described above, an iteration of the timed loop that takes longer than the loop's execution period to complete may cause the next iteration of the loop to begin late. Thus, in one embodiment the concept of an iteration being late may be based on the execution period of the timed loop. In one embodiment it may also be desirable to define a separate deadline to define lateness, where the deadline is different than the loop's execution period. For example, the timed loop may have an execution period of 200 µs, but the user may specify a deadline of 80 µs for the timed loop. Thus, any iteration that takes longer than 80 µs to complete may overrun the deadline and thus finish late. For some applications it may be desirable to ensure that loop iterations complete within a defined deadline that is shorter than the execution period.

As described below, in one embodiment the system may be operable to log timing data for the timed loop and present a graphical user interface that allows the user to view the timing data. Loop iterations that overrun the timed loop's deadline may be visually indicated or flagged to make the user aware of the problem. The user may then make adjustments as necessary, e.g., by giving the timed loop a higher priority, changing the functions performed by the loop to make it run faster, or changing other parts of the graphical program so that they do not expect iterations of the timed loop to complete within such a short deadline.

Referring again to FIG. 5, in 307 the graphical program may be executed. In various embodiments the graphical program may be executed on any kind of computer system(s) or reconfigurable hardware, as described above. As one example, the graphical program may be executed on a computer system 82 such as described above with reference to FIGS. 1, 1A, 2A, 2B, and 3B.

The time at which the first iteration of the timed loop begins may depend on the relation of the timed loop to other nodes in the graphical program. In one embodiment the timed loop may begin executing immediately. In another embodiment, other nodes may have to execute first before the timed loop can begin execution. For example, in a data flow graphical program, other nodes may need to execute first to produce data used by the timed loop, such as data to set timing information for the loop, e.g., data for wires connected to terminals of the input node 401 of the timed loop. Thus, in one embodiment one or more ticks of the timing source for the timed loop may occur, or one or more instances of events associated with the timed loop may be generated, without these ticks or events causing the graphical source code associated with the timed loop to execute or without these ticks or events being counted toward the offset value specified for the timed loop. In other words, the ticks or event(s) associated with the timed loop may cause the timed loop to iterate only after the timed loop is ready for execution. Thus, with respect to timing of the timed loop, the timing source for the timed loop may effectively "start" when the timed loop is ready for execution, even though actual ticks or events associated with the timing source may occur before then.

Once the timed loop begins execution, the timing source and execution period of the timed loop may control the rate at which the timed loop executes. Ticks or pulses of the timing source may occur during execution of the graphical program, or an event associated with the timed loop may be generated multiple times during execution of the graphical program. As described above, the timed loop may be configured to iterate based on the ticks or based on the generated events, e.g., a new iteration of the timed loop may begin in response to each Nth tick of the timing source or in response to every Nth time the associated event is generated. At each iteration of the timed loop, the graphical source code associated with the timed loop may be executed, as described above with reference to 303. The graphical source code associated with the loop may be operable to perform any desired operation.

In one embodiment the graphical program may include multiple timed loops that can execute concurrently. The multiple timed loops may enable the graphical program to perform multiple timed activities and control the timing for each activity. The priorities of the respective loops may be utilized to implement a preemptive execution model. In one embodiment, the highest priority loop which is ready to execute may preempt all lower priority loops. In one embodiment each timed loop may be executed as a separate thread.

Different timed loops may utilize different timing sources, or multiple timed loops may utilize the same timing source. As noted above, in one embodiment the user may specify a source name for the timing source of a loop to identify a particular instance of the timing source. If two timed loops are configured with the same source name for the same timing source, then both loops may share the same instance of the timing source. In this case, timing information such as the offset for each loop is relative to the same starting point. However, two timed loops with different names for the same timing source may be governed by different instances of the timing source. In this case, timing of the two timed loops may be independent.

The functionality of receiving notification of the generated events or ticks of the timing source and causing a timed loop to iterate in response may be implemented in any way, e.g., depending on the particular graphical programming development environment used to create the graphical program and depending on the particular type of timing source or events. For example, in one embodiment, the graphical program may execute under the management of an execution subsystem of the graphical programming development environment, and the execution subsystem may intercept events as they are generated and may invoke execution of the graphical source code associated with the timed loop. The execution subsystem may interface with other software on the computer system to intercept or receive notification of the ticks or events associated with the timed loop. As one example, where the timed loop is configured to iterate in response to an event generated by a data acquisition (DAQ) device, the execution subsystem may interface with DAQ software to receive notification of the event.

In one embodiment the execution subsystem may include a timed loop scheduler that manages the execution of timed loops. Based on the timing source type and hardware capability, all or some of the events associated with a timed loop may generate interrupts that notify the timed loop scheduler that an event or a timeout occurred. The timed loop scheduler may handle the interrupt, check the list of timed loops associated with the timing source, and trigger a new iteration of a timed loop if necessary. If there are multiple timed loops, the timed loop scheduler may use the priority value of the timed loop that is triggered to determine if the timed loop should preempt a currently executing loop iteration of another timed loop. The timed loop scheduler may also control which timed loop continues its execution after the currently executing timed loop finishes its iteration. The scheduler may also reconfigure a hardware component of the timing source for the next notification.

In another embodiment, the graphical program may not execute under an execution subsystem of the graphical programming development environment, but may execute independently. In this case, for example, when executable code for the graphical program is created, code operable to intercept or receive notification of the events may be linked in with the graphical program.

In various embodiments, a timed loop may stop executing in response to any of various conditions. In one embodiment, the timed loop may include a portion of graphical source code that is executed at each iteration of the timed loop, where the graphical source code represents logic to control whether or not the timed loop continues executing. For example, if the logic evaluates to a Boolean False value, the timed loop may stop executing, similarly to a While loop in the C programming language. In another embodiment, the timed loop may be configured to execute for a specific number of iterations and then stop, similarly to a For loop in the C programming language.

In another embodiment execution of a timed loop may be aborted programmatically through an application programming interface (API) call. For example, in one embodiment the graphical programming development environment may provide a "Stop Timed Loop" node that the user can include in a graphical program. The user may configure the "Stop Timed Loop" node with the names of one or more timed loops to abort. When the "Stop Timed Loop" executes during execution of the graphical program it may cause the referenced timed loops to abort execution, i.e., to stop iterating. The "Stop Timed Loop" node may be located anywhere within the block diagram of the graphical program, e.g., may be located outside any timed loop. Thus in one embodiment a node that is external to a timed loop may execute to cause the timed loop to abort.

In one embodiment a timed loop may be passed a "wakeup reason" each time an iteration of the loop begins executing, i.e., a data item indicating the reason the iteration of the timed loop began executing. For example, as described below, the wakeup reason may be received via a terminal in the left data node 402. The normal wakeup reason (e.g., value=0) may indicate that the iteration began because it was normally scheduled at that time. There may be other reasons the iteration began. In particular, if the timed loop is aborted through an API call as described above then the timed loop may be awakened, i.e., a final iteration of the timed loop may begin, and the timed loop may be passed a wakeup reason indicating that the reason this final iteration began is because of the abort call. The user may configure the graphical source code of the timed loop to check the wakeup reason and to execute cleanup code if necessary when the timed loop is aborted in this manner.

In one embodiment, operation of the timed loop may be dynamically changed during execution of the graphical program. For example, timing information for the timed loop such as its period, offset, etc., may be dynamically changed. In various embodiments, the timing information may be changed using any of various techniques. In one embodiment the timed loop may include special data nodes that may be utilized for this purpose. For example, the timed loop of FIG. 6 illustrates a left data node 402 attached to the left border of the timed loop and a right data node 403 attached to the right border of the timed loop. The left data node 402 may provide timing and status information about the current and/or previous loop iteration, such as if the iteration executed late, the time the iteration actually started executing, and when the iteration should have started executing. The user can wire data from the left data node 402 to the right data node 403 to cause future iterations of the timed loop to be dynamically configured during execution of the graphical program.

In various embodiments the left data node 402 may return any kind of data regarding execution of the timed loop, e.g., data regarding execution of the previous iteration of the timed loop or data specifying current property values, such as the current execution period, priority, offset, etc., of the timed loop. In one embodiment the left data node 402 may include a plurality of terminals, each corresponding to a different data item. For example, each data item may be represented as a separate row or field in the left data node 402. The user may be able to configure the left data node 402 to display only the data items of interest, similarly as described above with reference to the configuration node 401.

The user may connect wires to the terminals of the left data node 402 to receive the respective values of the data items. The wires may provide the data item values to other nodes within the timed loop and/or to the right data node 403. As one simple example, the user may connect one end of a wire to a terminal in the left data node 402 to receive the current offset value of the timed loop and may connect the other end of the wire to an Add function node within the timed loop border. The Add function node may be configured to add a numeric constant, e.g., 10, to the offset, and the output of the Add function node may be connected to an appropriate terminal in the right data node 403. (The right data node 403 may include a plurality of terminals corresponding to various data items regarding execution of the timed loop, similarly as described above for the left data node 402.) Thus, in this simple example, the offset of the timed loop may be dynamically increased by 10 ticks of the timing source on each loop iteration. Future scheduling of the timed loop may take the dynamically changed timed loop properties into account, i.e., so that subsequent iterations of the timed loop execute according to a new dynamically specified period, offset, priority, etc.

A few examples of information that may be received from terminals in the left data node 402 follow:

Actual Start of Current Iteration: The actual time at the beginning of the current iteration.

Expected Start of Current Iteration: The time for which the current iteration was scheduled to be started.

Actual Start of Previous Iteration: The actual time at the beginning of the previous iteration.

Expected Start of Previous Iteration: The time for which the previous iteration was scheduled to be started.

Actual End of Previous Iteration: The actual time the previous iteration finished executing. (This value may be zero for the first iteration of the loop.)

Expected End of Previous Iteration: The time the previous iteration was expected to finish executing. (This value may be zero for the first iteration of the loop.)

Previous RT: A Boolean value that evaluates to True if Actual End of Previous Iteration is greater than or equal to Expected Start of Current Iteration (i.e., True if the last iteration overran the period).

Error: An error flag for the previous iteration.
Period: The period of the current iteration.
Offset: The offset of the current iteration.
Priority: The priority of the current iteration.
Wakeup Reason: An integer which indicates the reason the iteration of the timed loop began executing. The normal reason (e.g., value=0) is because the iteration was normally scheduled at that time. There may be other reasons the iteration began. For example, in one embodiment an asynchronous message to wakeup may be received from outside the loop. In another embodiment the loop may be awakened (i.e., may be triggered to iterate) because it was programmatically aborted. In another embodiment the loop may be awakened because an associated timeout expired.

As described above, the right data node 403 may be utilized to set new timing information for the next iteration of the timed loop. As one example, the user may utilize the "Previous RT" value from the left data node 402 to determine whether the last iteration of the timed loop overran the period. If so, the right data node 403 may be used to set a longer period for the timed loop. Similarly as for the left data node 402, the right data node 403 may include a plurality of terminals, each corresponding to a different data item. The user may connect wires to these terminals to set desired properties regarding execution of the timed loop. In one embodiment, the right data node 403 may include terminals for setting properties such as:

Period: The new period of the timed loop. The scheduled start time for the next iteration of the loop may be based on the new period.
Offset: The new offset of the timed loop.
Priority: The new priority of the timed loop.

In one embodiment, the timed loop may be operable to pass on error or status information to other nodes in the graphical program. In the example of FIG. 6, the timed loop includes an output node 404. The output node 404 may return error information that the timed loop receives in the "Error In" input of the input node 401 or may return error information that the timed loop itself generates during an iteration. For example, in one embodiment, if an external source causes the execution of the timed loop to abort then the output node 404 returns an error. In one embodiment the output node 404 does not return error information from any subdiagram that executes within the timed loop. In one embodiment, if the timed loop receives an error in the "Error In" input of the input node 401 then the timed loop may not execute (i.e., the graphical source code associated with the timed loop may not be executed), and the timed loop may simply pass on the error.

In one embodiment the graphical programming development environment may allow the user to create a graphical program that utilizes nested timed loops. As described above, the user may include a first timed loop in the graphical program and may include graphical source code associated with the first timed loop such that the graphical source code is executed during each iteration of the first timed loop. In one embodiment a second timed loop may be included in the graphical source code associated with the first timed loop. The user may also associate graphical source code with the second timed loop. The user may configure the first timed loop to execute according to a first execution period (and other timing information for the first timed loop) and configure the second timed loop to execute according to a second execution period (and other timing information for the second timed loop), e.g., where the first execution period is relatively longer than the second execution period. Thus, during each iteration of the first timed loop, the second timed loop may be scheduled to iterate multiple times according to the second execution period and other timing information for the second timed loop.

Figure 9:
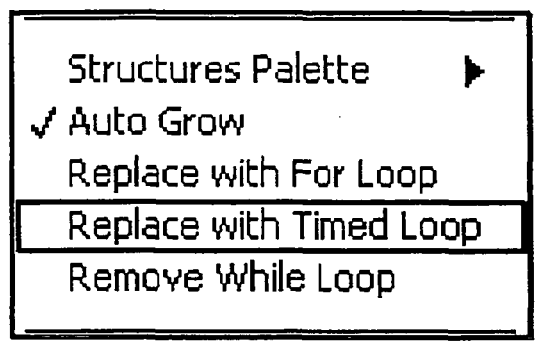
FIG. 9 illustrates a context menu with an option for automatically replacing a While loop with a timed loop.

In some cases the user may have a graphical program that includes one or more non-timed loops which the user desires to convert to timed loops. For example, the LabVIEW graphical programming development environment provides non-timed While loops for use in graphical programs. In one embodiment the graphical programming development environment may provide a feature for automatically replacing a While loop or other non-timed loop with a timed loop. For example, the user may invoke a context menu of the While loop such as illustrated in FIG. 9 and may select the "Replace with Timed Loop" option to cause the loop to be automatically replaced. The user may then configure the new timed loop with timing information as desired. Graphical source code associated with the old loop may be preserved when the loop is replaced with the timed loop. Similarly, in one embodiment the user may invoke a command to automatically replace a timed loop with a While loop or other non-timed loop.

In various embodiments, controlling the timing of a timed loop in a graphical program in the manner described above may be implemented in any of various ways. In one embodiment, the graphical program may execute under control of an execution subsystem. The execution subsystem may utilize a scheduler operable to control timing of timed loops in the graphical program, as described above.

In one embodiment, the execution of a timed loop may be governed by an alarm. The timed loop may set up an alarm with the scheduler before the loop begins execution. The alarm may comprise a wakeup event registered with the scheduler. The alarm may be created by specifying a timing source, period, offset, and priority. There may be many alarms based on the same timing source.

Upon beginning execution, the timed loop may wait on its scheduled alarm. The scheduler may then fire the alarm at the appropriate time, causing the graphical source code associated with the loop to execute for one iteration. The scheduler may be operable to periodically fire the alarm, where each firing time is determined based on the timing source, period, offset, and priority, as described above. Thus, after each iteration, the timed loop may wait for the next firing of the alarm. If the execution of the loop is terminated (e.g., due to conditional termination logic of the loop), the alarm may be deleted.

In various embodiments, a graphical program that utilizes one or more timed loops such as described above may perform any function. In one embodiment the graphical program may include functionality for modeling or simulating a system. The timed loop(s) may be utilized in modeling or simulating the system. In other embodiments the graphical program may execute one or more timed loops to perform other functions. As a few examples, the timed loops may be involved in performing an industrial automation function, a process control function, or a test and measurement function, a real-time application, or any other desired function or application.

It is noted that in one embodiment, timed loops such as described above may be used to coordinate activities performed by different graphical programs. For example, a first graphical program may include a first loop timed based on a first timing source. A second graphical program may include a second loop that is also timed based on the first timing source. Thus, the two timed loops may be synchronized with respect to a common timing source. In one embodiment, both graphical programs may execute on the same computer system. In another embodiment, the first graphical program may execute on a first computer system (e.g., the computer system 82 of FIG. 1A), and the second graphical program may execute on a second computer system (e.g., the computer system 90 of FIG. 1A). For example, the two computer systems may be coupled via a network, and the first timing source may be accessible to both computer systems.

It is noted that FIG. 5 represents one embodiment of a method for configuring a graphical program to repetitively perform a process at timed intervals, and other embodiments are contemplated. In various embodiments, any of various methods may be used to configure the graphical program with one or more nodes operable to periodically perform first functionality at times determined by an execution period. Some embodiments may not comprise displaying a loop icon in the graphical program. For example, in one embodiment the user may create a graphical sub-program operable to perform the first functionality. For example, the graphical sub-program may have its own block diagram on which the user arranges a plurality of interconnected nodes to implement the first functionality. The graphical program may be configured to periodically execute the graphical sub-program according to a timed execution period. For example, the graphical sub-program may be represented as a sub-program node in the block diagram of the graphical program, where the sub-program node is executed according to the execution period. The user may interact with the sub-program node to specify timing information, e.g., by using a configuration dialog or by connecting one or more wires to the sub-program node in a manner similar to that described above.

A graphical programming development environment which allows users to create graphical programs that utilize timed loops such as described above may comprise a powerful and flexible means for developing a wide variety of applications. For example, users may include multiple timed loops in a graphical program to develop a multi-rate application. In various embodiments the graphical programming development environment may allow any number of timed loops to be included in a graphical program. In one embodiment the number may be limited to a maximum number, e.g., 128. Each timed loop may have a unique timing source or may share the same timing source as one or more other timed loops. Each timed loop may have its own execution period. For example, all the timed loops may execute at different rates, or one or more timed loops may execute at the same rate. The user may configure the timed loops with desired execution periods and offsets to align the timing of the loop iterations in whatever manner desired.

The graphical programming development environment may enable the user to utilize a wide variety of timing sources to generate the ticks or events upon which loop execution is based. For example, in one embodiment the timing source may enable iterations of the loop to be precisely scheduled with respect to time, e.g., according to a 1 MHz or 1 KHz clock, or precisely with respect to events generated by a hardware device. In one embodiment the timing source may enable iterations of the loop to occur in response to events that may not occur regularly in time, as described above. The capability to align execution of loops precisely with respect to various kinds of timing sources (and with respect to each other) may be important for many applications.

The graphical programming development environment may also enable the user to configure multiple timed loops to execute at different priorities, e.g., in accordance with the relative importance of each timed loop. The graphical programming development environment may also enable the user to configure timing information for a timed loop to be dynamically changed during execution of the graphical program.

Figure 10:
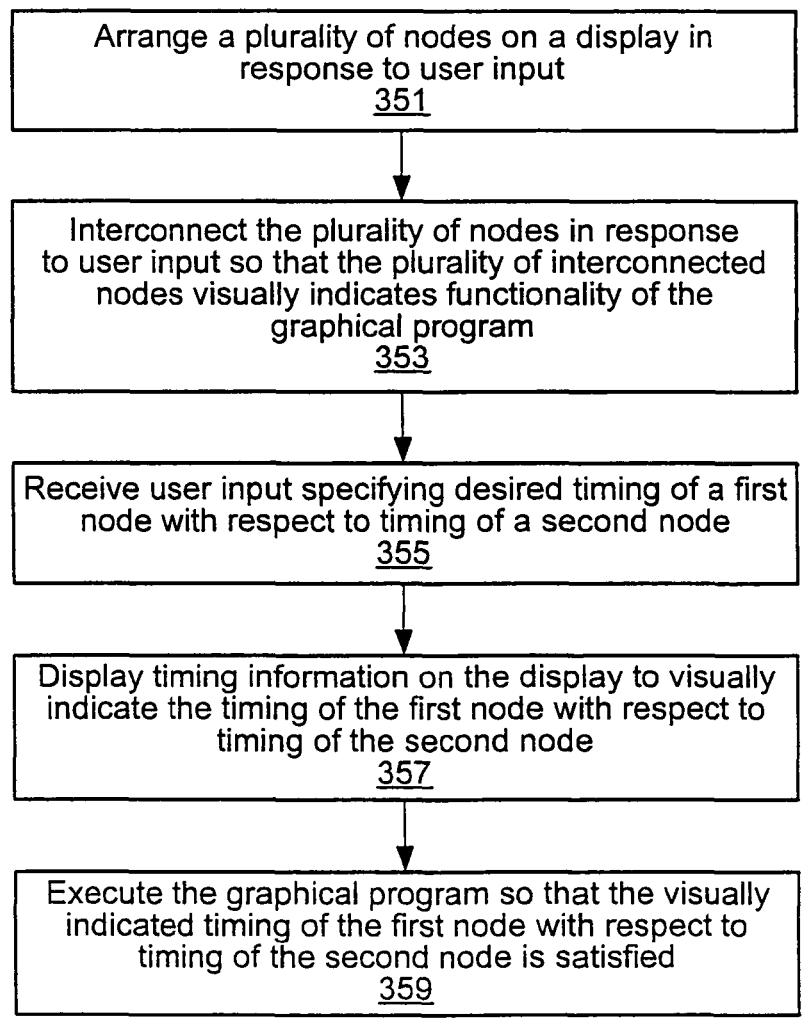
FIG. 10 is a flowchart diagram illustrating one embodiment of a method for specifying timing relationships among nodes in a graphical program.

FIG. 10—Timing Relationships Among Individual Nodes

For many applications, it may be desirable to control timing relationships among individual nodes in the graphical program. FIG. 10 is a flowchart diagram illustrating one embodiment of a method for specifying timing relationships among nodes in a graphical program. It is noted that FIG. 10 illustrates a representative embodiment, and alternative embodiments are contemplated. Also, various elements may be combined, omitted, or performed in different orders. The method shown in FIG. 10 may be used in conjunction with any of the computer systems or devices shown in the above Figures, among other devices.

A user may first create the graphical program, e.g., by interacting with a graphical programming development environment. As shown in 351, a plurality of nodes may be arranged on a display in response to user input. In 353, the plurality of nodes may be interconnected in response to user input. The nodes may be interconnected in one or more of a data flow, control flow, or execution flow format. The plurality of interconnected nodes may visually indicate functionality of the graphical program.

In 355, user input specifying desired timing of a first node with respect to timing of a second node may be received. The user input may specify a desired timing relationship between execution of the first node and execution of the second node, to be satisfied during execution of the graphical program. In various embodiments, any kind of timing relationship or timing constraint between the first node and the second node may be specified.

In one embodiment, the user input may specify desired timing of an execution point for the first node with respect to timing of an execution point for the second node. As used herein, an execution point for a node may refer to an identifiable point in time pertaining to execution of the node during execution of the graphical program or may refer to a time pertaining to execution of the node at which a specific condition is or becomes true. One example of an execution point is the beginning of execution of the node. During execution of a graphical program, a given node may begin execution at a time which is typically dependent upon the node's relationship or connections to other nodes in the graphical program. For example, in a data flow graphical program, a node may begin execution when all data flow dependencies for the node (if any) have been satisfied. The node may then execute for an amount of time which depends on functionality of the node or operations performed by the node, after which execution of the node ends. The point at which execution of the node ends is another example of an execution point for the node, i.e., an identifiable point in time pertaining to execution of the node.

In various embodiments, the user input received in 355 may specify any type of timing relationship or timing constraint between any kinds of execution points for the respective nodes. For example, the user may specify a time interval to elapse between the time at which the first node begins execution and the time at which the second node begins execution. For example, the user may specify a time interval of 100 ms to indicate that 100 ms should elapse between the times at which the respective nodes begin execution. As another example, the user may specify a time interval to elapse between the time at which the first node ends execution and the time at which the second node ends execution. As another example, the user may specify a time interval to elapse between the time at which the first node ends execution and the time at which the second node begins execution, or vice versa.

In another embodiment the user input may specify a maximum amount of time to elapse between an execution point for the first node and an execution point for the second node. For example, the user input may specify that no more than 50 ms should elapse between the time at which the first node begins execution and the time at which the second node begins execution. In another embodiment the user input may specify a minimum amount of time to elapse between an execution point for the first node and an execution point for the second node. For example, the user input may specify that at least 200 ms should elapse between the time at which the first node ends execution and the time at which the second node begins execution.

Besides specifying timing relationships relating to the beginning of execution and the end of execution for the nodes, the user input may also specify timing relationships relating to any other execution point for the nodes. For example, where the first node has an execution side effect, the user input may specify a maximum amount of time to elapse between the time at which the side effect of the first node occurs and the time at which the second node begins execution. As another example, the user input may specify a desired time interval to elapse between the time at which a side effect of the first node occurs and the time at which a side effect of the second node occurs. In various embodiments, the first node or the second node may have any execution side effect. For example, the side effect may be caused by an input/output operation or may be caused by a processor executing the graphical program interacting with a separate hardware device.

In one embodiment, the timing relationship specified in 355 may be associated with a particular timing source or clock, similarly as the timed loop described above may be associated with a timing source or clock. Thus, in one embodiment, rather than specifying a time interval such as 100 ms, the user may specify a number of ticks, e.g., 100. The timing constraint between the first node and the second node may then be based on the specified number of ticks of the associated timing source.

In 357, timing information may be displayed on the display to visually indicate the timing of the first node with respect to timing of the second node. In various embodiments the timing information may visually indicate the timing of the first node with respect to timing of the second node in any way. In one embodiment the timing information may be displayed on the block diagram of the graphical program. In another embodiment the timing information may be displayed separately from the block diagram.

Where the user input in 355 specifies a numerical time value regarding timing of the first node with respect to timing of the second node, displaying the timing information may include displaying this numerical time value. Displaying the timing information may also include indicating whether the numerical time value is an exact time interval, a time maximum, or a time minimum. For example, where the user specifies a time maximum of 100 ms to elapse between an execution point for the first node and an execution point for the second node, this may be indicated by displaying text such as "<100 ms" or "max 100 ms", e.g., where the text is displayed or positioned in relation to the first node and the second node to visually indicate that a timing relationship between the first node and the second node is represented.

Figure 11:
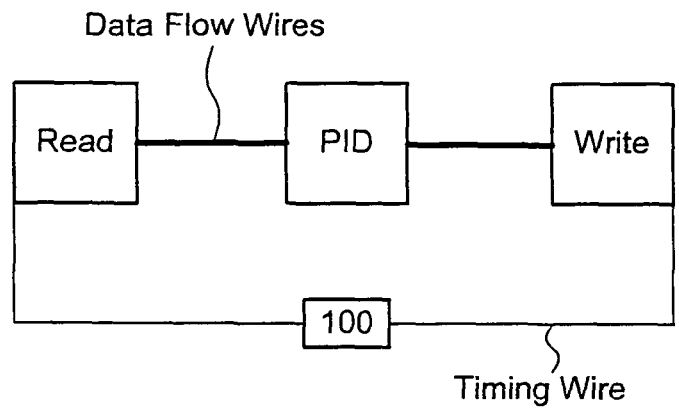
FIGS. 11 and 12 illustrate exemplary timing wires between two nodes.

In one embodiment, displaying the timing information may comprise displaying a timing wire between the first node and the second node. One end of the timing wire may be connected to the first node, and the other end may be connected to the second node. The specific time constraint may also be displayed with or displayed on the timing wire. For example, FIG. 11 illustrates an exemplary timing wire between a "Read" node and a "Write" node, where the timing wire visually indicates that 100 ticks of a timing source should elapse between the time when the "Read" node begins execution and the time when the "Write" node ends execution. In this example, a "PID" node is executed between the "Read" node and the "Write" node.

The timing wire may be a special wire that does not have the same meaning as other wires in the graphical program. For example, in a data flow graphical program, the graphical program may include a plurality of wires that indicate data flow between nodes in the graphical program. However, the timing wire may not indicate data flow between the first node and the second node, but instead may indicate a timing relationship to be satisfied during execution of the graphical program.

Figure 12:
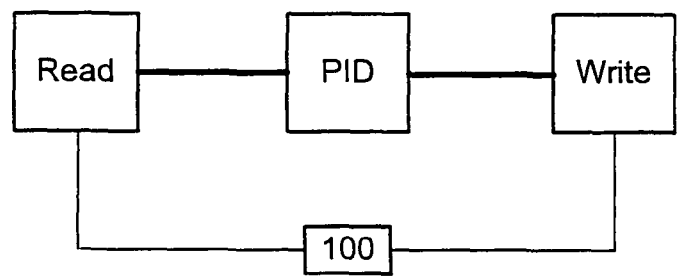

In one embodiment, a node may have a plurality of points operable to accept connection of a timing wire. Each point may correspond to a different execution point for the node. Thus, the timing relationship specified by the timing wire may depend on (and may be visually indicated by) the particular points to which the timing wire is attached on the respective nodes. In one embodiment, the left side of a node may correspond to the beginning of execution of the node, the right side of the node may correspond to the end of execution of the node, and the middle of the node may correspond to the point when an execution side effect of the node occurs. Thus, in FIG. 11, the timing wire is attached to the left side of the "Read" node and the right side of the "Write" node to indicate that a timing relationship is specified between the beginning of execution of the "Read" node and the end of execution of the "Write" node. FIG. 12 illustrates a similar example in which a timing wire is attached to the middle of the "Read" node and the middle of the "Write" node. Thus, the timing wire of FIG. 12 specifies a different timing relationship, i.e., a time interval of 100 ticks between the time at which a side effect (input operation) of the "Read" node occurs and the time at which a side effect (output operation) of the "Write" node occurs.

Figure 13:
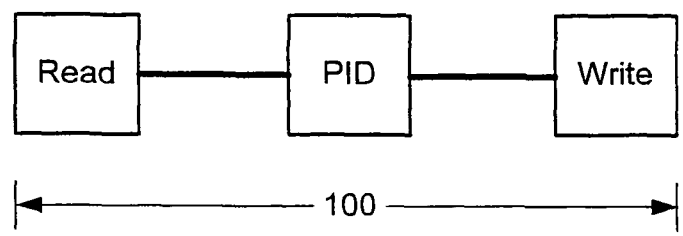
FIG. 13 illustrates an alternative technique for displaying a timing relationship between two nodes.

In other embodiments, timing information for the first node and the second node may be displayed using techniques other than timing wires. FIG. 13 illustrates one alternative embodiment which illustrates the same timing relationship as FIG. 11.

It is noted that 355 and 357 may occur in various orders. For example, in one embodiment the user may first specify the timing relationship between the first node and the second node by interacting with a dialog box or wizard, and the timing information (e.g., timing wire) may then be displayed in response. In another embodiment, the user may first cause a timing wire (or other structure representing timing information) to be displayed in the graphical program and may then configure the timing wire with information specifying a timing relationship.

In 359, the graphical program may be executed. The graphical program may be executed in such a way that the visually indicated timing of the first node with respect to timing of the second node is satisfied. This may involve scheduling execution of nodes in the graphical program in a particular way or adjusting priorities of one or more threads in the graphical program so that the timing relationship is satisfied. It is possible that the user may specify a timing relationship that cannot be satisfied. In one embodiment it may be possible to determine before execution of the graphical program that the timing relationship cannot be satisfied. If so, then the graphical programming development environment may inform the user, e.g., at compile time or at the time the user specifies the timing relationship while editing the graphical program. In another embodiment, the system may determine during execution of the graphical program that the timing relationship cannot be satisfied and may inform the user as the graphical program executes or after the graphical program finishes executing. In another embodiment the user may determine whether the specified timing relationships were satisfied by utilizing a visualization tool to view timing of the graphical program, as described below.

Figure 14:
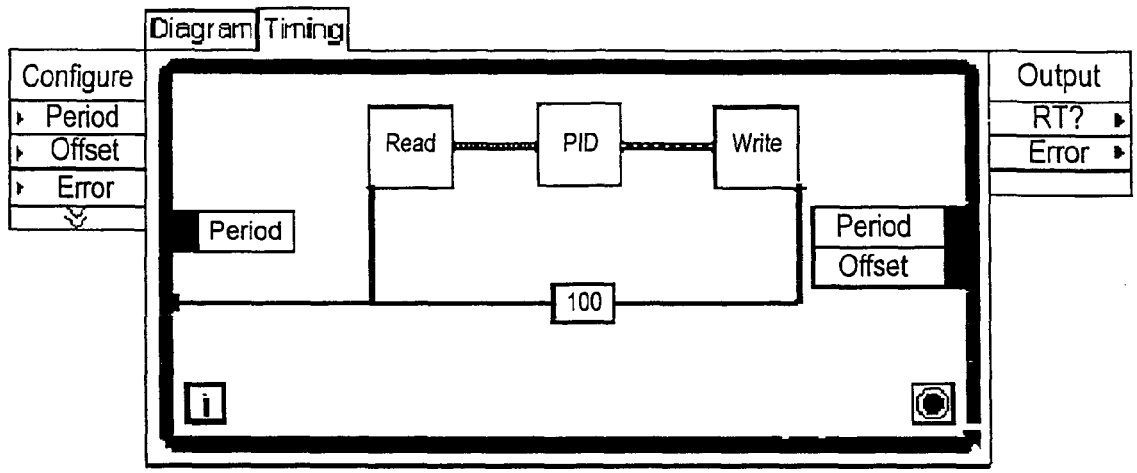
FIG. 14 illustrates the portion of graphical source code illustrated in FIG. 11, where the graphical source code is executed in a timed loop.

In various embodiments, the user may specify a timing relationship for any of various types of nodes located anywhere within the graphical program. As described above, the graphical program may include one or more loops which have associated nodes that are executed for a plurality of iterations. In one embodiment the first node and the second node may be associated with or located within a loop. Thus, for each iteration of the loop, execution of the first node and the second node may be timed so that the visually indicated timing relationship is satisfied. FIG. 14 illustrates the portion of graphical source code illustrated in FIG. 11, where the graphical source code is executed in a timed loop. Thus, for each iteration of the loop, the "Write" node ends execution 100 ticks after the "Read" node began execution. In this example, the timing source used to measure the 100-tick interval is the same as the timing source for the timed loop.

In another embodiment, the user may specify a timing relationship between a node in the loop and the loop itself. For example, the user may specify that execution of a first node should begin 50 ms after each iteration of the loop begins. For example, this may be indicated by a timing wire similarly as described above, where one end of the timing wire is connected to the loop border and the other end is connected to the first node.

The system may attempt to schedule execution of the nodes so that the timing relationship is satisfied from the beginning of execution of the loop. In one embodiment the timing relationship may not be satisfied for the first few iterations of the loop, e.g., due to incomplete knowledge of execution times of the first node, the second node, or intermediate nodes executed between the first node and the second node. However, the system may be operable to analyze the timing of previous iterations and adjust scheduling so that the timing relationship is satisfied for subsequent iterations of the loop.

In one embodiment, a timing relationship between a first node and a second node may be dynamically modified during execution of the graphical program. For example, where a time interval of 15 ms is originally specified between an execution point of a first node and an execution point of a second node, the interval may be dynamically increased to 20 ms. For example, the graphical program may include graphical source code operable to dynamically determine the actual timing of nodes that occurs during execution of the graphical program and dynamically adjust various timing relationships as necessary so that the graphical program executes with the proper timing. As another example, the actual time interval that occurs between two execution points of two nodes may be dynamically determined, and the execution period of a timed loop in the graphical program could be dynamically set to this time interval, similarly as described above with reference to FIG. 5.

Figure 15:
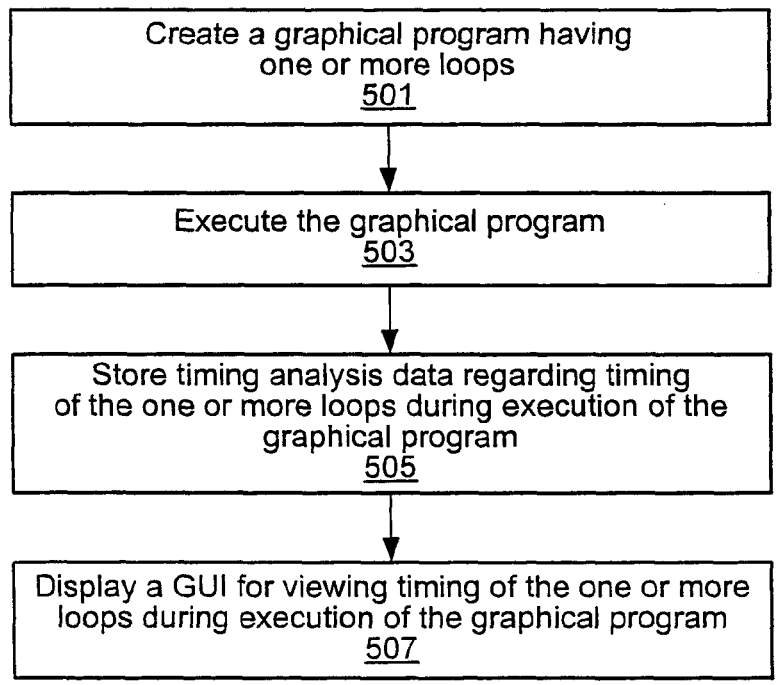
FIG. 15 is a flowchart diagram illustrating one embodiment of a method for viewing timing of one or more loops in a graphical program.

FIG. 15—Visualization Tool

It may be desirable to enable the user to view various aspects of the timing of a graphical program. FIG. 15 is a flowchart diagram illustrating one embodiment of a method for viewing timing of one or more loops in a graphical program. It is noted that FIG. 15 illustrates a representative embodiment, and alternative embodiments are contemplated. Also, various elements may be combined, omitted, or performed in different orders. The method shown in FIG. 15 may be used in conjunction with any of the computer systems or devices shown in the above Figures, among other devices.

In 501 a graphical program having one or more loops may be created. In one embodiment the one or more loops may include one or more timed loops, i.e., the loops may be configured to execute according to particular execution periods. In another embodiment the graphical program may also or may alternatively include one or more non-timed loops.

In 503 the graphical program may be executed.

In 505 timing analysis data regarding timing of the one or more loops during execution of the graphical program may be stored. The timing analysis data may include any kind of data useable to analyze timing of the one or more loops. For example, for each of the one or more loops, the timing analysis data may include data such as the time at which each iteration of the loop began and the time at which each iteration of the loop ended. In other embodiments, timing analysis data regarding other aspects of the timing of the graphical program may be stored, such as timing data for individual nodes in the graphical program. For example, the timing analysis data may include data specifying the time at which a first node began and ended execution (or specifying each time the first node began and ended execution, if the first node is performed within a loop).

In various embodiments, the timing analysis data may be stored at any location, such as on a computer system on which the graphical program is executed or on another computer system to which the timing analysis data is transferred via a network. Also, the timing analysis data may be stored on any kind of memory medium. Storage of the timing analysis data may occur concurrently with and/or after execution of the graphical program.

In one embodiment, timing analysis data may not be stored for every iteration of every loop. For example, in one embodiment timing analysis data may be stored until a configurable maximum amount of storage space has been utilized or until an out-of-storage situation occurs. After the maximum has been utilized, storage of timing analysis data may stop, or previously stored timing analysis data may be overwritten. In another embodiment the user may be able to interactively request storage of the timing analysis data to start or stop as the graphical program is being executed. In another embodiment the user may be able to specify which loops in the graphical program to store timing analysis data for. For example, the FIG. 8 configuration dialog for specifying timing information for a timed loop has a checkbox for specifying whether or not to log timing data for the timed loop.

In 507 a graphical user interface (GUI) for viewing timing of the one or more loops during execution of the graphical program may be displayed. For example, the GUI may be associated with a visualization tool operable to receive the timing analysis data stored in 505 and display the timing analysis data or display information computed based on the timing analysis data. In one embodiment the GUI may be displayed on a display of the same computer system on which the graphical program executes. In another embodiment the GUI may be displayed on a display of a different computer system. As one example, the graphical program may execute on a first device, and a visualization tool may execute on a desktop computer system coupled to the first device via a network.

In one embodiment the user may view the timing data for the one or more loops "offline" from the graphical program, e.g., after execution of the graphical program has ended. In another embodiment the GUI may be displayed simultaneously as the graphical program is executing and may be continuously updated with new timing data so that the user can see the timing data of the one or more loops in real-time or with a small time delay.

In various embodiments the GUI may display any of various kinds of information regarding timing of the one or more loops, and any kind of visual presentation may be used in displaying the information. (As described below, in other embodiments the GUI may display information to graphically indicate other types of timing for the graphical program in addition to or alternatively to the timing of loops in the graphical program.) The GUI may display absolute and/or relative timing data. The GUI may display information enabling the user to see timing of individual iterations of the one or more loops performed during execution of the graphical program. For example, information visually indicating a start time and an end time for each iteration and/or a time duration for each iteration may be displayed. If the loops are assigned execution priorities, the GUI may also indicate the respective priorities, e.g., using a color-coding scheme.

Figure 16:
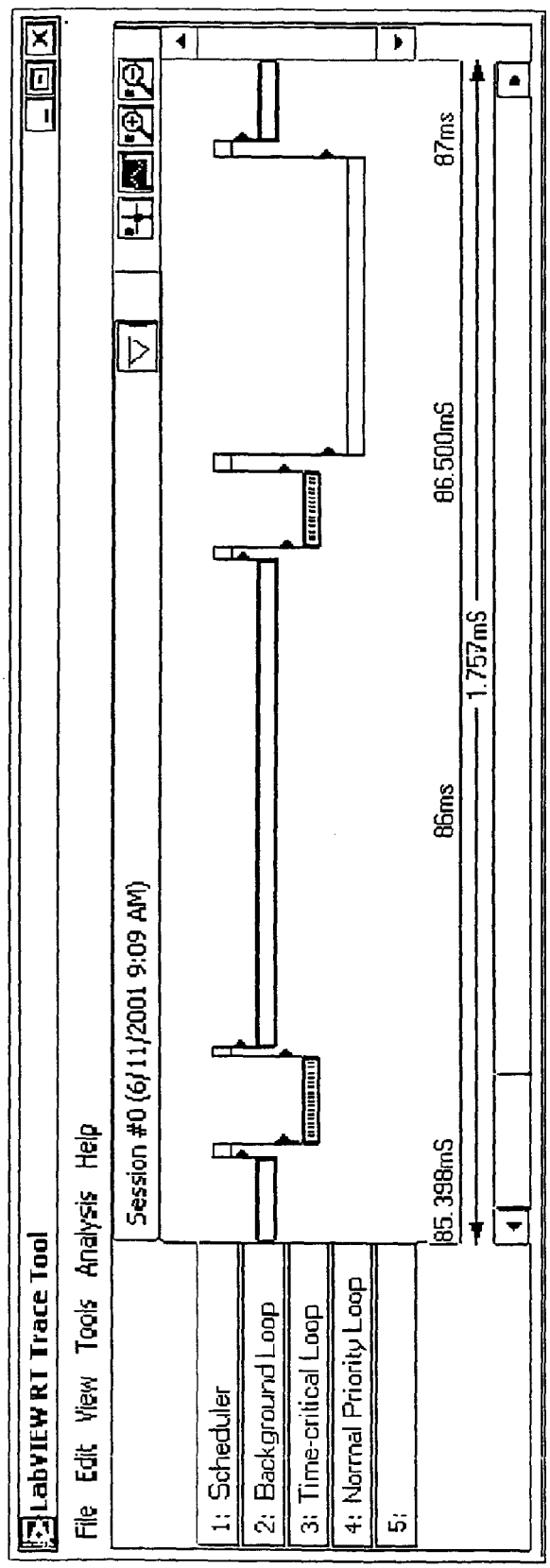
FIG. 16 illustrates an exemplary GUI for viewing timing of loops in a graphical program.

In one embodiment the GUI may indicate the timing of the loop iterations by displaying time increments along a first axis. Each individual loop iteration may be represented as one or more bars, line segments, or other indicators along the first axis. The length of each bar or line segment may represent a time duration for which the loop iteration executed. The start and end points of the bar or line segment may represent start and end times for the loop iteration. FIG. 16 illustrates one exemplary GUI in which various bars represents times at which the corresponding loops were executing.

In one embodiment timing data may be displayed separately for each loop. In another embodiment the GUI may combine information for multiple loops. For example, the GUI may visually indicate timing of multiple loops relative to each other and may indicate execution transitions between the loops, e.g., as in the example of FIG. 16. Where multiple loops execute based on a common timing source, the GUI may display information visually indicating timing of the multiple loops with respect to the common timing source. The GUI may display information that allows the user to distinguish the various loops from one another. In one embodiment, the user may configure each loop with a loop name, e.g., when creating the graphical program, and the GUI may display the loop names to enable the user to identify the respective loops. For example, in FIG. 16 the user may have named the three loops, "background loop", "time-critical loop", and "normal priority loop". FIG. 16 also illustrates a scheduler task that schedules execution of the loops.

In the example of FIG. 16, each vertical line indicates a point in time when execution switched from one task to another. In this example, the GUI displays color-coded flags to provide information about each transition to or from a loop iteration. A green flag indicates that the loop iteration started at that point, a yellow flag indicates that the loop iteration was suspended at that point, a blue flag indicates that the loop iteration was resumed at that point, and a red flag indicates that the loop iteration finished at that point. If a loop iteration was suspended at some point and later resumed, then that loop iteration may be represented by multiple bars on the GUI. The green and red flags may visually indicate when the loop iteration first began and finally ended. In another embodiment the displayed flags may be shape-coded instead of or in addition to being color-coded. In addition to the information noted above, flags or other indicators may be utilized to visually indicate any of various other kinds of information regarding timing of a loop. For example, colored flags may also be displayed to indicate iterations of the loop that occurred late, i.e., loop iterations that began at a later time than they were supposed to. For example, a late flag may appear on the GUI at a position indicating the actual time that an iteration began execution and may visually indicate that the actual time was later than a time when the iteration was scheduled to begin.

In one embodiment the GUI may be large enough to display only a portion of the timing data at a time. The user may adjust which portion of the timing data is displayed, e.g., by scrolling a window to bring the desired portion into view. In one embodiment the user may be able to adjust the scale at which the timing data is displayed.

Figure 17:
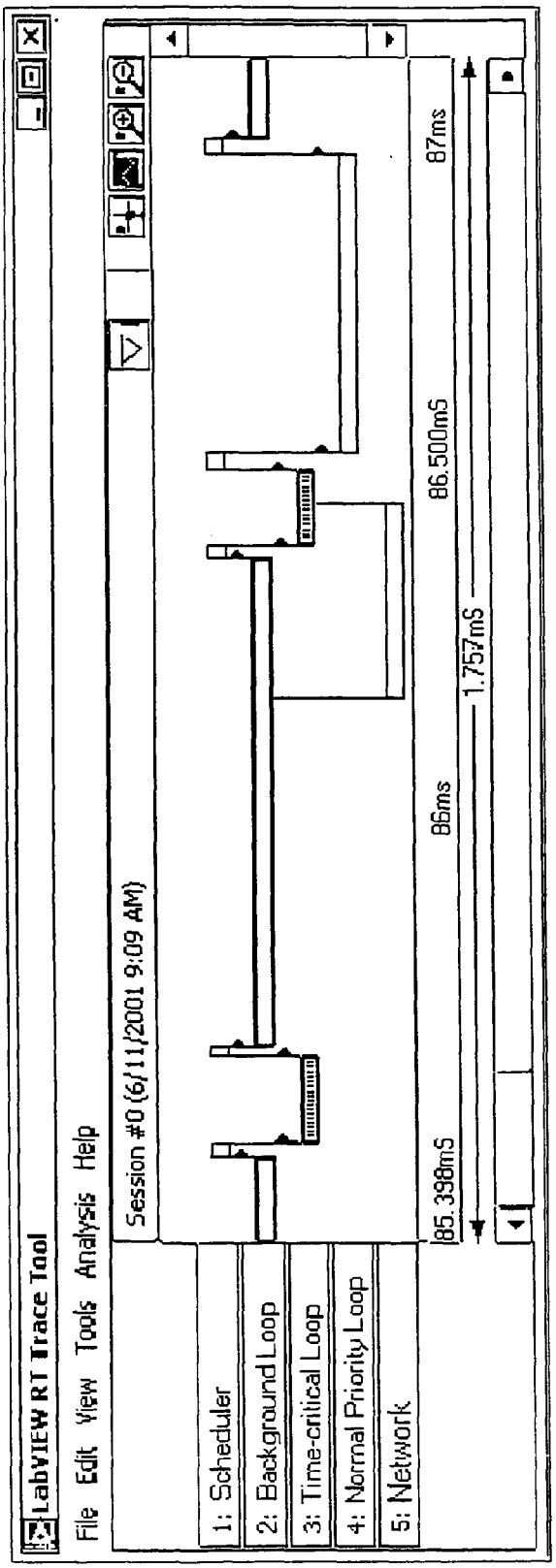
FIG. 17 illustrates a GUI similar to that of FIG. 16, where another row has been added to indicate timing of network communication performed by the graphical program, relative to timing of loops in the graphical program.

In some applications, the graphical program may be operable to perform network communication, i.e., may receive and/or send data over a network. In one embodiment the GUI may display information to graphically indicate timing of the network communication together with the timing of the loops in the graphical program. This may enable the user to understand when the network communication occurs relative to iterations of the loops. FIG. 17 illustrates a GUI similar to that of FIG. 16, where another row has been added to indicate timing of network communication performed by the graphical program, relative to loop iterations performed by the graphical program.

In one embodiment the GUI may display timing of one or more loops of a single graphical program. In another embodiment the GUI may display timing of loops that execute in multiple graphical programs. For example, the GUI may display timing of a first one or more loops that execute in a first graphical program and a second one or more loops that execute in a second graphical program. Timing for any number of loops in any number of graphical programs may be displayed.

Figure 17A:
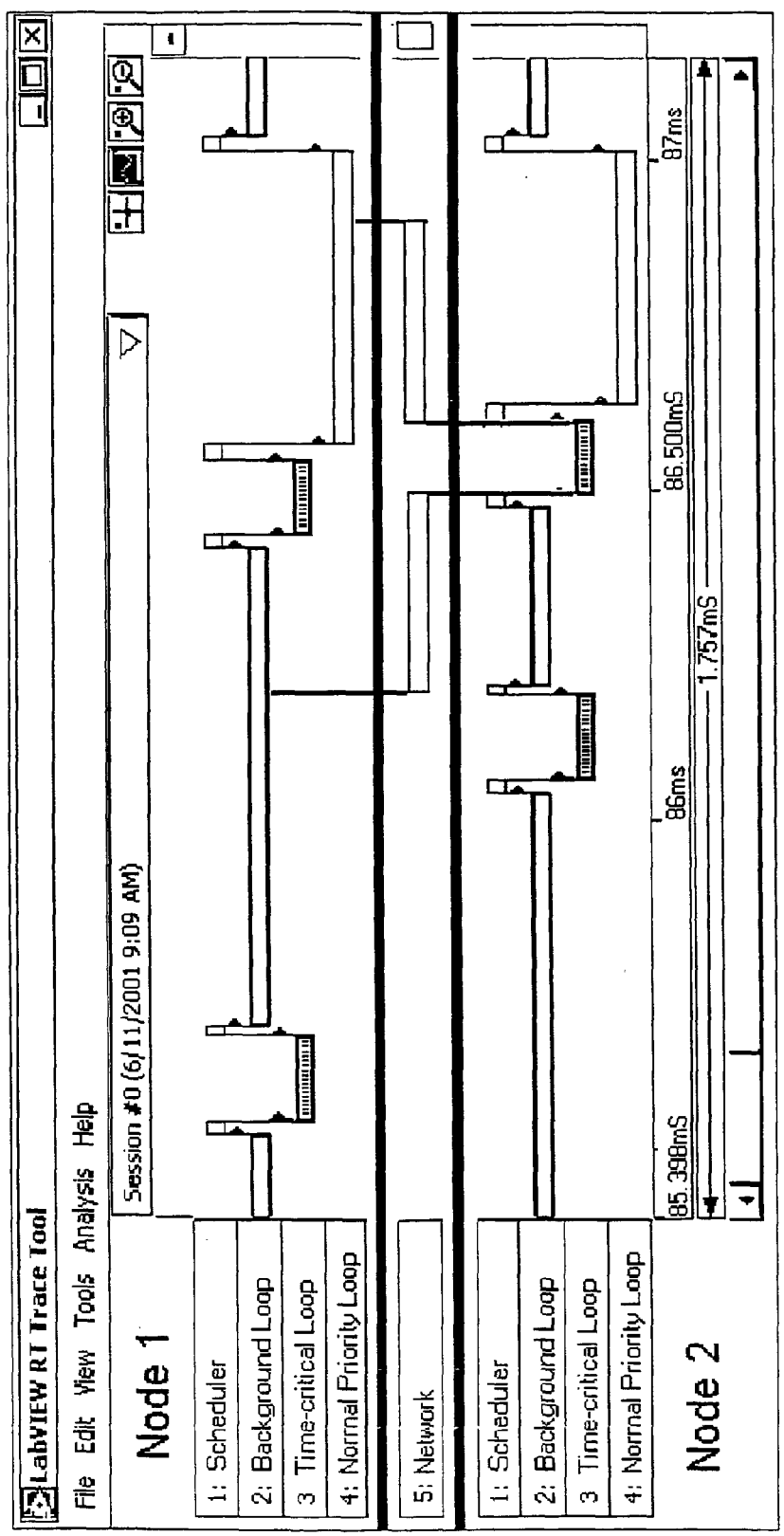
FIG. 17A illustrates a GUI similar to that of FIG. 17, where timing of loops executed in two different graphical programs is displayed together with timing information indicating network communication in which the two graphical programs communicate with each other.

FIG. 17A illustrates a GUI similar to that of FIG. 17, where timing data for loops executed in two different graphical programs is displayed together with timing information indicating network communication in which the two graphical programs communicate with each other. In this example, the background loop on computing node 1 begins network communication at the point where the vertical bar connects to the network 5 bar. The message is received by a time critical loop executing on computing node 2. It performs some processing and then sends a message back to computing node 1, where the message is received by the normal priority loop. In this example, the arrival of the message on computing node 2 is what causes the time critical loop to run. Thus the time critical loop was waiting for the message to come. For example, the time critical loop may be implemented as an event-triggered loop such as described below. This example also illustrates the use of timed loops in different graphical programs to synchronize operation of the programs in time, where the loops execute based on a common timing source.

Figure 18:
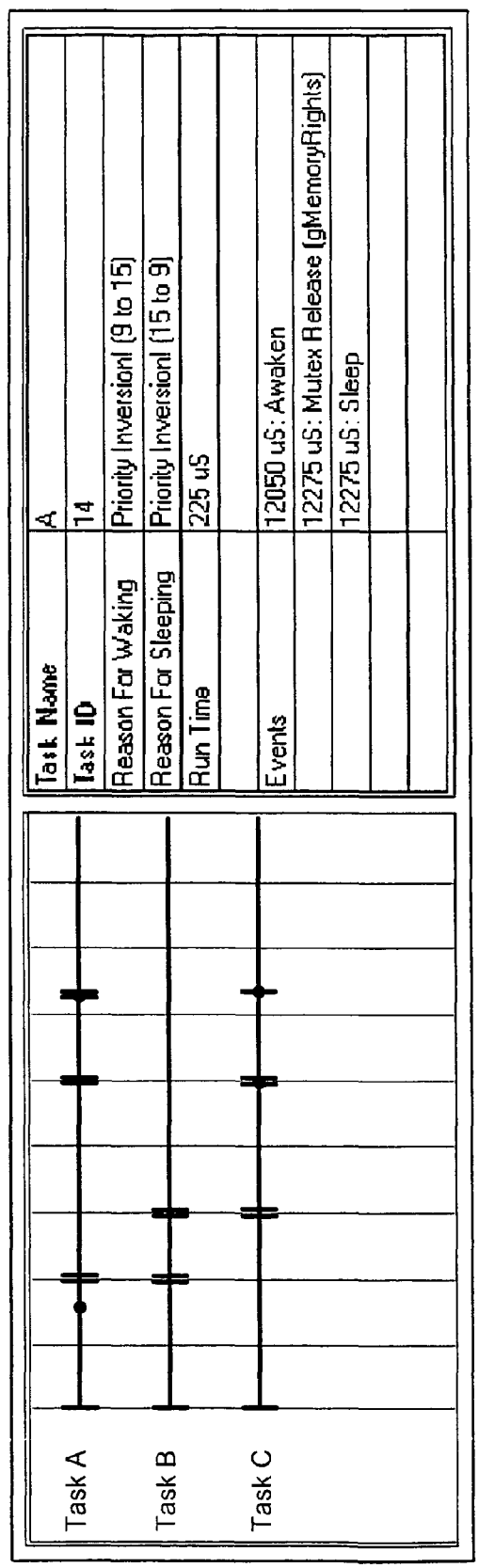
FIG. 18 illustrates an alternative embodiment of a GUI for viewing timing of loops in a graphical program.

The GUI screen shots mentioned above are exemplary only. As noted above, in various embodiments, any kind of visual presentation may be used in displaying timing data of the graphical program(s). FIG. 18 illustrates one alternative embodiment for displaying timing data of a graphical program that performs three loops named "Task A", "Task B", and "Task C". Times when each loop was executing are indicated in the graphical display on the left with white line segments. Thus, each white line segment may correspond to an iteration of a loop. The user may click on each white line segment to display text information regarding the respective loop iteration in the pane on the right side of the display.

In other embodiments the GUI may visually indicate other types of timing for the graphical program in addition to or alternatively to the timing for loops in the graphical program. In one embodiment, the GUI may visually indicate timing for individual nodes in the graphical program. As described above with reference to FIG. 10, the user may be able to specify a desired timing relationship between a first node and a second node in the graphical program. Thus, the GUI may visually indicate the actual execution of the first node relative to the actual execution of the second node. For example, in one embodiment the actual execution of the first node may be indicated by a first length relative to a time axis, and the actual execution of the second node may be indicated by a second length relative to the time axis. Also, the GUI may visually indicate timing of an execution point of the first node relative to an execution point of the second node. For example, if the user specified a desired time interval of 100 ms between the beginning of execution of the first node and the beginning of execution of the second node, then the GUI may graphically indicate the actual time interval that occurred between the beginning of execution of the first node and the beginning of execution of the second node. The GUI may also visually indicate the times at which execution side effects of various nodes occurred.

In one embodiment the user may be able to cause the GUI to switch between various display modes. For example, one display mode may display timing for loops in the graphical program, and another display mode may display timing for individual nodes in the graphical program. In one embodiment, timing data for both loops and individual nodes may be displayed simultaneously. For example, the GUI may visually indicate timing both of loop iterations and of individual nodes executed within each loop iteration.

There may be other display modes as well, such as a mode for displaying timing of threads executed by the graphical program. Other low-level execution details for the graphical program may also be displayed, such as semaphore accesses, critical section accesses, sleep spans, etc. The user may also be able to specify viewing preferences to change the displayed information. The user may also be able to select which items to display information for. For example, timing information for some loops or some nodes may be hidden from view if desired, to simplify the display.

In one embodiment, the GUI may display timing data on the block diagram of the graphical program. This may allow the user to easily relate the timing data to the corresponding portion of the graphical program and to see timing characteristics of particular portions of the graphical program. In another embodiment, the GUI may primarily display the timing data, but certain elements of the block diagram may also be included on the display. For example, individual nodes may be displayed to enable the user to easily identify the nodes corresponding to various portions of the displayed timing data.

The timing data displayed by the GUI may allow the user to determine whether the timing of the graphical program(s) is occurring as intended. The user may be able to see when particular activities occur in the graphical program and also get a measure of how much time each activity takes to execute. An execution subsystem which executes the graphical program may attempt to schedule execution of various elements of the graphical program so that the specified timing criteria for the graphical program are met. However, in some cases it may not be possible to satisfy the timing criteria, e.g., if the user specified execution periods or time intervals that are too short. If timing is not occurring as intended, then the user may adjust the timing criteria for various elements of the graphical program. For example, if a loop consistently overruns its execution period, the user may specify a longer execution period for the loop. As another example, if a user-specified maximum time interval between an execution point of a first node and an execution point of a second node was not satisfied, then the user may specify a longer time interval. If timing criteria for other loops or nodes in the graphical program depends on or is relative to the timing criteria that changed, then the user may also adjust the timing criteria for these other loops or nodes, so that proper timing relationships among various elements of the graphical program are maintained.

In one embodiment the timing data may be programmatically analyzed to automatically detect situations where the specified timing criteria of the graphical program are not being met. The user may be informed of the problem, e.g., by displaying a text message or by visually indicating an error condition on the display, e.g., through color-coding or other techniques to draw the user's attention to the problem.

In other cases the specified timing criteria for the graphical program may be satisfied with time to spare, and the user may be able to adjust the timing criteria to make the graphical program execute faster. For example, if the user specified an execution period of 25 ms for a loop, and the GUI indicates that each iteration of the loop took less than 20 ms to execute, then the user may adjust the execution period of the loop to 20 ms. In one embodiment the timing data may be analyzed to automatically detect situations where the specified timing criteria can be changed to make the graphical program execute faster.

In one embodiment the GUI may not only display timing data, but may also allow the timing criteria for the graphical program to be re-configured from within the GUI itself, without having to switch to a block diagram editor or other context. For example, the user may double-click on a portion of timing data displayed for a particular loop to cause a configuration dialog for setting timing information for the loop to be displayed. The user may then change various aspects of the loop's timing information, such as its execution period, offset, priority, etc. The graphical program may then be configured with the new timing information for the loop. In one embodiment this may comprise automatically or programmatically changing a portion of the graphical program's block diagram, e.g., to set new numerical values used on the block diagram, or to re-configure wires, etc.

In one embodiment the graphical program may be re-configured with the new timing information "offline", i.e., while the graphical program is not being executed. For example, the graphical program may then be re-compiled and executed again to determine whether the new timing information is appropriate. In another embodiment the graphical program may be re-configured with the new timing information dynamically, as the graphical program is being executed. The GUI may be continuously updated with new timing data so that the user can see the effects of the new timing configuration in real-time or with a small time delay.

In another embodiment the GUI may allow the user to easily switch from the GUI to a block diagram editor for editing the graphical program. For example, the user may be able to issue a command to cause the block diagram editor to be launched in a new window and the graphical program to be opened in the editor window. In one embodiment the editor window may be automatically scrolled to bring a particular element of the graphical program into view. For example, the user may double-click on a portion of timing data displayed on the GUI for a particular loop, which may cause the graphical program to be opened in the editor and automatically scrolled so that the loop is in view. The user may then reconfigure the timing information for the loop, e.g., by invoking a configuration dialog, or changing wires connected to loop terminals, etc.

In another embodiment the GUI may allow the user to specify setting changes for one or more hardware devices which the graphical program utilizes. For example, the user may change hardware device settings that affect the timing of the graphical program. The specified changes to the settings may be automatically applied to the hardware devices. In one embodiment, hardware events or status of hardware devices may also be displayed along with the timing data for the graphical program. For example, information may be displayed to represent when the converters on a DAQ board are ready to be used in sampling data. This may aid the user in properly aligning the timing of his graphical program with the timing behavior of the hardware devices which the graphical program utilizes.

An alternative embodiment of the method may be utilized to display timing information for a text-based program, such as a program written in C, C++, Visual C++, Visual Basic, Java, etc. In particular, where the text-based program includes one or more loops, the GUI may display timing data for the one or more loops in a manner similar to that described above. For example, for a C program that includes one or more While loops or one or more For loops, the GUI may display timing data for the one or more While loops or For loops.

Figure 19:
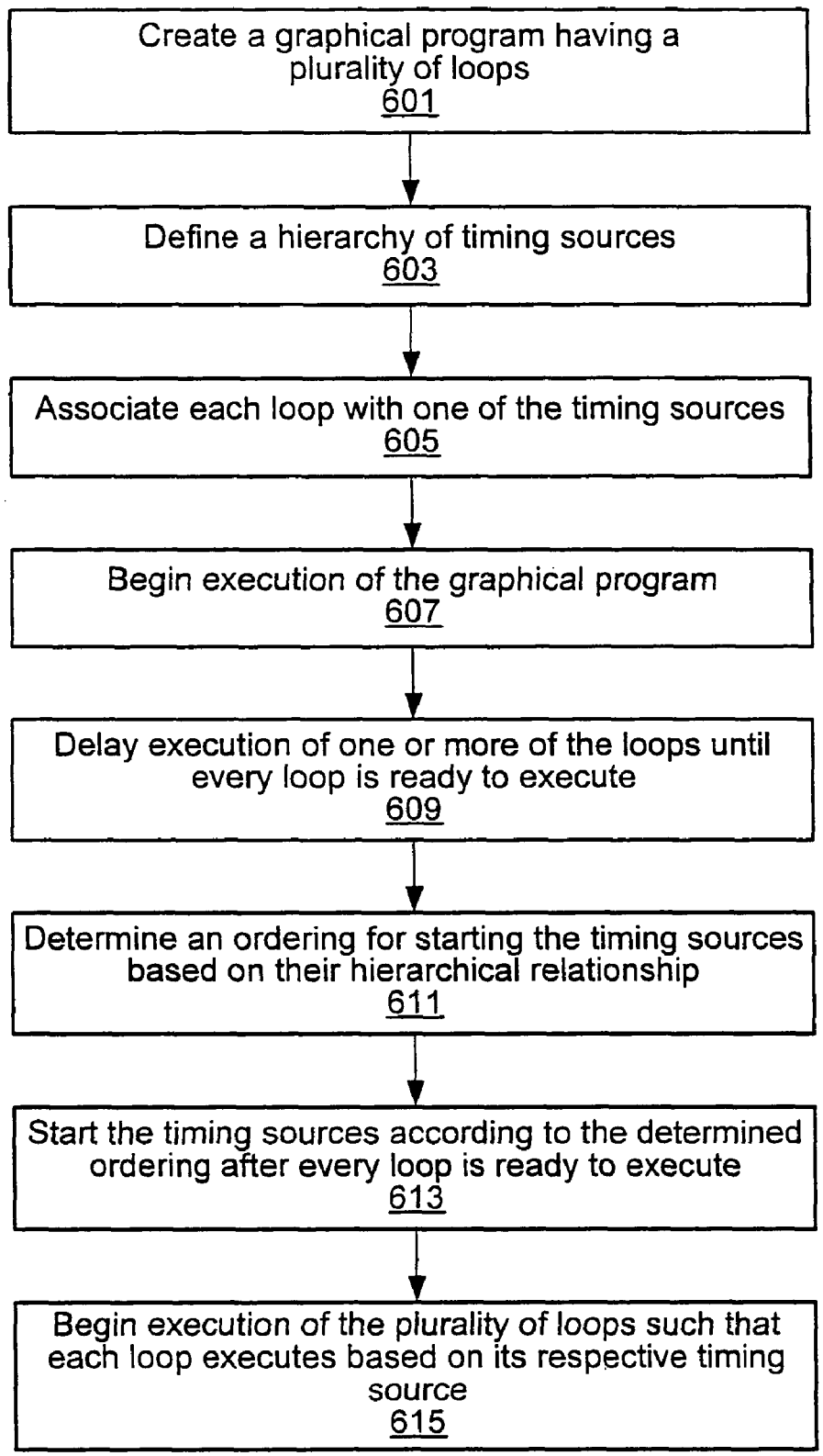
FIG. 19 is a flowchart diagram illustrating one embodiment of a method for executing a graphical program which has a plurality of timed loops, wherein the timed loops utilize timing sources that are related to or derived from each other.

FIG. 19—Multiple Timed Loops Grouped in a Hierarchy

In some applications it may be desirable to execute a graphical program having multiple timed loops that are timed in a hierarchical fashion with respect to each other. The timed loops may not all execute at the same rate but may need to execute at rates which are derived from each other. As one simple example, it may be desirable to have a first loop that executes at a rate of 1 MHz and a second loop that executes at a rate of 200 KHz, where the 200 KHz timing source for the second loop is derived from the 1 MHz timing source of the first loop. In other words, the timing source for the second loop may need to tick exactly at the same time as every fifth tick of the timing source for the first loop. Thus, successive iterations of the second loop may begin execution at the same time as every fifth iteration of the first loop begins execution.

In any given application, the number of timed loops in the graphical program and their timing relationships with respect to each other may be arbitrarily complex. During execution of the graphical program it may be necessary to properly align the timing sources of the loops with respect to each other and begin execution of the loops so that they are exactly timed with respect to each other in the desired manner. FIG. 19 is a flowchart diagram illustrating one embodiment of a method for executing a graphical program which has a plurality of timed loops, wherein the timed loops utilize timing sources that are related to or derived from each other. It is noted that FIG. 19 illustrates a representative embodiment, and alternative embodiments are contemplated. Also, various elements may be combined, omitted, or performed in different orders.

According to one embodiment of the method, a graphical program having a plurality of loops may be created, as shown in 601. For example, the user may include a plurality of timed loops in the graphical program, as described above with reference to FIG. 5.

In 603 a hierarchy of timing sources may be defined. Any type of timing sources may be utilized, such as hardware or software-based timing sources. In one embodiment the timing sources may be related to each other according to parent/child relationships. For example, one or more timing sources may be derived from a base timing source. For each timing source derived from the base timing source, one or more timing sources may in turn be derived from that timing source. Additional timing sources may in turn be derived from these timing sources, and so on, for as many levels as desired. Thus the timing sources may be related to each other according to a tree hierarchy.

Figures 20, 21, 22:
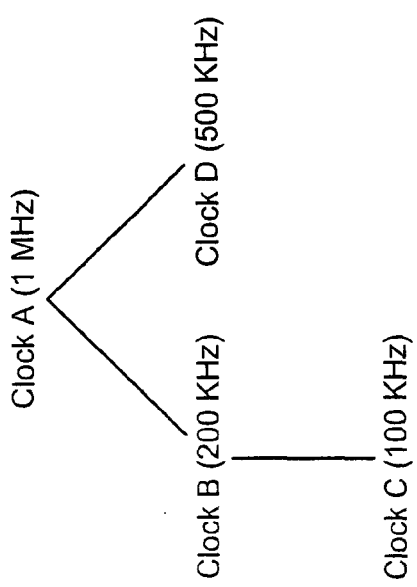
FIG. 20 illustrates an exemplary hierarchy of clocks arranged as a tree.
FIG. 21 illustrates four exemplary late modes for defining the behavior of a late timed loop.
FIG. 22 illustrates a chart showing an example of operation of a timed loop when it is configured in each of six exemplary late modes.

FIG. 20 illustrates an exemplary hierarchy of clocks arranged as a tree. The base clock, Clock A, ticks with a frequency of 1 MHz. Clock B and Clock D are derived from Clock A. Clock B has a frequency of 200 KHz and thus ticks on every fifth tick of Clock A. Clock C is derived from Clock B and has a frequency of 100 KHz. Thus Clock C ticks on every other tick of Clock B, or every tenth click of Clock A. Clock D has a frequency of 500 KHz and thus ticks on every other tick of Clock A.

In various embodiments, any of various techniques may be utilized to define the hierarchy of timing sources. In one embodiment the hierarchy of timing sources may be defined based on user input. For example, the graphical programming development environment may be operable to display a GUI allowing the user to specify relationships among the timing sources. In another embodiment the user may utilize an application programming interface (API) to define the hierarchy of timing sources. For example, the user may create graphical source code operable to dynamically define the hierarchy of timing sources during execution of the graphical program.

In 605 each of the loops in the graphical program may be associated with one of the timing sources defined in 603. Thus the plurality of loops may be viewed as a group of loops that are grouped together due to the relationships among their respective timing sources. In various embodiments the loops may be associated with the timing sources using any technique, similarly as described above with reference to FIG. 5. It is noted that 603 and 605 may occur in any order or may occur concurrently with respect to each other.

In 607 execution of the graphical program may begin. For the group of loops in the graphical program to execute with the intended timing it may be necessary to control the manner in which their respective timing sources are started and control when the loops begin executing. As shown in 609, execution of the loops may be delayed until every loop in the group is ready to execute. The determination of when the loops are ready to execute may depend on the type of graphical program. For example, for a data flow graphical program, a loop may be ready to execute when all data flow dependencies for the loop (if any) have been satisfied. As a simple example, consider a graphical program with Loop A whose data flow dependencies become satisfied at time T1, Loop B whose data flow dependencies become satisfied at time T2, and Loop C whose data flow dependencies become satisfied at time T3, where T1<T2<T3. In this example, execution of Loops A and B may be delayed until time T3, even though Loop A was ready to execute at time T1 and Loop B was ready to execute at time T2.

After every loop in the group is ready to execute, the timing sources for the various loops may be started. To satisfy the defined relationships among the timing sources, the timing sources may need to be started in a certain order. Thus in 611 an ordering for starting the timing sources may be determined based on their hierarchical relationship. In 613 the timing sources may be started according to this determined ordering.

As described above, the timing sources may be related to each other according to a tree hierarchy. The timing sources may be started in an order depending on their position within the tree. Each child timing source may be started before its parent timing source. According to one embodiment, the timing sources may be started according to a post-order depth-first traversal of the tree.

As shown in 615, once the timing sources have been started, execution of the loops may be begun such that each loop executes based on its respective timing source, i.e., iterations of each loop are timed by its respective timing source, similarly as described above with reference to FIG. 5.

Modes Defining Behavior for Late Timed Loop Iterations

As discussed above with reference to FIG. 5, in some situations the first iteration of a timed loop may not be ready to execute until a time that is after its designated offset, e.g., due to late arrival of data flow or other causes. In different applications the user may want the timed loop to behave in different ways when such a situation occurs. In various embodiments the graphical programming development environment may enable the user to choose from any of various kinds of modes that define the behavior of a timed loop that is late in this manner. This section describes several exemplary late modes according to which the timed loop may be configured.

As an example, suppose that a timed loop is configured with an execution period of 100 ticks and an offset of 30 ticks, and suppose that the actual time required for one iteration of the timed loop to execute is 20 ticks. Thus, in normal operation the first iteration of the timed loop should begin at 30 ticks (i.e., its offset), and subsequent iterations should begin at 130 ticks, 230 ticks, 330 ticks, etc., i.e., as defined by the period (100 ticks). Assume however that the timed loop is not actually ready to begin execution until 240 ticks, e.g., due to late arrival of data flow. Since the timing source is now at 240 ticks the scheduler may have choices in scheduling the first and subsequent iterations of the timed loop.

One dimension to the problem is whether or not the timed loop should be aligned with the originally prescribed schedule. In some applications, other timed loops or hardware devices may already be running at the originally prescribed schedule. Thus it may be desirable to align this timed loop with the (already running) global schedule. This means that the timed loop should align itself as quickly as possible with its prescribed schedule. In the example above, the first iteration of the timed loop should be scheduled to begin at 330 ticks, and subsequent iterations at 430 ticks, 530 ticks, etc. However, in other applications it may not be necessary to align this timed loop with the execution of other timed loops or hardware devices. In these applications it may be desirable to instead begin executing the timed loop as soon as possible. Thus, the first iteration of the timed loop may begin execution immediately, using the current time as its actual offset. In the example above, this means that the first iteration of the timed loop begins execution at 240 ticks, and subsequent iterations at 340 ticks, 440 ticks, etc.

Another dimension to the problem concerns whether the loop should catch up on processing data from missed periods. For example, in one embodiment the timed loop may be a consumer of data generated by other timed loops or hardware devices. At each iteration, the timed loop may be expected to consume or process data generated by the other timed loops or hardware devices. Since the timed loop is late, the other timed loops or hardware devices may already have generated data missed by this timed loop. In the example above, the timed loop is behind with the data from the periods starting at 30 and 130 ticks, and we can assume that the data from the current period (starting at 230 ticks) has already been produced as well. If the data from the missed periods are available in a buffer, it may be desirable for the timed loop to catch up by processing the missed data points before it is ready to join the defined schedule. However, a timed loop that processes the missed data may cause jitter, which is the amount of time that a loop cycle time varies from the specified schedule. Thus, in some applications the user may not want the timed loop to process the missed data. If the user does not want to process the missed data, the timed loop can ignore older data in the buffer that the loop iterations missed and process only the latest data, such as the data available at the next iteration and subsequent iterations.

The two problem dimensions discussed above are orthogonal to each other. Thus, four modes, mode A, mode B, mode C, and mode D, may be defined to specify the behavior of a late timed loop, as illustrated in FIG. 21. For completeness, two additional modes, mode E and mode F, may also be introduced. These modes both specify a timed loop that ignores its given offset. A timed loop configured in mode E will be scheduled to run immediately when it is enabled by data flow. A timed loop configured in mode F will be scheduled to run one period later than the time when it is enabled by data flow.

The chart in FIG. 22 illustrates the operation of the timed loop in the above example when it is configured in each of these six modes. In this chart, X(t) denotes the value being produced (say by a hardware device or another timed loop) at time t, and A(t), B(t), C(t), D(t), E(t), and F(t) denote the consumption of the data produced at time t when the loop is configured to behave according to the modes A, B, C, D, E, and F, respectively. For example, when the timed loop is configured in mode A (i.e., Catch Up, Align with Schedule), the timed loop may iterate to process the data from the missed periods before it is aligned with the global schedule. As shown in FIG. 22, when the timed loop is configured in mode A, at 240 ticks the timed loop processes the data that was produced at 30 ticks, at 260 ticks the timed loop processes the data that was produced at 130 ticks, and at 280 ticks the timed loop processes the data that was produced at 230 ticks. Having processed the data from the three missed periods, the next iteration of the timed loop is then scheduled to begin at 330 ticks, in line with the global schedule. Behavior of the loop when it is configured in modes B, C, D, E, and F is shown in a similar manner. In this example, it is assumed that the timed loop has the highest priority, allowing the timed loop to catch up as fast as possible.

To more precisely capture the semantics of the modes the following pseudo-variables may be defined, mapping iteration count to their values for that iteration:

| | | |
|---|---|---|
| expected_wakeup: | N -> Time | (Computed at the beginning of each iteration) |
| scheduled_run: | N -> Time | (Computed at the beginning of each iteration) |
| iterations_behind: | N -> N | (Computed at the beginning of each iteration) |
| actual_wakeup: | N -> Time | (Generated by the system) |
| offset: | N -> Time | (Specified at the beginning of each iteration) |
| period: | N -> Time | (Specified at the beginning of each iteration) |

-continued

```
Invariants:
    (All n: n>=0: expected_wakeup(n) <= actual_wakeup(n) <= scheduled_run(n))
(Not mode F and F')
        AND    expected_wakeup(n) < expected_wakeup(n+1)
        AND    actual_wakeup(n) < actual_wakeup(n+1)
        AND    scheduled_run(n) < scheduled_run(n+1)
        )
iterations_behind(0) = (min j: j >= 0: offset(0) + j*period(0) >= actual_wakeup(0) )
iterations_behind(n+1) = (min j: j >= 0: expected_wakeup(n+1) + j*period(n+1) >=
actual_wakeup(n+1) )
Mode A (Wait multiple, process pending):
expected_wakeup(n) =
    offset(0), if n=0
        expected_wakeup(n−1) + period(n), if n>0
    offset(n)
scheduled_run(n) =
    actual_wakeup(n)
Mode B (Wait multiple, flush pending):
expected_wakeup(n) =
    offset(0), if n=0
    scheduled_run(n−1) + period(n), if n>0
scheduled_run(n) =
    expected_wakeup(n), if expected_wakeup(n) = actual_wakeup(n)
    expected_wakeup(n) + iterations_behind(n)*period(n), if expected_wakeup(n) <
actual_wakeup(n)
Mode Safe-B (Wait multiple, flush pending):
expected_wakeup(n) =
    offset(0), if n=0
    expected_wakeup(n−1) + iterations_behind(n−1)*period(n), if n>0
scheduled_run(n) =
    actual_wakeup(n)
Mode C (Wait, process pending):
expected_wakeup(n) =
    offset(0), if n=0
        expected_wakeup(n−1) + period(n), if n>0 AND iterations_behind(n−1) = 0
        actual_wakeup(n−1) − (iterations_behind(n−1)−2)*period(n), if n>0 AND
iterations_behind(n−1) > 0
scheduled_run(n) =
    actual_wakeup(n)
Mode D (Flush pending, wait):
expected_wakeup(n) =
    offset(0), if n=0
    actual_wakeup(n−1) + period(n), if n>0
scheduled_run(n) =
    actual_wakeup(n)
Mode E (Ignore offset, wait):
expected_wakeup(n) =
    actual_wakeup(0), if n=0
    actual_wakeup(n−1) + period(n), if n>0
scheduled_run(n) =
    actual_wakeup(n)
Mode F (Ignore offset, delay first iteration by period, wait):
expected_wakeup(n) =
    actual_wakeup(0), if n=0
    actual_wakeup(0) + period(0) + period(1), if n=1
    actual_wakeup(n−1) + period(n), if n>0
scheduled_run(n) =
    actual_wakeup(0) + period(0), if n=0
    actual_wakeup(n), if n>0
Mode No-Change (proceed in the current mode)
```

This is the default behavior for the next iteration of the timed loop, unless one of the other modes is explicitly defined (through wiring) on the right edge of the loop. The computations of the pseudo-variables for the loop will proceed using the rules given for the current mode. Note, that specifying the No-Change mode on the right edge of the timed loop implies that a wired value for the offset will be ignored for the next iteration. A timed loop with the No-change mode as its initial mode has an undefined behavior.

In another embodiment, additional modes, referred to below as "primed modes" may be defined, where the additional modes all establish the phase on the first iteration, based on the maximum value of offset and actual_wakeup(0) (the first wake up time for the loop). The primed modes may behave as follows:

B': Wait multiple, use specified phase. Run immediately and flush pending when late.

C': Wait multiple, establish phase on the first iteration, use specified offset if possible and process pending D': Wait multiple, flush pending and establish phase on the first iteration E': Wait multiple, establish phase on the first iteration F': Wait multiple, establish phase on the first iteration, delayed by one period

```
Mode A' (same as A; Wait multiple, process pending):
expected_wakeup(n) =
    offset(0), if n=0
        expected_wakeup(n−1) + period(n), if n>0
```

-continued

```
scheduled_run(n) =
    actual_wakeup(n)
Mode B' (Wait multiple, flush pending):
expected_wakeup(n) =
    offset(0) + iterations_behind(0) *period(0), if n=0
    expected_wakeup(n−1) + period(n), if n>0
scheduled_run(n) =
    actual_wakeup(n)
Mode C' (Wait, process pending):
expected_wakeup(n) =
    Max( offset(0), actual_wakeup(0) − (iterations_behind(0) −
    1)*period(0) ), if n=0
            expected_wakeup(n−1) + period(n), if n>1
scheduled_run(n) =
    actual_wakeup(n)
Mode D' (Flush pending, wait):
expected_wakeup(n) =
    Max( offset(0), actual_wakeup(0) ), if n=0
    expected_wakeup(n) + period(n), if n>1
scheduled_run(n) =
    actual_wakeup(n)
Mode E' (Ignore offset):
expected_wakeup(n) =
    actual_wakeup(0), if n=0
    expected_wakeup(n−1) + period(n), if n>0
scheduled_run(n) =
    actual_wakeup(n)
Mode F' (Ignore offset, delay first iteration by period):
expected_wakeup(n) =
    actual_wakeup(0), if n=0
    expected_wakeup(0) + period(0) + period(1), if n=1
    expected_wakeup(0) + period(n), if n>1
scheduled_run(n) =
    actual_wakeup(n)
```

FIG. 23 illustrates an expanded chart showing the operation of the timed loop for all of the modes described above.

Exemplary Graphical Program Nodes Associated with Timed Loops

As noted above, in one embodiment the graphical programming development environment may provide an application programming interface (API) which can be used to programmatically configure timed loops in a graphical program. In one embodiment this API may take the form of various graphical program nodes that the user can include in the graphical program to configure or control various aspects of the timed loops. The following describes one embodiment of such a set of graphical program nodes. It is noted that the described nodes are intended as examples only.

Figure 24:
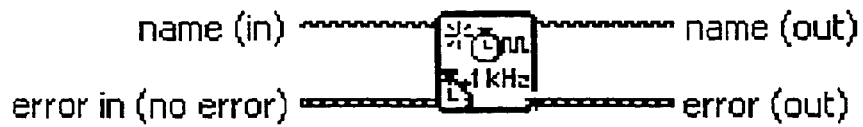
FIG. 24 illustrates a node that creates a timing source reference that can be used as the timing source for one or more timed loops.

FIG. 24 illustrates a "Create Timing Source" node. This node may create a timing source reference that can be used as the timing source for one or more timed loops. In one embodiment each timing source may have its own unit of timing and/or start time and may not start until the first timed loop that uses the timing source starts.

Inputs:
name (in)—The name (in) input specifies the name of the timing source to create error in—The error in input describes error conditions that occur before this node runs. The default is no error. If an error occurred before this node runs, the node passes the error in value to error out. This node runs normally only if no error occurred before this node runs. If an error occurs while this node runs, it runs normally and sets its own error status in error out.

Outputs:
name (out)—The name of the timing source created by the node. The name may be passed to other nodes that utilize it.

error out—The error out output contains error information. If error in indicates that an error occurred before this node ran then error out contains the same error information. Otherwise, it describes the error status that this node produces.

Figure 25:
FIG. 25 illustrates a node that stops and deletes a specified timing source.

FIG. 25 illustrates a "Clear Timing Source" node. This node may stop and delete the specified timing source. If the timing source is associated with a DAQmx task, the node may also clear the task. In one embodiment a name cannot be re-used until all timed loops attached to the timing source terminate.

Inputs:
name—The name input specifies the name of the timing source to stop and delete.

error in—The error in input describes error conditions that occur before this node runs. The default is no error. If an error occurred before this node runs, the node passes the error in value to error out. This node runs normally only if no error occurred before this node runs. If an error occurs while this node runs, it runs normally and sets its own error status in error out.

Outputs:
parent—The parent output specifies the name of the parent of the timing source deleted by the node. If the timing source has no parent then the parent output is empty.

error out—The error out output contains error information. If error in indicates that an error occurred before this node ran then error out contains the same error information. Otherwise, it describes the error status that this node produces.

Figure 26:
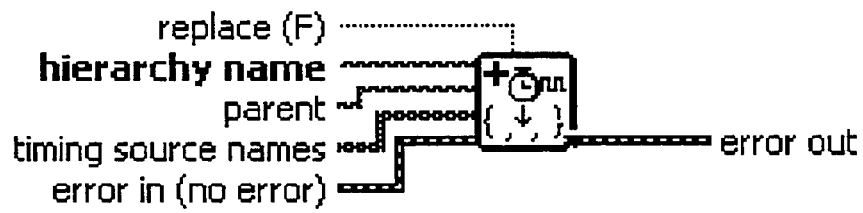
FIG. 26 illustrates a node that creates a hierarchy of timing sources based on specified timing source names.

FIG. 26 illustrates a "Build Timing Source Hierarchy" node. This node may create a hierarchy of timing sources based on the specified timing source names. The hierarchy may determine the order in which the timing sources start. The parent timing source may not start until after the timing sources in the hierarchy name input start. This node may be used when there are timing sources that have signal dependencies, such as DAQ counters routed to drive analog input connections. In such a case, the counter timing source acts as the parent.

Inputs:
replace (F)—This input replaces any timing source entered in the timing source names input if a timing source by that name already exists in the hierarchy of timing sources.

hierarchy name—This input specifies the name of the timing source hierarchy to create.

parent—This input specifies the valid timing source to be started after the all the timing sources in hierarchy name start.

timing source names—This input specifies an array of names of the timing sources to add to the timing source hierarchy. If the replace input is True then the new timing source replaces any timing source with the same name that already exists in the timing source hierarchy. These timing sources start before the timing source specified by the parent input.

error in—The error in input describes error conditions that occur before this node runs. The default is no error. If an error occurred before this node runs, the node passes the error in value to error out. This node runs normally only if no error occurred before this node runs. If an error occurs while this node runs, it runs normally and sets its own error status in error out.

Outputs:
error out—The error out output contains error information. If error in indicates that an error occurred before this node ran then error out contains the same error information. Otherwise, it describes the error status that this node produces.

Figure 27:
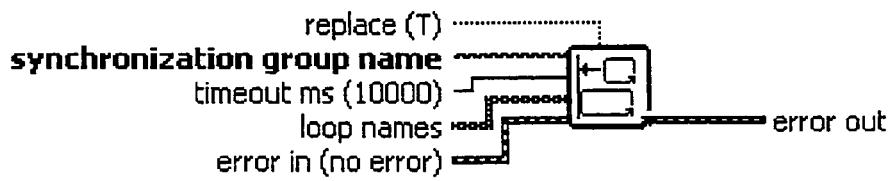
FIG. 27 illustrates a node that synchronizes the start of a plurality of timed loops.

FIG. 27 illustrates a "Synchronize Timed Loop Starts" node. This node may synchronize the start of the timed loops specified by the loop names input by adding their names to the group specified by the synchronization group name input. Timed loops in a synchronization group may wait until all the loops are ready to execute before beginning execution.

Inputs:

replace (T)—This input specifies whether to replace the group of timed loops entered in the synchronization group name input with the timed loop names entered in the loop names input. If the replace input is False and the timing source is a member of another hierarchy then the node may return an error.

synchronization group name—This input specifies the name of the group of timed loops for which to synchronize the start times.

timeout ms (10000)—This input specifies the amount of time the timed loop waits on other members of the synchronization group to arrive to the synchronization point. If any of the timed loops in the group do not arrive in time, the timed loop may return an error. The default is 10,000 ms.

loop names—This input specifies the names of the timed loops to synchronize. By default, if the name of a timed loop is specified in the loop names input and the group specified by the synchronization group name input includes that timed loop then the node deletes the new timed loop from the current group and adds it to the group specified by the synchronization group name input. If the replace (T) input is set to False then the node may return an error to indicate that it could not add the timed loop to the synchronization group.

error in—The error in input describes error conditions that occur before this node runs. The default is no error. If an error occurred before this node runs, the node passes the error in value to error out. This node runs normally only if no error occurred before this node runs. If an error occurs while this node runs, it runs normally and sets its own error status in error out.

Outputs:

error out—The error out output contains error information. If error in indicates that an error occurred before this node ran then error out contains the same error information. Otherwise, it describes the error status that this node produces.

Figure 28:
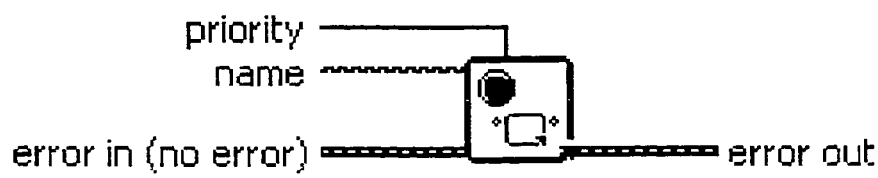
FIG. 28 illustrates a node that causes a specified timed loop to be aborted.

FIG. 28 illustrates a "Stop Timed Loop" node. This node may cause the timed loop specified by the name input to be aborted. If the specified timed loop is running then the timed loop may execute another iteration with the wakeup reason in the left data node set to "Aborted".

Inputs:

priority—This input changes the priority of the timed loop being aborted. The priority input may be used when the user wants to stop two or more timed loops and wants to ensure that one stops before the other.

name—This input specifies the name of the timed loop to stop or abort.

error in—The error in input describes error conditions that occur before this node runs. The default is no error. If an error occurred before this node runs, the node passes the error in value to error out. This node runs normally only if no error occurred before this node runs. If an error occurs while this node runs, it runs normally and sets its own error status in error out.

Outputs:

error out—The error out output contains error information. If error in indicates that an error occurred before this node ran then error out contains the same error information. Otherwise, it describes the error status that this node produces.

Exemplary Graphical Programs that Use Timed Loops

FIGS. 29-38 illustrate several exemplary graphical programs that utilize one embodiment of a timed loop structure. It is noted that these examples are included to illustrate exemplary uses of one particular embodiment of a timed loop structure in graphical programs written using the LabVIEW graphical programming development environment. However, in other embodiments a timed loop structure such as described above may take on any of various other forms and may be utilized in graphical programs written using other graphical programming development environments.

Figure 29:
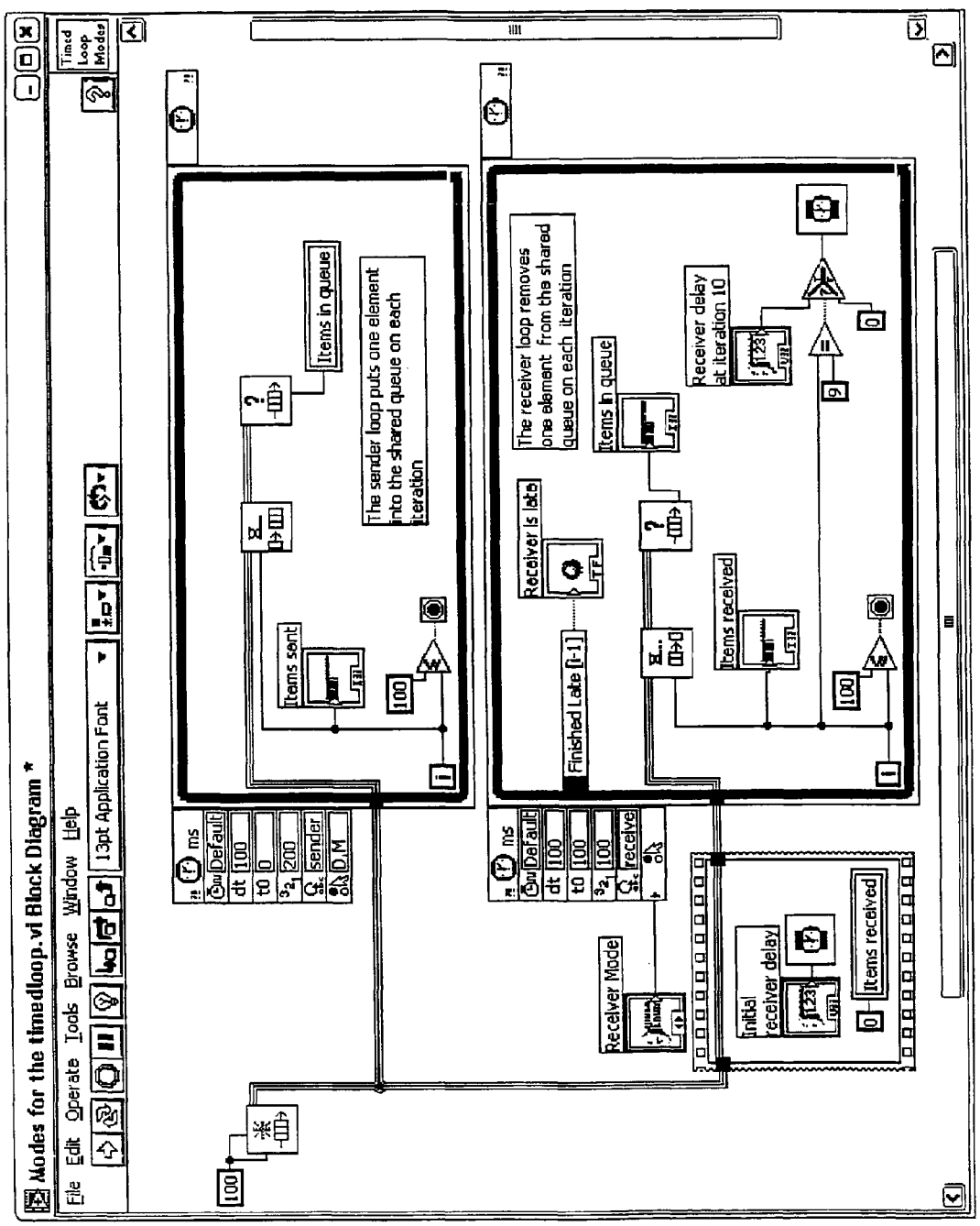
FIGS. 29-38 illustrate several exemplary graphical programs that utilize one embodiment of a timed loop structure.
Figure 30:
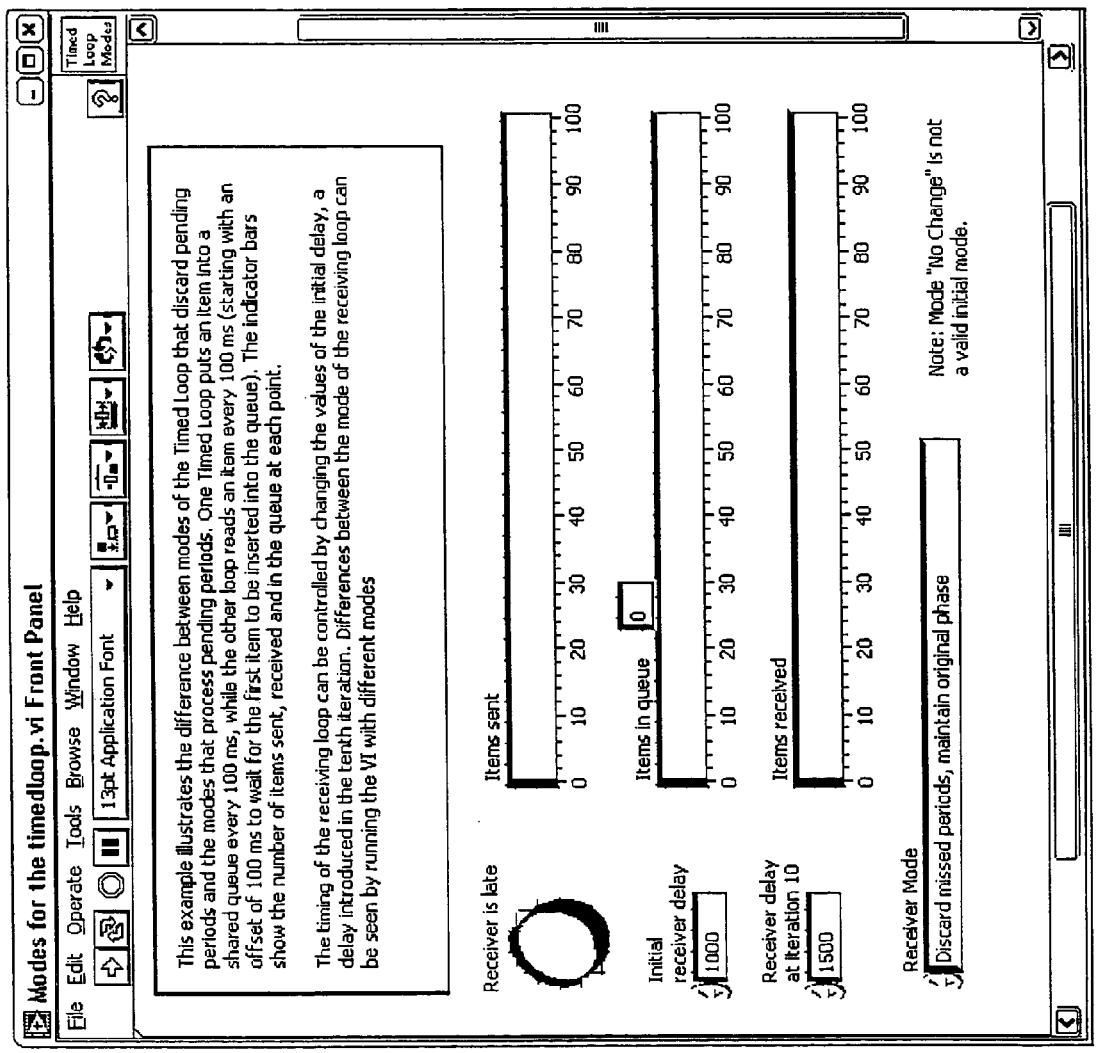

FIGS. 29 and 30 illustrate the block diagram and GUI of a graphical program that utilizes two timed loops that operate in conjunction with each other. As described above, in one embodiment the user may be able to select a desired late mode to specify how a timed loop handles situations in which late loop iterations occur. This example illustrates the difference between modes of the timed loop that discard pending periods and the modes that process pending periods. As documented on the block diagram of FIG. 29, one of the timed loops puts an item into a shared queue every 100 ms, while the other timed loop reads an item every 100 ms (starting with an offset of 100 ms to wait for the first item to be inserted into the queue). The indicator bars on the GUI of FIG. 30 show the number of items sent, received and in the queue at each point.

The timing of the receiving timed loop can be controlled from the GUI of FIG. 30 by changing the values of the initial delay, a delay introduced in the tenth iteration. The GUI also allows the user to change the late mode of the receiving timed loop, allowing the different behavior caused by the different late modes to be observed.

The "Receiver is late" indicator on the GUI goes on whenever the previous iteration of the receiving timed loop was late.

The "Items sent" indicator indicates the number of items sent by the sender timed loop.

The "Items in queue" indicator indicates the number of items in the queue between the sender timed loop and receiving timed loop.

The "Items received" indicator indicates the number of items received by the receiving timed loop.

The "Receiver mode" control controls the late mode of the receiving timed loop.

The "Initial receiver delay" control controls how much time in milliseconds the receiving timed loop will be delayed. A delay less than 100 has no effect, since the receiver has an offset of 100 ms. If the timed loop is in a mode that processes missed periods, these extra elements will be received in the next iteration of the receiving timed loop. If the mode discards missed periods then the queue will contain this number of items until the sender is done.

The "Receiver delay at iteration 10" control controls how much time to wait during iteration number 10 in milliseconds. This delay will cause the sender to add one extra element to the queue every 100 ms. If the timed loop is in a mode that processes missed periods, these extra elements will be received in the next iteration of the receiving timed loop. If the mode discards missed periods then the queue will contain this number of items until the sender is done.

Figure 31A:
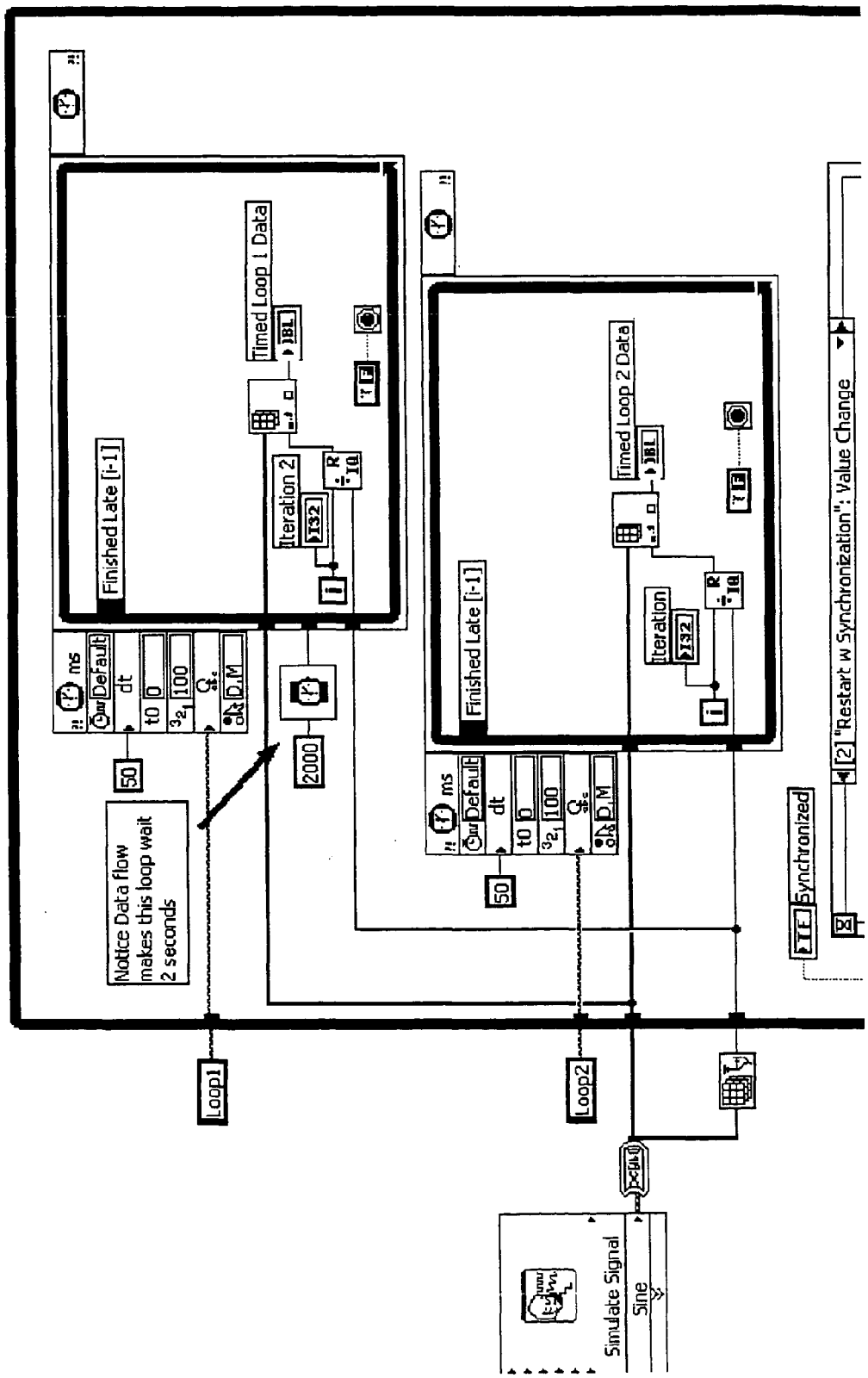
Figure 31B:
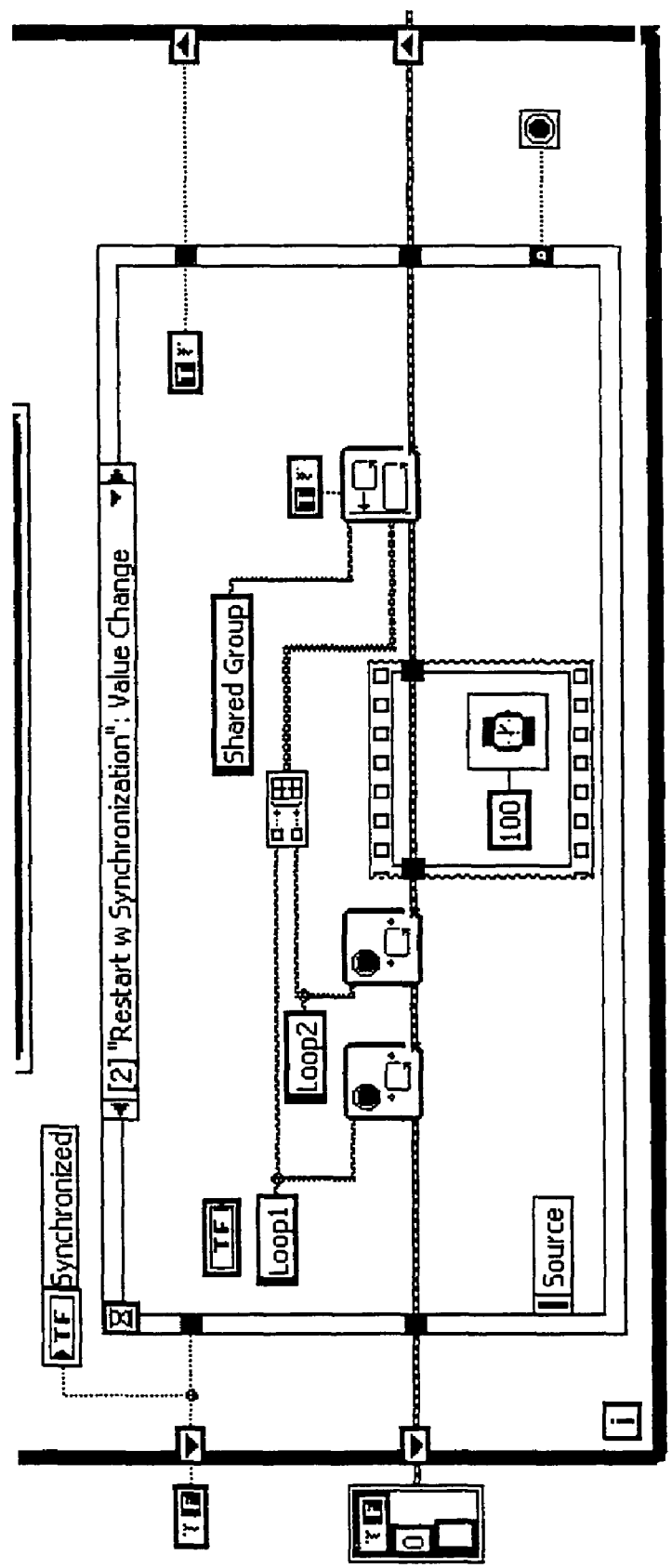
Figure 32:
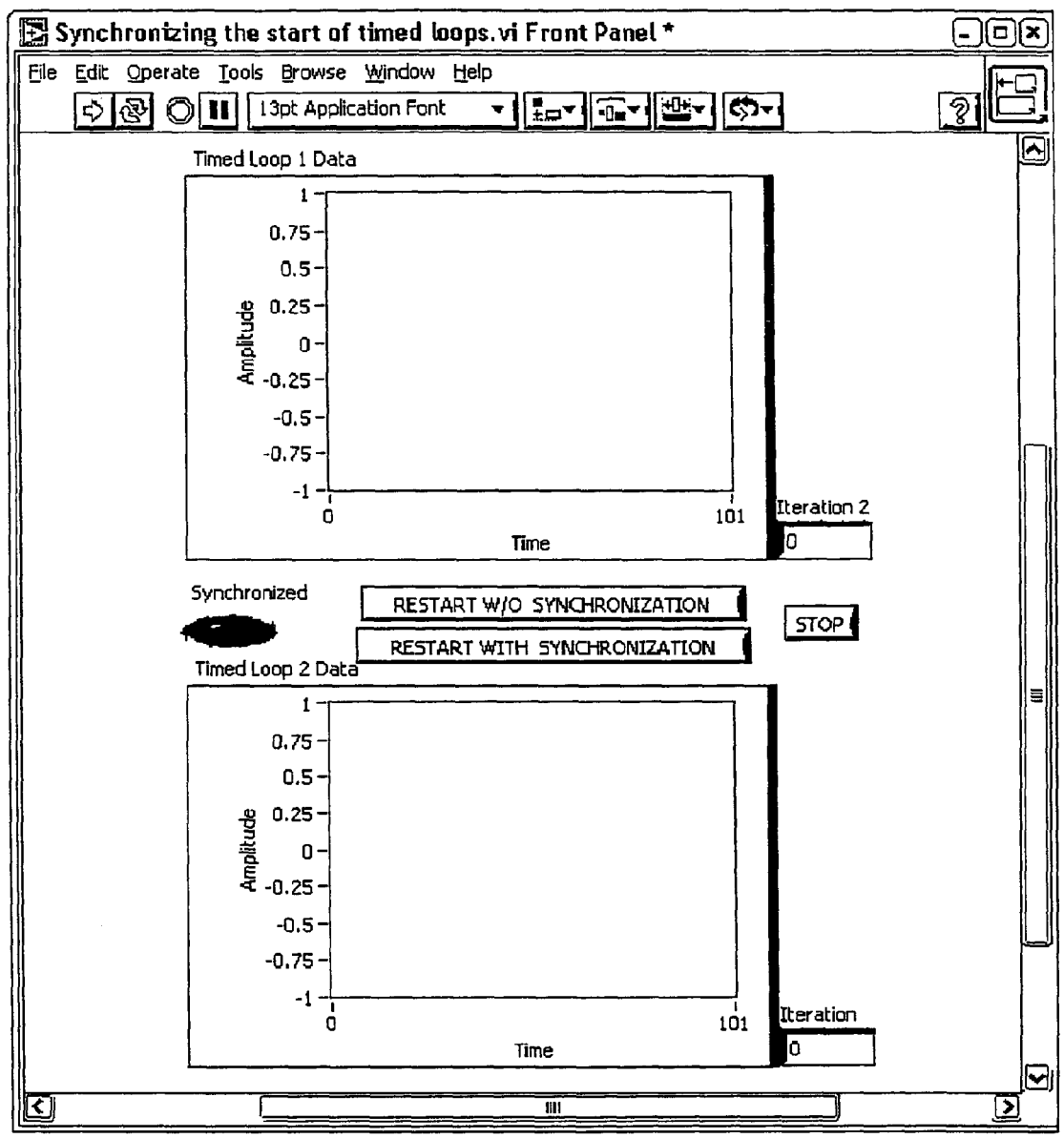

FIGS. 31A, 31B, and 32 illustrate the block diagram and GUI of a graphical program that utilizes the "Synchronized Timed Loop Starts" node described above to synchronize the start of two timed loops. (The block diagram is split into two drawings, FIG. 31A and FIG. 31B, because it is too large to fit on one page. FIG. 31A illustrates the top portion of the block diagram, and FIG. 31B illustrates the bottom portion.)

The user can run the graphical program and notice that Loop 2 immediately begins plotting whereas Loop 1 must wait 2 seconds before it plots because a "Wait" node delays data from reaching Loop 1 for 2 seconds. The user can then click the "Restart with Synchronization" button to restart the timed loops so that their starts are synchronized. Both loops wait the 2 seconds before they start plotting, even though there is no data flow reason keeping Loop 2 from plotting. I.e., the start of Loop 2 is delayed until Loop 1 starts because the two timed loops are synchronized.

The user can then click the "Restart w/0 Synchroniztion" button to restart the timed loops so that their starts are not synchronized. Now the timed loops will behave like they did at the start, i.e., Loop 1 will wait, and Loop 2 will immediately begin plotting.

Figure 33A:
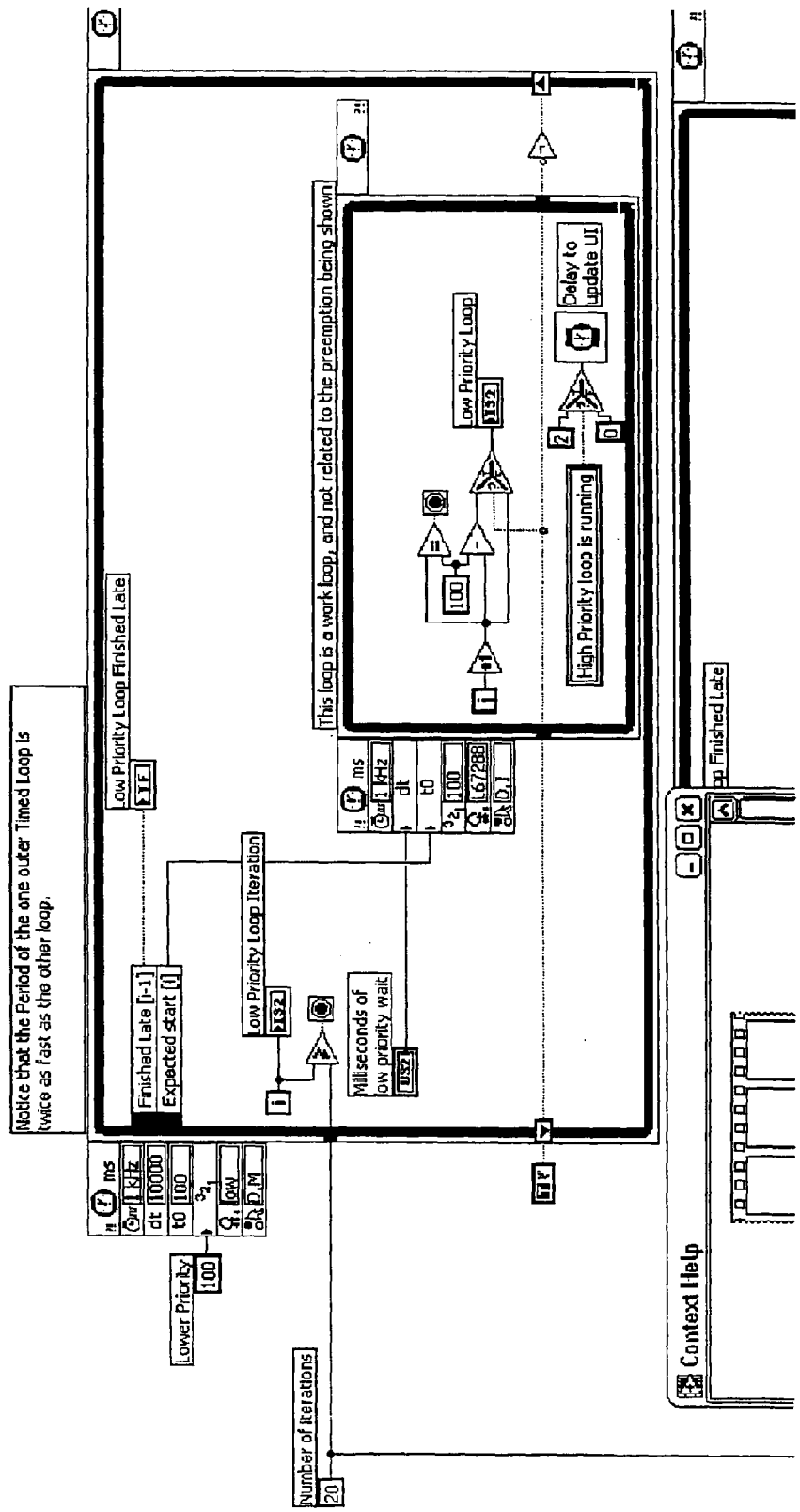
Figure 33B:
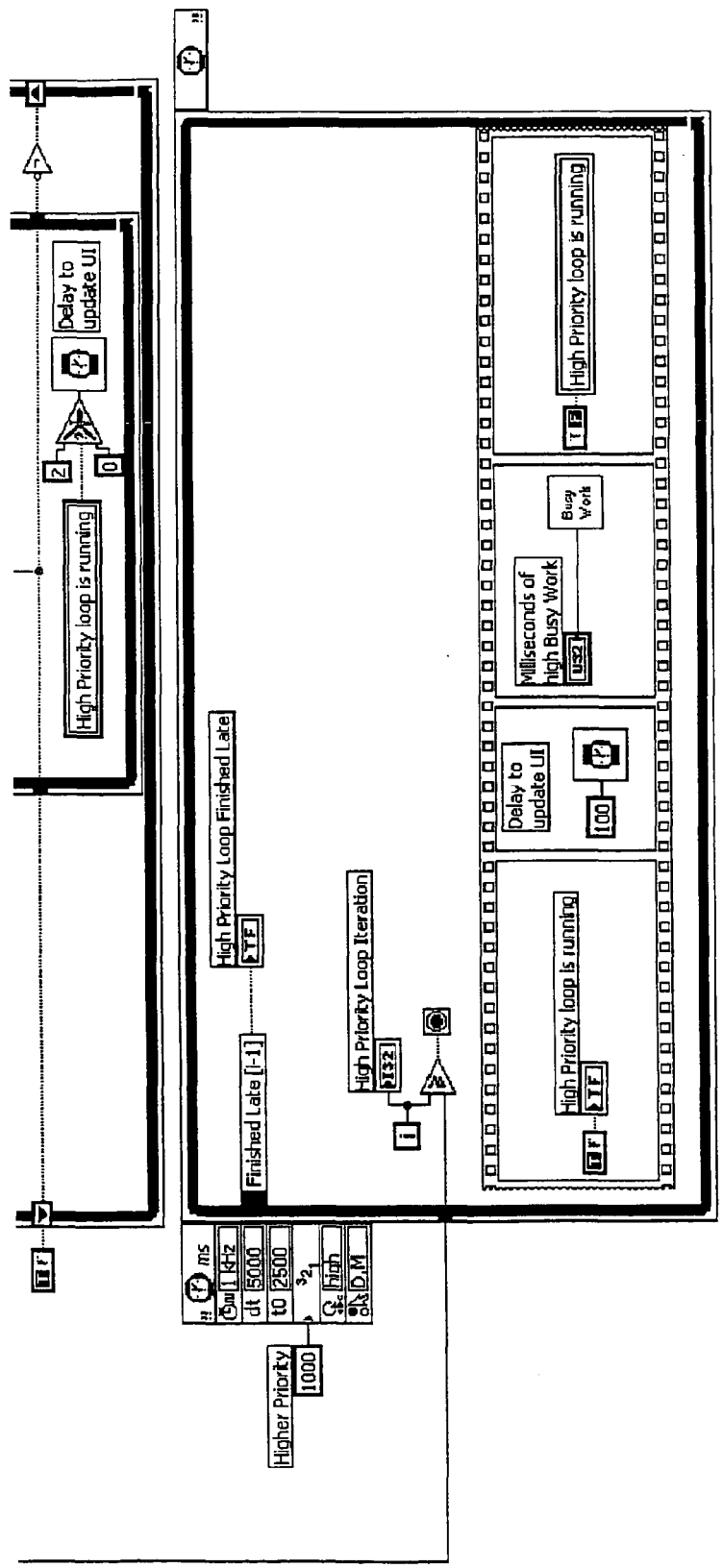
Figure 34:
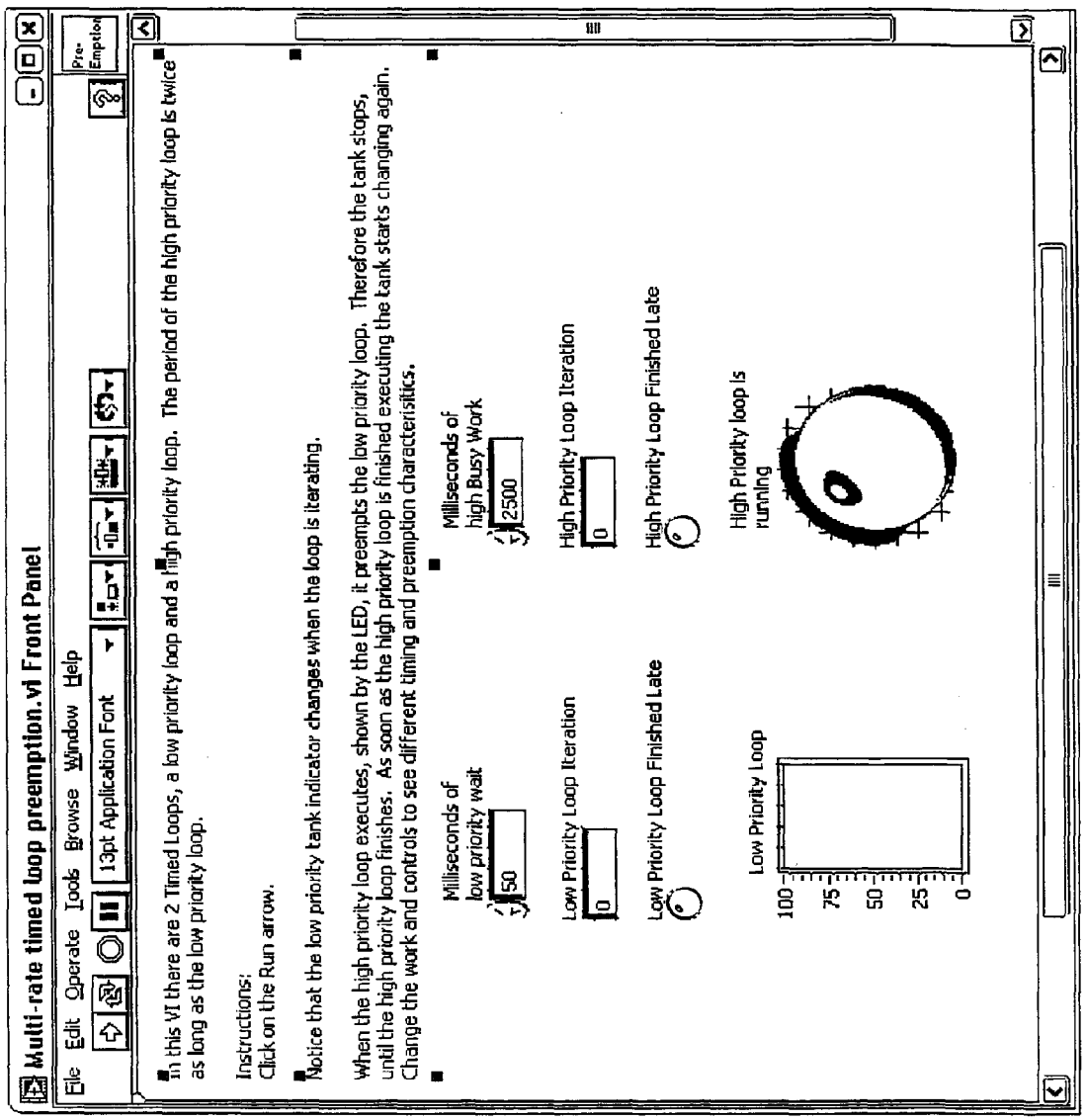

FIGS. 33A, 33B, and 34 illustrate the block diagram and GUI of a graphical program that illustrates an example of multi-rate timed loop preemption. (The block diagram is split into two drawings, FIG. 33A and FIG. 33B, because it is too large to fit on one page. FIG. 33A illustrates the top portion of the block diagram, and FIG. 33B illustrates the bottom portion.)

There are two timed loops, a low priority timed loop and a high priority timed loop. The period of the high priority loop is twice as long as that of the low priority loop. When the low priority loop is running, the "Low Priority Loop" tank indicator on the GUI of FIG. 34 changes. When the high priority loop executes, indicated by the "High Priority loop is running" LED, it preempts the low priority loop. Therefore the "Low Priority Loop" tank indicator stops until the high priority loop finishes. As soon as the high priority loop is finished executing, the "Low Priority Loop" tank indicator starts changing again. The user can change the controls on the GUI to see different timing and preemption characterisitics.

Figure 35:
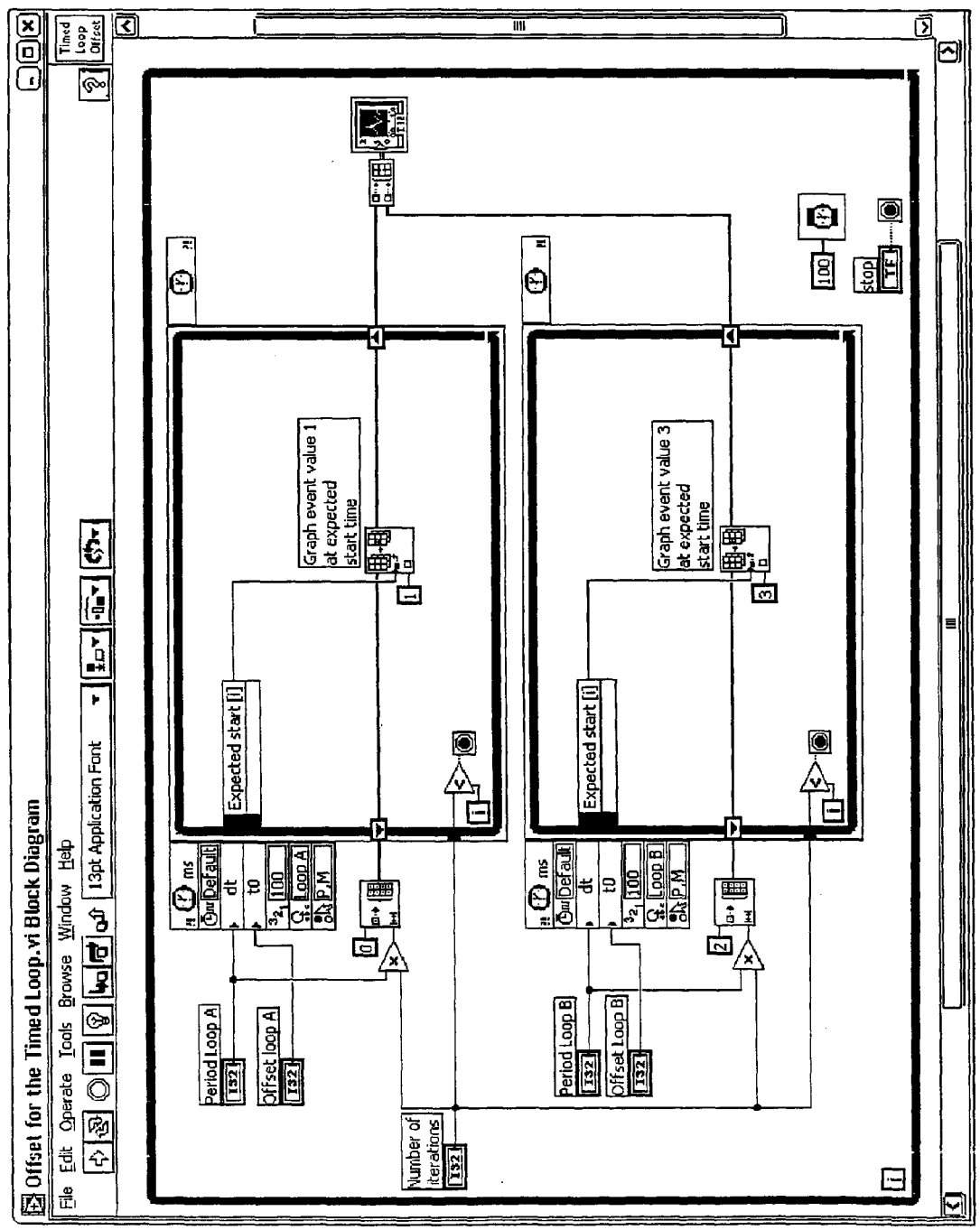
Figure 36:
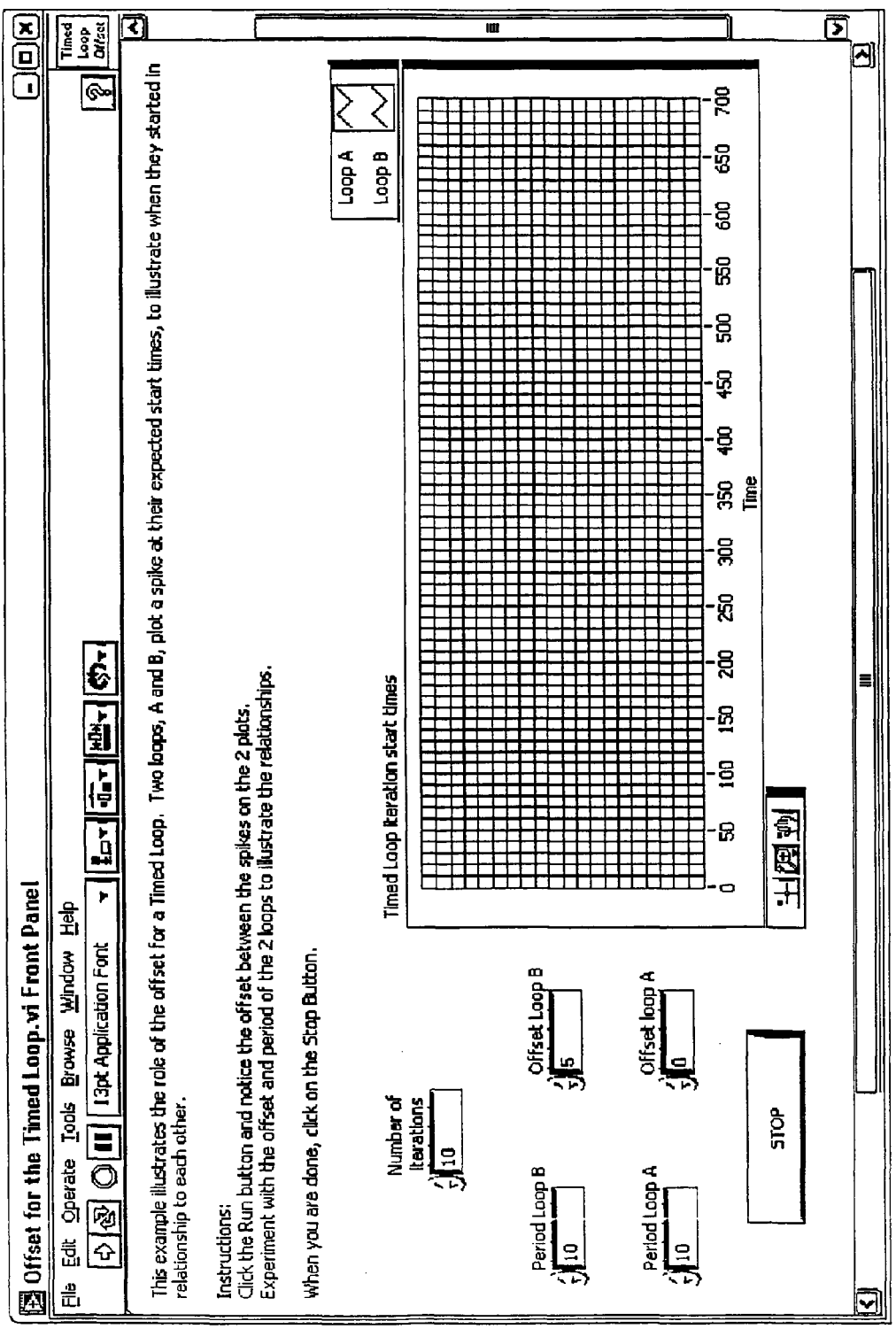

FIGS. 35 and 36 illustrate the block diagram and GUI of a graphical program that demonstrates how changing the offset of timed loops affects their timing. Two loops, A and B, plot a spike at their expected start times to illustrate when they started in relationship to each other. The user can click the Run button and notice the offset between the spikes on the two plots. The user can operate the controls on the GUI of FIG. 36 to change the offset and period of the two loops to see how the changes affect the timing relationships. A tick is plotted in the graph to show the starting time of each iteration of the two timed loops.

Figure 37:
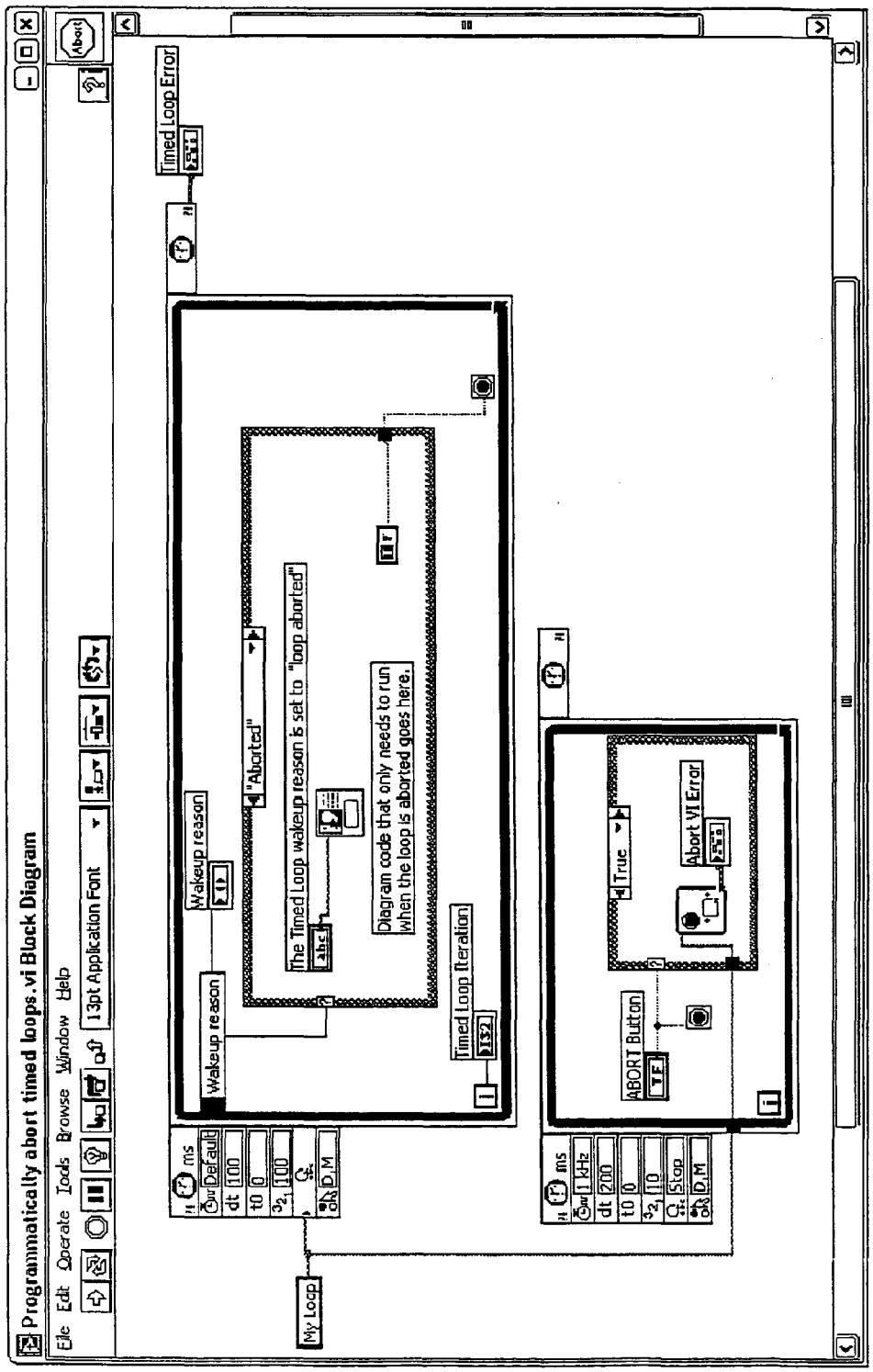
Figure 38:
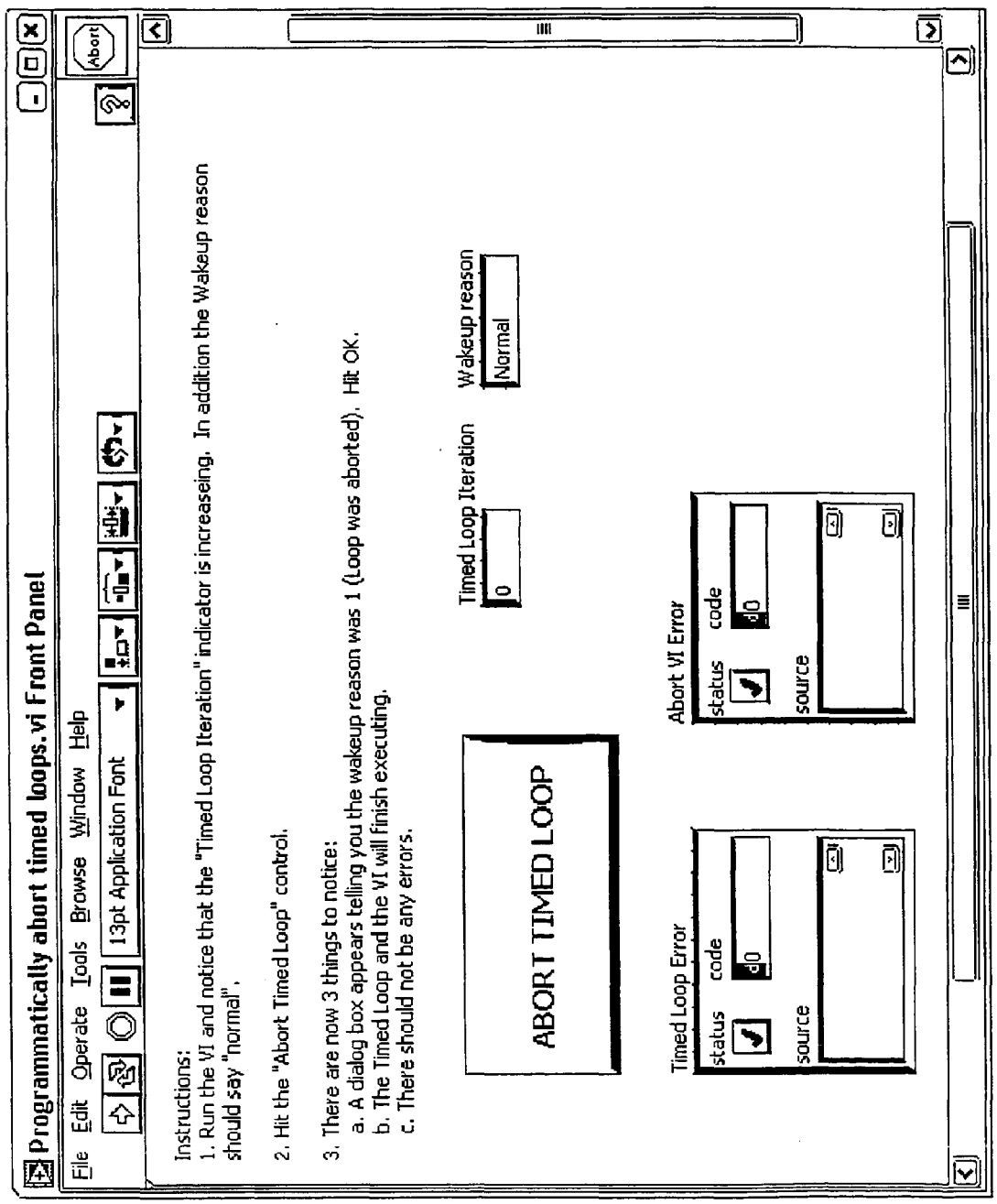

FIGS. 37 and 38 illustrate the block diagram and GUI of a graphical program that is operable to programmatically abort a timed loop. The user may run the graphical program and notice that the "Timed Loop Iteration" indicator on the GUI of FIG. 38 is increasing. In addition the "Wakeup reason" indicator says "normal". The user may then click the "Abort Timed Loop" control. In response, a dialog box appears to inform the user that the timed loop was awakened with a wakeup reason of 1 to indicate that the timed loop was aborted. After the user clicks the OK button on this dialog box the timed loop and the graphical program finish executing with no errors.

In the embodiments described above, timed loops or other elements may be included in a graphical program and configured with timing information manually, i.e., in response to direct user input. In another embodiment, the graphical program may be programmatically generated, e.g., as described in the above-incorporated patent application titled, "System and Method for Programmatically Generating a Graphical Program in Response to Program Information". For example, the user may utilize a tool or wizard operable to programmatically generate the graphical program. Thus, timed loops and other graphical program elements described herein may be programmatically included in the graphical program and programmatically configured with timing information. Graphical source code may also be programmatically associated with the timed loops. It is noted that in one embodiment multiple timed loops may be programmatically included in the graphical program.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory memory medium configured for creating a graphical program, the non-transitory memory medium storing program instructions executable to:
    arrange a plurality of nodes in a block diagram of a graphical program on a display in response to user input;
    interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and
    display timing information in the block diagram with the plurality of interconnected nodes, wherein displaying the timing information in the block diagram comprises:
        displaying a first numerical time value in the block diagram indicating timing of execution of a first node at a first point in time with respect to execution of a second node at a second point in time during execution of the graphical program, wherein the first numerical time value indicates a time interval between the execution of the first node and the execution of the second node; and
        displaying a first wire in the block diagram between the first node and the second node in response to user input, wherein the first wire configures the graphical program according to the first numerical time value, thereby configuring the timing of the execution of the first node at the first point in time with respect to the execution of the second node at the second point in time during the execution of the graphical program.

2. The non-transitory memory medium of claim 1, wherein said displaying the timing information is performed in response to user input specifying desired timing of the execution of the first node with respect to the execution of the second node during the execution of the graphical program.

3. The non-transitory memory medium of claim 1, wherein the program instructions are further executable to:
    receive user input specifying the first wire;
    wherein the timing information is displayed in the block diagram in response to the user input specifying the first wire.

4. The non-transitory memory medium of claim 1,
wherein the first numerical time value indicates timing of an execution point of the first node with respect to an execution point of the second node.

5. The non-transitory memory medium of claim 4,
wherein the execution point of the first node is one of:
a point at which the execution of the first node begins;
a point at which an execution side effect of the first node occurs;
a point at which the execution of the first node ends.

6. The non-transitory memory medium of claim 5,
wherein the execution point of the second node is one of:
a point at which the execution of the second node begins;
a point at which an execution side effect of the second node occurs;
a point at which the execution of the second node ends.

7. The non-transitory memory medium of claim 4,
wherein the first numerical time value indicates a time constraint between the execution point of the first node and the execution point of the second node.

8. The non-transitory memory medium of claim 4,
wherein the first numerical time value indicates a time interval between the execution point of the first node and the execution point of the second node.

9. The non-transitory memory medium of claim 4, wherein the first numerical time value indicates a time maximum between the execution point of the first node and the execution point of the second node.

10. The non-transitory memory medium of claim 4,
wherein the first numerical time value indicates a time minimum between the execution point of the first node and the execution point of the second node.

11. The non-transitory memory medium of claim 1,
wherein the first numerical time value indicates a time interval between a first time when the execution of the first node begins and a second time when the execution of the second node begins.

12. The non-transitory memory medium of claim 1,
wherein the first numerical time value indicates a time interval between a first time when the execution of the first node begins and a second time when the execution of the second node ends.

13. The non-transitory memory medium of claim 1,
wherein the first numerical time value indicates a time interval between a first time when the execution of the first node begins and a second time when an execution side effect of the second node occurs.

14. The non-transitory memory medium of claim 1,
wherein the first numerical time value indicates a time interval between a first time when the execution of the first node ends and a second time when the execution of the second node ends.

15. The non-transitory memory medium of claim 1,
wherein the first numerical time value indicates a time interval between a first time when the execution of the first node ends and a second time when an execution side effect of the second node occurs.

16. The non-transitory memory medium of claim 1,
wherein the first numerical time value indicates a time interval between a first time when an execution side effect of the first node occurs and a second time when an execution side effect of the second node occurs.

17. The non-transitory memory medium of claim 1,
wherein the timing information is displayed in the block diagram before the execution of the graphical program;
wherein the program instructions are further executable to control the execution of the first node and the execution of the second node during the execution of the graphical program to cause the indicated timing to be satisfied.

18. The non-transitory memory medium of claim 1,
wherein the first numerical time value indicates a time constraint between the execution of the first node and the execution of the second node.

19. The non-transitory memory medium of claim 1,
wherein the first wire does not indicate data flow between the first node and the second node.

20. The non-transitory memory medium of claim 1,
wherein the first node has a plurality of points configured to accept connection of the first wire, wherein each point corresponds to a different execution point of the first node;
wherein said displaying the first wire comprises displaying the first wire connected to a first point of the plurality of points on the first node in order to visually indicate that the first numerical time value relates to a particular execution point to which the first point corresponds.

21. The non-transitory memory medium of claim 1,
wherein displaying the first wire comprises:
displaying the first wire connected to a first point on the first node, wherein the first point corresponds to a time at which the execution of the first node begins; and
displaying the first wire connected to a second point on the second node, wherein the second point corresponds to a time at which the execution of the second node ends.

22. The non-transitory memory medium of claim 1,
wherein displaying the first wire comprises displaying the first wire connected to a point on the left side of the first node to visually indicate that the first numerical time value relates to a time at which the execution of the first node begins.

23. The non-transitory memory medium of claim 1,
wherein displaying the first wire comprises displaying the first wire connected to a point on the right side of the first node to visually indicate that the first numerical time value relates to a time at which the execution of the first node ends.

24. The non-transitory memory medium of claim 1,
wherein displaying the first wire comprises displaying the first wire connected to a point on a middle portion of the first node to visually indicate that the first numerical time value relates to a time at which an execution side effect of the first node occurs.

25. The non-transitory memory medium of claim 1,
wherein the program instructions are further executable to:
automatically analyze the plurality of interconnected nodes to determine timing of the execution of the first node with respect to the execution of the second node, wherein said analyzing automatically determines the first numerical value;
wherein displaying the timing information comprises displaying the timing information in response to said automatically analyzing the plurality of interconnected nodes.

26. The non-transitory memory medium of claim 1,
wherein the graphical program includes a loop;
wherein the first node and the second node are performed in the loop;
wherein the first numerical time value indicates timing of the execution of the first node with respect to the execution of the second node during iterations of the loop.

27. The non-transitory memory medium of claim 26,
wherein the timing information is displayed in the block diagram before the execution of the graphical program;

wherein the program instructions are further executable to control the execution of the first node and the second node during execution of the loop to cause the indicated timing to be satisfied for one or more iterations of the loop.

28. A non-transitory memory medium configured for creating a graphical program, the non-transitory memory medium storing program instructions executable to:
   arrange a plurality of nodes in a block diagram of a graphical program on a display in response to user input;
   interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and
   display timing information in the block diagram with the plurality of interconnected nodes, wherein displaying the timing information in the block diagram comprises:
      displaying a first numerical time value in the block diagram indicating a time interval between a first point in time when execution of a first node begins and a second point in time when execution of a second node ends; and
      displaying a first wire between the first node and the second node in response to user input, wherein the first wire configures the graphical program according to the first numerical time value, thereby configuring the timing of the beginning of execution of the first node at the first point in time with respect to the end of execution of the second node at the second point in time during the execution of the graphical program.

29. A non-transitory memory medium configured for creating a graphical program, the non-transitory memory medium storing program instructions executable to:
   arrange a plurality of nodes in a block diagram of a graphical program on a display in response to user input;
   interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and
   display timing information in the block diagram with the plurality of interconnected nodes, wherein displaying the timing information in the block diagram comprises:
      displaying a first numerical time value in the block diagram indicating a time interval between a first point in time when execution of a first node begins and a second point in time when an execution side effect of a second node occurs; and
      displaying a first wire between the first node and the second node in response to user input, wherein the first wire configures the graphical program according to the first numerical time value, thereby configuring the timing of the beginning of execution of the first node at the first point in time with respect to the execution side effect of the second node at the second point in time during the execution of the graphical program.

30. The non-transitory memory medium of claim 29, wherein the execution side effect of the second node comprises an input/output operation.

31. A non-transitory memory medium configured for creating a graphical program, the non-transitory memory medium storing program instructions executable to:
   arrange a plurality of nodes in a block diagram of a graphical program on a display in response to user input;
   interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and
   display timing information in the block diagram with the plurality of interconnected nodes, wherein displaying the timing information in the block diagram comprises:
      displaying a first numerical time value in the block diagram indicating a time interval between a first point in time when execution of a first node ends and a second point in time when execution of a second node ends; and
      displaying a first wire between the first node and the second node in response to user input, wherein the first wire configures the graphical program according to the first numerical time value, thereby configuring the timing of the end of execution of the first node at the first point in time with respect to the end of execution of the second node at the second point in time during the execution of the graphical program.

32. A non-transitory memory medium configured for creating a graphical program, the non-transitory memory medium storing program instructions executable to:
   arrange a plurality of nodes in a block diagram of a graphical program on a display in response to user input;
   interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and
   display timing information in the block diagram with the plurality of interconnected nodes, wherein displaying the timing information in the block diagram comprises:
      displaying a first numerical time value in the block diagram indicating a time interval between a first point in time when execution of a first node ends and a second point in time when an execution side effect of a second node occurs; and
      displaying a first wire between the first node and the second node in response to user input, wherein the first wire configures the graphical program according to the first numerical time value, thereby configuring the timing of the end of execution of the first node at the first point in time with respect to the execution side effect of the second node at the second point in time during the execution of the graphical program.

33. A non-transitory memory medium configured for creating a graphical program, the non-transitory memory medium storing program instructions executable to:
   arrange a plurality of nodes in a block diagram of a graphical program on a display in response to user input;
   interconnect the plurality of nodes in response to user input, wherein the plurality of interconnected nodes visually indicates functionality of the graphical program, wherein the plurality of interconnected nodes comprise a plurality of wires connecting the nodes, wherein the plurality of wires indicate data flow between the nodes in the block diagram; and display timing information in the block diagram with the plurality of interconnected nodes, wherein displaying the timing information in the block diagram comprises:

displaying a first numerical time value in the block diagram indicating a time interval between a first point in time when an execution side effect of a first node occurs and a second point in time when an execution side effect of a second node occurs; and displaying a first wire in the block diagram between the first node and the second node in response to user input, wherein the first wire configures the graphical program according to the first numerical time value, thereby configuring the timing of the execution side effect of the first node at the first point in time with respect to the execution side effect of the second node at the second point in time during the execution of the graphical program.

34. A non-transitory memory medium configured for creating a graphical program, the non-transitory memory medium storing program instructions executable to:

display a first loop in a graphical program block diagram on a display;

display a plurality of interconnected nodes in the first loop, wherein the plurality of interconnected nodes are connected via a plurality of wires that indicate data flow between the nodes, wherein the plurality of interconnected nodes visually indicates functionality performed during iterations of the first loop during execution of the graphical program, wherein the plurality of interconnected nodes includes a first node and a second node; and display timing information in the block diagram with the loop, wherein displaying the timing information in the block diagram comprises:

displaying a first numerical time value in the block diagram indicating timing of execution of the first node at a first point in time with respect to execution of the second node at a second point in time during iterations of the first loop, wherein the first numerical time value indicates a time interval between the execution of the first node and the execution of the second node; and displaying a first wire in the block diagram between the first node and the second node in response to user input, wherein the first wire configures the graphical program according to the first numerical time value, thereby configuring the timing of the execution of the first node at the first point in time with respect to the execution of the second node at the second point in time during iterations of the first loop during the execution of the graphical program.

35. The non-transitory memory medium of claim 34, wherein the program instructions are further executable to:

execute the graphical program so that the indicated timing of the execution of the first node with respect to the execution of the second node is satisfied for one or more iterations of the first loop.

36. A non-transitory memory medium configured for creating a graphical program, the non-transitory memory medium storing program instructions executable to:

display a first loop in a graphical program block diagram on a display;

display a plurality of interconnected nodes in the first loop, wherein the plurality of interconnected nodes are connected via a plurality of wires that indicate data flow between nodes, wherein the plurality of interconnected nodes visually indicates functionality performed during iterations of the first loop during execution of the graphical program, wherein the plurality of interconnected nodes includes a first node; and display timing information in the block diagram with the loop, wherein displaying the timing information in the block diagram comprises:

displaying a first numerical time value in the block diagram indicating a time interval between a first point in time when execution of the loop begins and a second point in time when execution of the first node begins; and displaying a first wire between the first node and the loop in response to user input, wherein the first wire configures the graphical program according to the first numerical time value, thereby configuring the timing of the beginning of execution of the first node at the second point in time with respect to the beginning of execution of the loop at the first point in time during the execution of the graphical program.

* * * * *